US008708703B2

(12) United States Patent
Fluster

(10) Patent No.: US 8,708,703 B2
(45) Date of Patent: Apr. 29, 2014

(54) METHOD AND APPARATUS FOR TEACHING MATHEMATICS

(76) Inventor: Matthew Earl Fluster, Pullman, WA (US)

(*) Notice: Subject to any disclaimer, the term of this patent is extended or adjusted under 35 U.S.C. 154(b) by 1806 days.

(21) Appl. No.: 11/203,846

(22) Filed: Aug. 15, 2005

(65) Prior Publication Data

US 2007/0048700 A1    Mar. 1, 2007

(51) Int. Cl.
*G09B 1/00* (2006.01)
*G09B 1/38* (2006.01)
*G09B 5/00* (2006.01)
*G09B 23/00* (2006.01)
*G09B 23/02* (2006.01)
*G06F 17/00* (2006.01)

(52) U.S. Cl.
USPC ........... 434/201; 434/188; 434/191; 434/202; 434/209

(58) Field of Classification Search
USPC ................................ 434/188, 201, 202, 209
See application file for complete search history.

(56) References Cited

U.S. PATENT DOCUMENTS

| | | | | |
|---|---|---|---|---|
| 3,661,392 A | * | 5/1972 | Abney | 434/209 |
| 3,669,667 A | * | 6/1972 | Gomez | 35/9 B |
| 3,699,667 A | * | 10/1972 | Gomez | 434/201 |
| 3,735,500 A | | 5/1973 | Matsumoto | |
| 3,787,988 A | * | 1/1974 | Nakajima et al. | 434/201 |
| 3,854,226 A | | 12/1974 | Divine | |
| 3,947,976 A | * | 4/1976 | Hafel | 434/201 |
| 4,010,556 A | * | 3/1977 | Ellsworth et al. | 434/201 |
| 4,016,411 A | | 4/1977 | Genin | |
| 4,051,605 A | * | 10/1977 | Toal et al. | 434/201 |
| 4,075,771 A | * | 2/1978 | Landsinger et al. | 434/202 |
| 4,114,294 A | | 9/1978 | Marmer | |
| 4,117,607 A | | 10/1978 | Gill | |
| 4,126,949 A | | 11/1978 | Simone | |
| 4,217,656 A | * | 8/1980 | Hirano et al. | 708/162 |
| 4,225,932 A | | 9/1980 | Hirano | |
| 4,247,895 A | * | 1/1981 | Weber | 434/327 |
| 4,321,046 A | * | 3/1982 | Oda et al. | 434/201 |
| 4,340,374 A | * | 7/1982 | Culley | 434/201 |
| 4,340,375 A | * | 7/1982 | Sakaue et al. | 434/201 |
| 4,358,273 A | * | 11/1982 | Yamamoto | 434/201 |
| 4,373,917 A | * | 2/1983 | Jackson | 434/209 |
| 4,389,194 A | * | 6/1983 | Toll et al. | 434/201 |
| 4,439,161 A | * | 3/1984 | Wiggins et al. | 434/201 |
| 4,447,213 A | * | 5/1984 | Culley | 434/201 |
| 4,468,203 A | * | 8/1984 | Gimmestad et al. | 434/228 |

(Continued)

FOREIGN PATENT DOCUMENTS

GB    2127200    4/1984
JP    54059857    5/1979

*Primary Examiner* — Nikolai A Gishnock
(74) *Attorney, Agent, or Firm* — Wells St. John P.S.

(57) ABSTRACT

An improved method of teaching mathematics which enables students to take an active and enjoyable role in their own learning via an interactive puzzle is disclosed. In the preferred embodiment, each of the ten digits, zero through nine, is "hidden" within one of ten value positions (52). Students must deduce the value of each position by forming sums, differences, products, and/or quotients of the positions. Freedom of selection of positions and operations provides for individualized approaches to puzzle solutions, and the interplay of values and operations promotes number sense. Mathematical reasoning is intrinsic to the puzzle. Programmable settings (72) allow the teacher to modify the puzzle, including substituting more challenging values in place of the digits (98), supplying more complex functions (106) in place of the four elementary arithmetic operations, and adjusting the format of the answers.

18 Claims, 51 Drawing Sheets

(56) References Cited

U.S. PATENT DOCUMENTS

| | | | |
|---|---|---|---|
| 4,525,148 A * | 6/1985 | Narayanan | 434/340 |
| 4,611,996 A | 9/1986 | Stoner | |
| 4,713,009 A * | 12/1987 | Borenson | 434/188 |
| 4,946,391 A * | 8/1990 | Hawkins et al. | 434/201 |
| 4,959,017 A * | 9/1990 | Thompson et al. | 434/110 |
| 5,007,840 A * | 4/1991 | Gaskell | 434/206 |
| 5,033,754 A * | 7/1991 | Finch | 273/299 |
| 5,135,398 A * | 8/1992 | Thornton et al. | 434/201 |
| 5,137,457 A * | 8/1992 | Howard et al. | 434/201 |
| 5,139,423 A | 8/1992 | McCormick | |
| 5,346,399 A * | 9/1994 | Sakow | 434/201 |
| 5,474,455 A * | 12/1995 | Yang | 434/128 |
| 5,638,308 A | 6/1997 | Stokes | |
| 5,645,431 A * | 7/1997 | Dreyfous | 434/195 |
| 5,679,002 A * | 10/1997 | Scelzo | 434/196 |
| 5,842,869 A * | 12/1998 | McGregor et al. | 434/201 |
| 5,927,718 A * | 7/1999 | Heaton | 273/272 |
| 5,954,509 A * | 9/1999 | Torres | 434/191 |
| 6,056,553 A * | 5/2000 | Huang | 434/188 |
| 6,142,784 A | 11/2000 | Wood | |
| 6,551,104 B2 * | 4/2003 | Becker | 434/201 |
| 6,579,101 B2 * | 6/2003 | Phan | 434/188 |
| 6,585,585 B1 * | 7/2003 | Fletcher | 463/9 |
| 6,609,712 B1 | 8/2003 | Baumgartner | |
| 6,755,658 B2 * | 6/2004 | Frieman | 434/191 |
| 6,758,675 B2 * | 7/2004 | Karabaic | 434/188 |
| 6,811,402 B1 * | 11/2004 | Ritchie | 434/191 |
| 6,840,774 B2 * | 1/2005 | Fretwell, Jr. | 434/201 |
| 7,243,919 B2 * | 7/2007 | Ringuette | 434/209 |
| 7,367,564 B2 * | 5/2008 | Latell | 273/299 |
| 7,499,848 B2 * | 3/2009 | Irons | 434/201 |
| 8,371,858 B2 * | 2/2013 | Vanova | 434/201 |
| 2003/0180699 A1 * | 9/2003 | Resor | 434/322 |
| 2004/0115602 A1 * | 6/2004 | Ding | 434/201 |
| 2004/0126745 A1 * | 7/2004 | Bell et al. | 434/201 |
| 2005/0191605 A1 * | 9/2005 | Nguyen et al. | 434/188 |
| 2006/0003296 A1 * | 1/2006 | Dockterman | 434/188 |
| 2006/0024648 A1 * | 2/2006 | Glymph | 434/188 |
| 2006/0024649 A1 * | 2/2006 | Vernon | 434/201 |
| 2006/0080070 A1 * | 4/2006 | Flansburg | 703/2 |
| 2006/0257828 A1 * | 11/2006 | Tsui Collins | 434/128 |
| 2007/0218433 A1 * | 9/2007 | Vanova | 434/188 |
| 2008/0193903 A1 * | 8/2008 | Suh | 434/201 |
| 2008/0311548 A1 * | 12/2008 | Jiang | 434/201 |
| 2009/0017427 A1 * | 1/2009 | Kunz et al. | 434/188 |
| 2009/0023118 A1 * | 1/2009 | Janes | 434/201 |
| 2009/0155752 A1 * | 6/2009 | Resor | 434/201 |
| 2010/0173270 A1 * | 7/2010 | Downs et al. | 434/188 |
| 2012/0141960 A1 * | 6/2012 | Khalsa et al. | 434/188 |
| 2013/0164719 A1 * | 6/2013 | Villamar | 434/201 |
| 2013/0236863 A1 * | 9/2013 | Kiai, Amir | 434/188 |

\* cited by examiner

TEACHER SETTINGS

| TEACHER BASIC 74 | SETTINGS OFF 76 |

OPERATIONS 78

| + | - |
|---|---|
| X | ÷ |

NUMBER OF KEYS 80

| 1 | 2 | 3 | 4 |
|---|---|---|---|
| 5 | 6 | 7 | 8 |
| 9 |   | 10 |   |

○ DISTINCT   ○ SAME

QUOTIENT STYLE 82

○ DECIMAL    PRECISION 84
                ○ ONES
                ○ TENTHS
                ○ HUNDREDTHS

○ FRACTION   FOR QUOTIENTS 86
               GREATER THAN ONE
               ○ MIXED NUMBERS
               ○ IMPROPER FRACTION

○ WHOLE NUMBER PLUS REMAINDER    88

○ MESSAGE: "DOES NOT DIVIDE EVENLY"    90

DIFFERENCE STYLE 92

○ MESSAGE: "MAY NOT SUBTRACT A LARGER    94
NUMBER FROM A SMALLER NUMBER"

Fig.26

TEACHER SETTINGS — 72

| TEACHER BASIC 74 | SETTINGS OFF 76 |

OPERATIONS 78

+ | −
× | ÷

NUMBER OF KEYS 80

| 1 | 2 | 3 | 4 |
| 5 | 6 | 7 | 8 |
| 9 | 10 | | |

○ DISTINCT  ○ SAME

QUOTIENT STYLE 82

○ DECIMAL  PRECISION 84
- ○ ONES
- ○ TENTHS
- ○ HUNDREDTHS

● FRACTION  FOR QUOTIENTS GREATER THAN ONE 86
- ● MIXED NUMBER
- ○ IMPROPER FRACTION

○ WHOLE NUMBER PLUS REMAINDER 88

○ MESSAGE: "DOES NOT DIVIDE EVENLY" 90

DIFFERENCE STYLE 92

○ MESSAGE: "MAY NOT SUBTRACT A LARGER NUMBER FROM A SMALLER NUMBER" 94

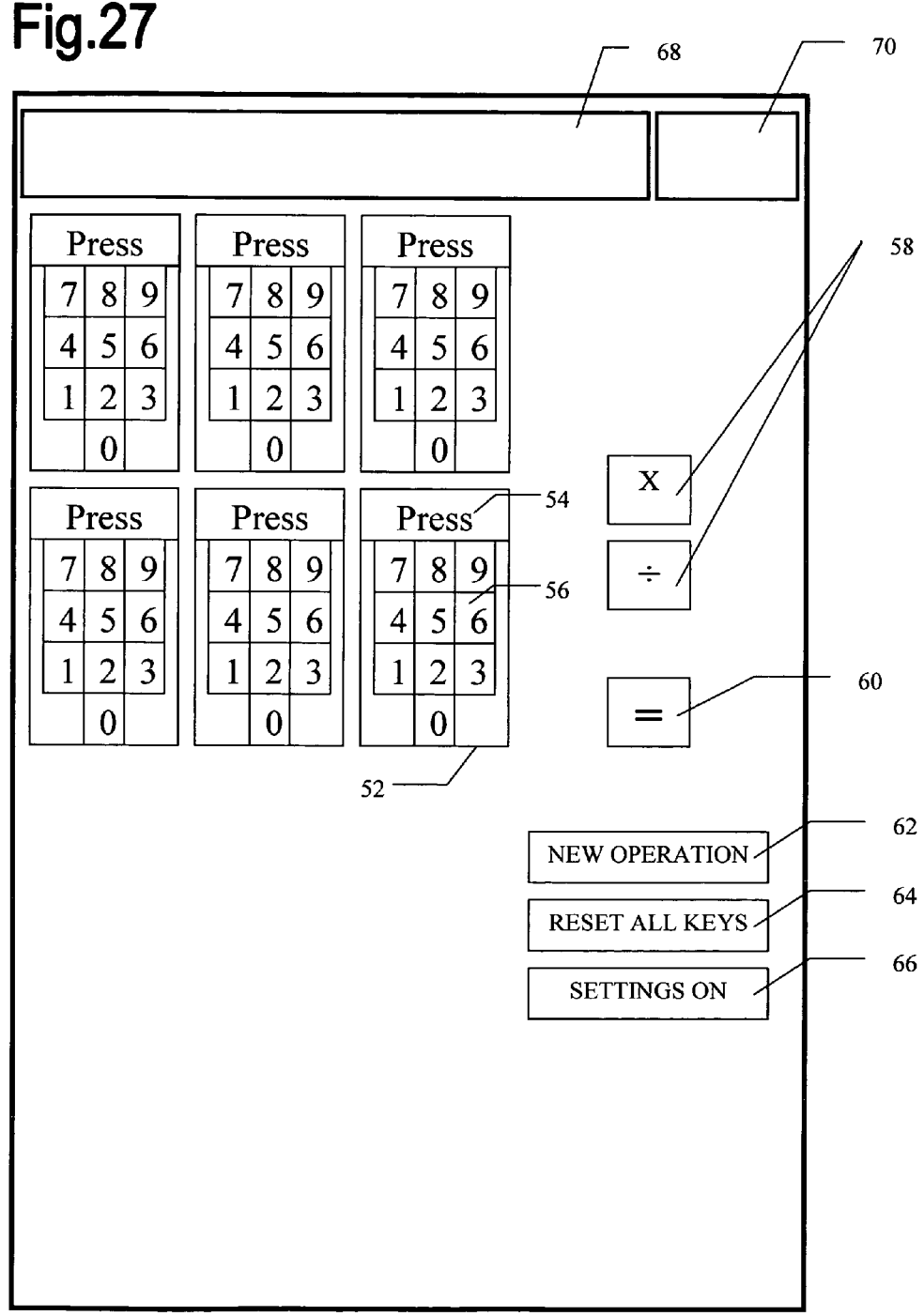

Fig.29

TEACHER SETTINGS — 72

| TEACHER BASIC 74 | SETTINGS OFF 76 |

OPERATIONS 78

+ −
× ÷

NUMBER OF KEYS 80

| 1 | 2 | 3 | 4 |
| 5 | 6 | 7 | 8 |
| 9 | 10 | | |

○ DISTINCT   ○ SAME

QUOTIENT STYLE 82

○ DECIMAL    PRECISION 84
  ○ ONES
  ○ TENTHS
  ○ HUNDREDTHS

○ FRACTION   FOR QUOTIENTS 86
  GREATER THAN ONE
  ○ MIXED NUMBER
  ○ IMPROPER FRACTION

● WHOLE NUMBER PLUS REMAINDER  88

○ MESSAGE: "DOES NOT DIVIDE EVENLY"  90

DIFFERENCE STYLE 92

○ MESSAGE: "MAY NOT SUBTRACT A LARGER  94
  NUMBER FROM A SMALLER NUMBER"

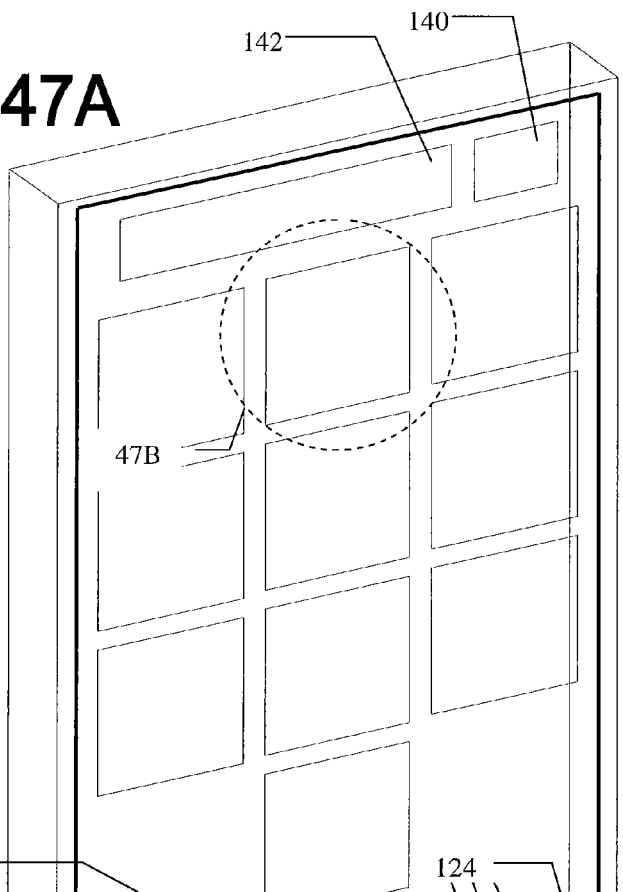
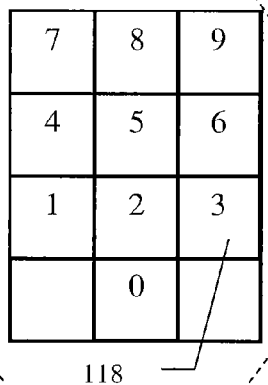
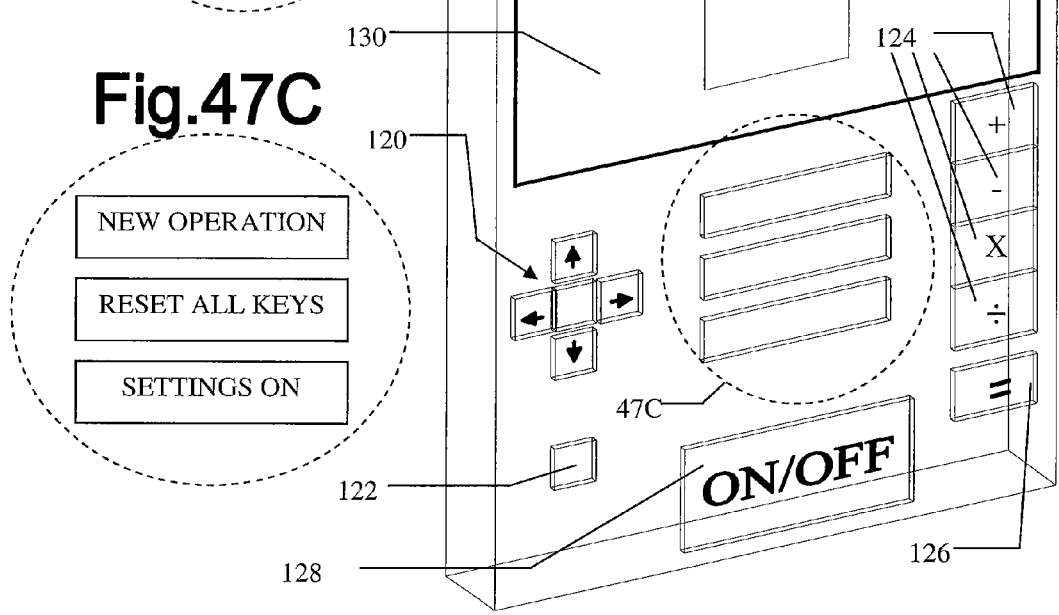
Fig.47A
Fig.47B
Fig.47C

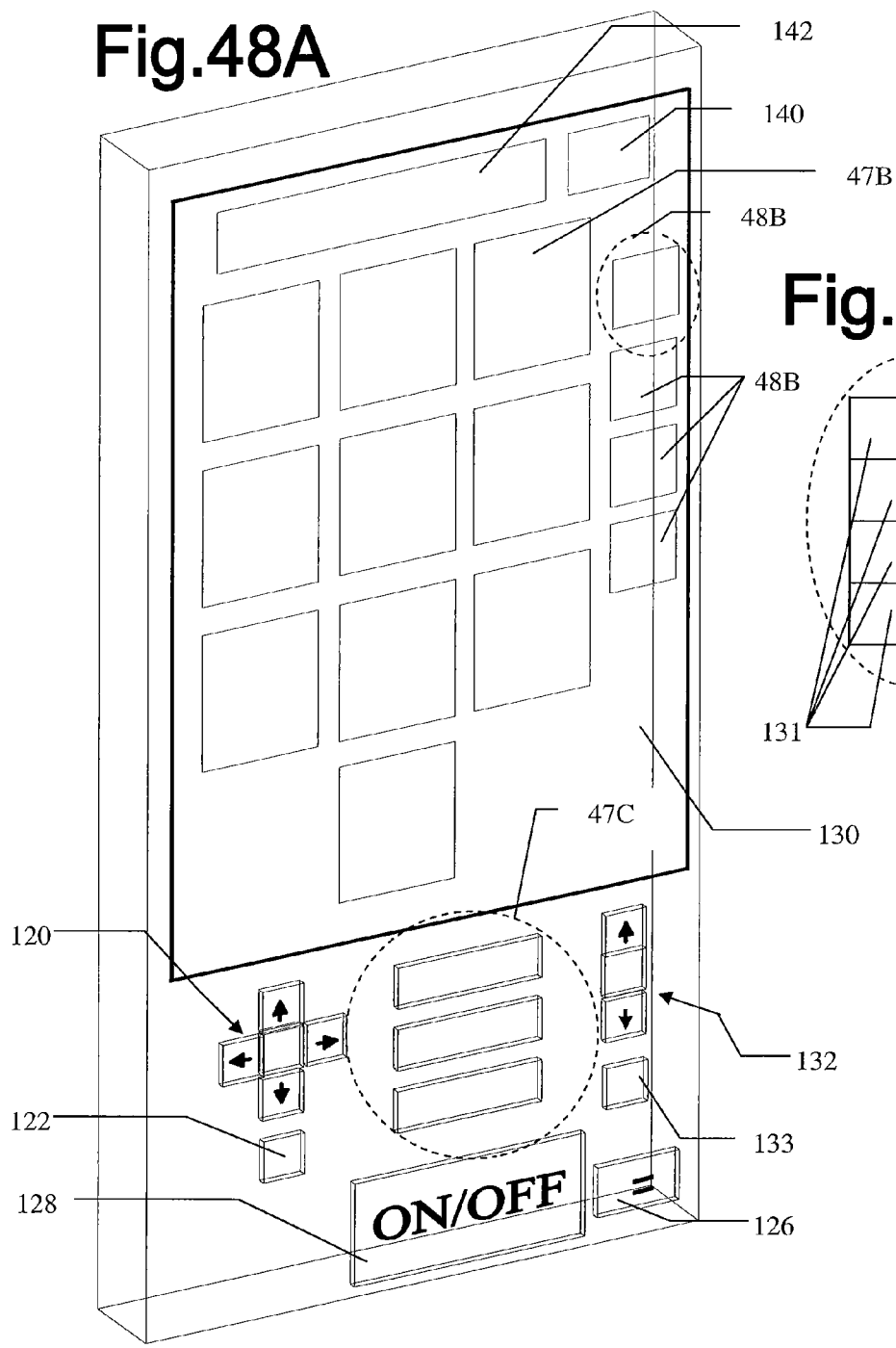

METHOD AND APPARATUS FOR TEACHING MATHEMATICS

CROSS REFERENCE TO RELATED APPLICATIONS

None

FEDERALLY SPONSORED RESEARCH

None

SEQUENCE LISTING OR PROGRAM

None

BACKGROUND OF THE INVENTION

1. Field of Invention

This invention generally relates to teaching systems and more particularly to electronic teaching systems for teaching mathematics.

2. Prior Art

Students need to learn basic math facts such as elementary sums, differences, products, and quotients. The prior art contains many types of teaching systems designed to aid learning these facts.

The "Little Professor," first produced by Texas Instruments in 1976, presented students with 16000 different arithmetic problems divided between the four basic math functions of addition, subtraction, multiplication, and division, and four different grade levels. The student could choose the function and level. The student was presented with problems like "3+5=?" If the answer was incorrect the child was presented with "EEE," otherwise a new problem was given. Unfortunately, since students play little or no role in ascertaining the answer other than to provide it, they quickly become bored, necessitating extrinsic rewards to maintain their attention. Also, as others have reported, "Such devices do not provide information to assist the student in performing the solution and thus function best for students who have already mastered the material. Such devices perform more of a testing or review function than an instruction function," Gill (1978).

The educational calculator disclosed in U.S. Pat. No. 4,126,949 to Simone (1978) requires a student to enter a problem and a supposed answer. The calculator then indicates, with a green or red light, the rectitude of the answer. "MATH MAGIC" introduced by Texas Instruments in 1977 functions in a similar manner, having the student enter the problem and the answer then indicating whether or not it was correct. These devices are an improvement because they promote activity by allowing the student to create the problems. However, they still suffer from the fact that a memorized answer is all that is called for and there is no instructional assistance.

Another teaching system is that disclosed in U.S. Pat. No. 4,114,294 to Marmer (1978). Marmer's device is essentially a calculator with delay circuitry allowing a student to guess an answer before the correct value is displayed. As stated in that disclosure, "the time competition stimulates and motivates the memorization of the proper answer." This system is similar to Simone's except that there is a timing system meant to motivate the student. However, the student's role is still memorization and the student is still passive.

Another teaching system is that disclosed in U.S. Pat. No. 4,117,607 to Gill (1978). As noted above, Gill saw a need to provide assistance to the student as he/she is doing the problem. In Gill's invention assistance is provide two ways, by supplying carry/borrow information and by allowing students to check multi-step problems one step at a time. Although the type of device disclosed by Gill is theoretically more useful than that disclosed by Manner, the student is still required to memorize each individual step. In particular there is only one correct answer for each step and the student must provide it. There is no versatility in what the student is allowed to do. There are no individualized or idiosyncratic approaches to the problem allowed by this device. The creativity in an active student's mind is neither being utilized nor encouraged. Again, the student will quickly become bored.

An instructional calculator disclosed in U.S. Pat. No. 4,225,932 to Hirano et al. (1980) attempts to help students learn by displaying each step in the arithmetic process. The advantages and limitations of this calculator are similar to those of Gill (1978).

Another teaching device is disclosed in U.S. Pat. No. 5,139,423 to McCormick, et al. (1992). This device makes many different activities available to the student but the type of correct response for the individual activities is still just the single correct one. An additional feature of this device is its ability to graphically represent values and operations to the student, but these visuals do not enable the student to tailor different correct approaches to the answer.

Other teaching machines, such as disclosed in U.S. Pat. No. 4,611,996 to Stoner (1986), provide extrinsic rewards for correct answers. Stoner's device allows a student to play an electronic game following an adequate response. Though the stated intent of the game is to motivate the student, the side effect of extrinsic rewards is that students learn that math does not have value in and of itself. In addition, the method of presentation, similar to Simone's (1978), makes it more of a testing device than a training one.

Following in the belief that math must be made interesting with unrelated games, LeapFrog Enterprizes, Inc. has produced a number of devices. One of these is the Mind Mania™ Math Clip. Mind Mania™ Math Clip contains three games with three levels. Typical of the content of these games is Math Invaders, an arithmetic copy of the arcade game Space Invaders™, where students shoot down numbers instead of spaceships. Another device is Turbo Twist™ Math where the novelty is a twisting action to select numbers. Turbo Twist™ Math also has timed and multi-player modes to increase student interest. Yet another device is Electronic Flash Magic™ flash cards in which a flick of the wrist can be used to enter values or check answers. Again, these are truly testing devices more than training and the interest factor is external to the mathematics.

There have also been disclosed in the patent literature many mathematical puzzles and games designed to encourage learning through play thereby avoiding the boredom problem. Some puzzles, like U.S. Pat. No. 6,585,585 to Fletcher (2003), are quite popular on the internet, but treat numbers as characters in a puzzle with no mathematics other than the digits themselves.

The math manipulative educational learning game disclosed in U.S. Pat. No. 6,609,712 to Baumgartner (2003) is typical of a good non-electronic math game. Students learn mathematics in a manner which allows many different correct approaches to problems, thereby providing good outlets for creativity. The main limitation for games such as these is that the game requires a human partner with greater knowledge than the student. In Baumgartner's game this knowledgeable partner is called the Game Master. The game is not designed to be self teaching.

In addition to basic math facts students need to learn number sense. Number sense is "an awareness and understanding about what numbers are, their relationships, their magnitude, the relative effect of operating on numbers, including the use of mental mathematics and estimation," (Fennel and Landis, 1994). There are no systems so far disclosed which specifically target number sense. The closest any disclosed method or device comes to teaching number sense is U.S. Pat. No. 5,638,308 to Stokes (1997). The disclosed device is a calculator with keys which can be selectively disabled. A student is presented with a math problem where one of the keys which would typically be used to solve the math problem has been disabled. The student must solve the problem by replacing the disabled key with a combination of the enabled keys and operations. Unfortunately there are a number of drawbacks to this system. Firstly, the level of mathematical sophistication required to use the device is often higher than the level of the number sense skill the device is attempting to reinforce. To quote from his disclosure, "As a very simple example, students may be instructed to disable the 8 key, then to solve the problem 8+18. The student can mentally factor each number in such a way as not to require use of the 8 key. The student thus arrives at (2.times.4)+(2.times.9). The student can use the distributive property to factor out the like 2's; 2.times.(4+9), which can be expressed as 2.times.13=26." The number sense properties involving the "8" are much lower than the algebraic concepts of the distributive property. Secondly, with no disclosed system of hints or clues, there is inadequate feedback for a confused student. A student could be stuck on a problem for a long time and get quite frustrated. Lack of good feedback is a serious drawback when the goal is to get students to enjoy the process or to work independently. Thirdly, once a student found one way to replace a number, he/she may repeatedly use it and gain very little from additional problems. Additional problems become tedious and unproductive, another undesirable outcome. Fourthly, since the device is not a system of teaching math but merely a calculator, problems must still be separately provided by the teacher to the student. Poorly chosen problem sets would drastically reduce the effectiveness of the device. It is the set of problems chosen, much more than the device itself, which will determine its effectiveness. As a result, this device requires extensive teacher training to achieve the desired outcome.

Therefore a need has arisen for a teaching system which promotes an active role in learning, where the reward or satisfaction is intrinsic to the mathematics, and which helps students develop number sense.

OBJECTS AND ADVANTAGES

The present invention provides a system to teach mathematics via an interactive puzzle. In the simplest application of the preferred embodiment a student chooses two of ten value positions, each associated with an unknown digit from zero to nine, and an operation, either addition, subtraction, multiplication, or division. The student is then presented with the resulting sum, difference, product, or quotient, and it is the student's task to deduce the digit associated with each of the two positions. The student may immediately check his/her deductions against the correct values or try additional operations before verifying these deductions. The process is repeated until all ten digits have been found, at which time the positions reset. By offering a choice of operations, some of which are commutative, and requiring students to "work backwards" from a result and determine which numbers could have generated such a result, the invention induces the student to actively create his/her own path to the solution. Working backwards requires a student to consider both the basic properties of numbers such as size or factors, as well as a wide range of ways in which different numbers and different operations can interact. There are many possible paths a student can form that lead to finding the positions of all ten digits. The satisfaction is intrinsic because it is exciting to find all ten digits and to continually devise new ways to do so.

Accordingly, several objects and advantages of the present invention are the active role the student plays in determining the hidden values, the multitude of paths the student may take to the correct answer, the intrinsically mathematical nature of the puzzle, and the development of number sense as the puzzle is solved.

It is an object and advantage to provide a virtually unlimited set of unique trials allowing students to practice as much as they want on new puzzles.

It is an object and advantage to provide sufficient feedback to allow students to work independently.

It is an object and advantage to encourage the student to consider entire sets of solutions, for example, the set of all the combinations of pairs of digits which sum to five, thus promoting a better understanding of the relationships among numbers.

It is an object and advantage to encourage the student to consider sets of solutions promoting a better understanding of the concept of sets.

It is an object and advantage to encourage the student to understand set intersection by concurrently considering multiple sets of solutions. Having chosen two value positions and obtained a result of twelve with multiplication and seven with addition, the student must consider the set of digits which has a sum of seven intersected with the set of digits which has a product of twelve. The correct deduction yields the set containing the elements three and four.

It is an object and advantage to allow students to choose their own approach to solving the puzzle thereby giving them a sense of ownership and accomplishment.

It is an object and advantage to give students control over the degree of feedback. Students may obtain the results from just one operation with one pair of value positions or results from multiple operations with multiple value positions before guessing their answers. By not requiring that they guess every time they receive new information, they operate at a level of challenge where they are comfortable.

It is an object and advantage to visually keep track of both prior incorrect responses and possible correct answers. Since students can see which incorrect responses they have already made as well as the remaining possible correct responses, there is little memory load for those who have difficulty remembering.

It is an object and advantage to provide programmable settings whereby the teacher can specify the operations available to the student, thus requiring the student to improve specific skills.

It is an object and advantage to provide programmable settings whereby the teacher can specify the format of the answer thereby allowing the teacher to adjust the level of the puzzle to the level of the student.

It is an object and advantage to use an embodiment wherein the puzzle is combined with a traditional calculator allowing the student to test various value combinations before trying them on the puzzle.

It is an object and advantage to use an embodiment wherein the puzzle is combined with a traditional calculator allowing for a low cost puzzle-calculator device which can be used separately as a puzzle or a calculator.

It is an object and advantage to use an embodiment in which the value of at least one of the value positions is provided to the student to be used in conjunction with the unknown value positions thereby simplifying the puzzle for beginning or weaker students.

It is an object and advantage to use an embodiment in which the student is required to choose at least three value positions and two operations at a time thereby providing an environment in which the student can investigate the algebraic concept called order of operations.

Still further objects and advantages will become apparent from consideration of the ensuing description and drawings.

SUMMARY

The present invention provides a system to teach mathematics via an interactive puzzle. The student must deduce the values of the positions in the puzzle by using sums, differences, products, or quotients of the positions. The system is tailored by the teacher for individual needs by virtue of programmable settings.

DRAWINGS

Figures

Figure 21:
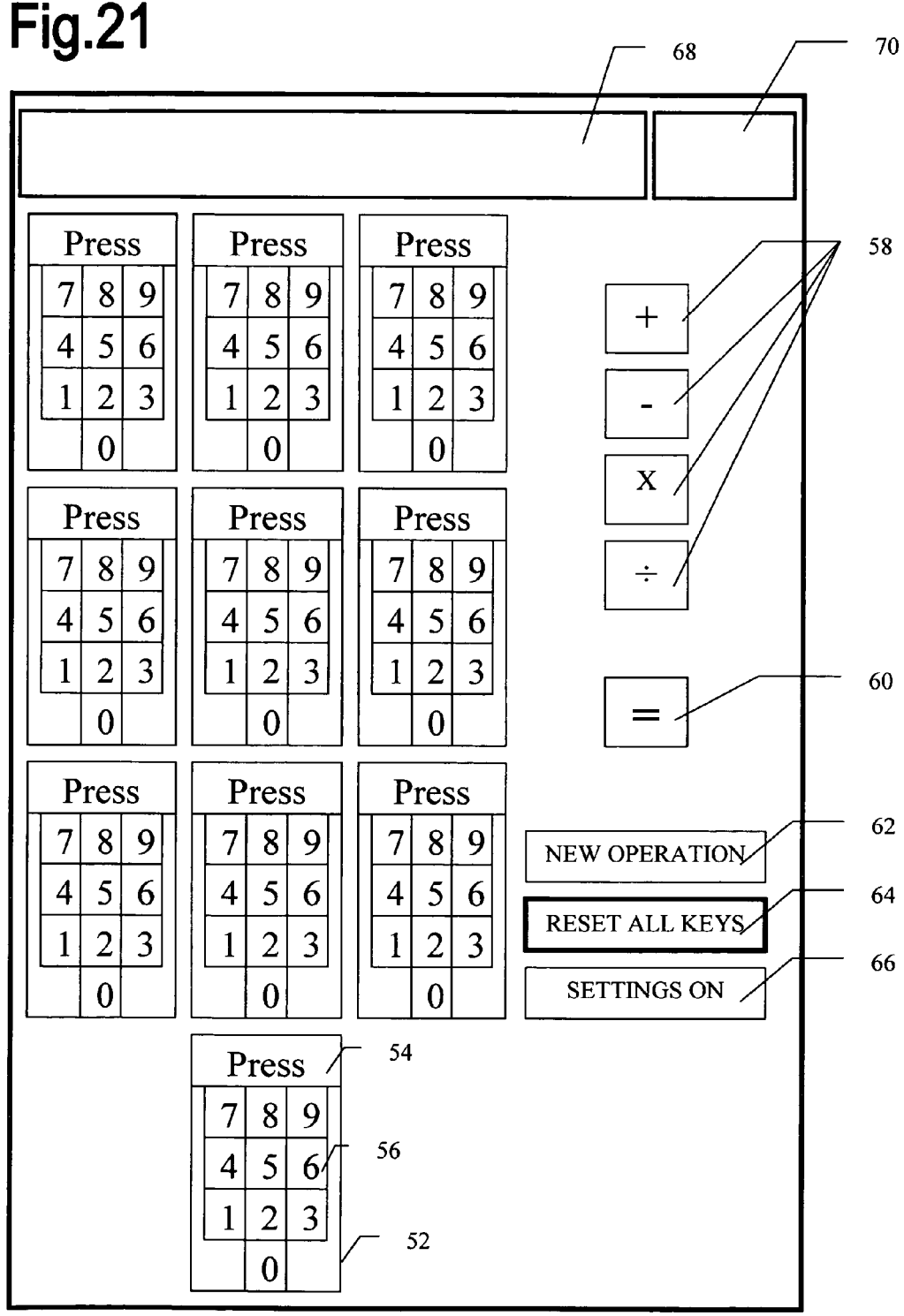
FIG. 21 shows the puzzle view after it has been reset to begin again. This is a duplicate of FIG. 1.
Figure 22:
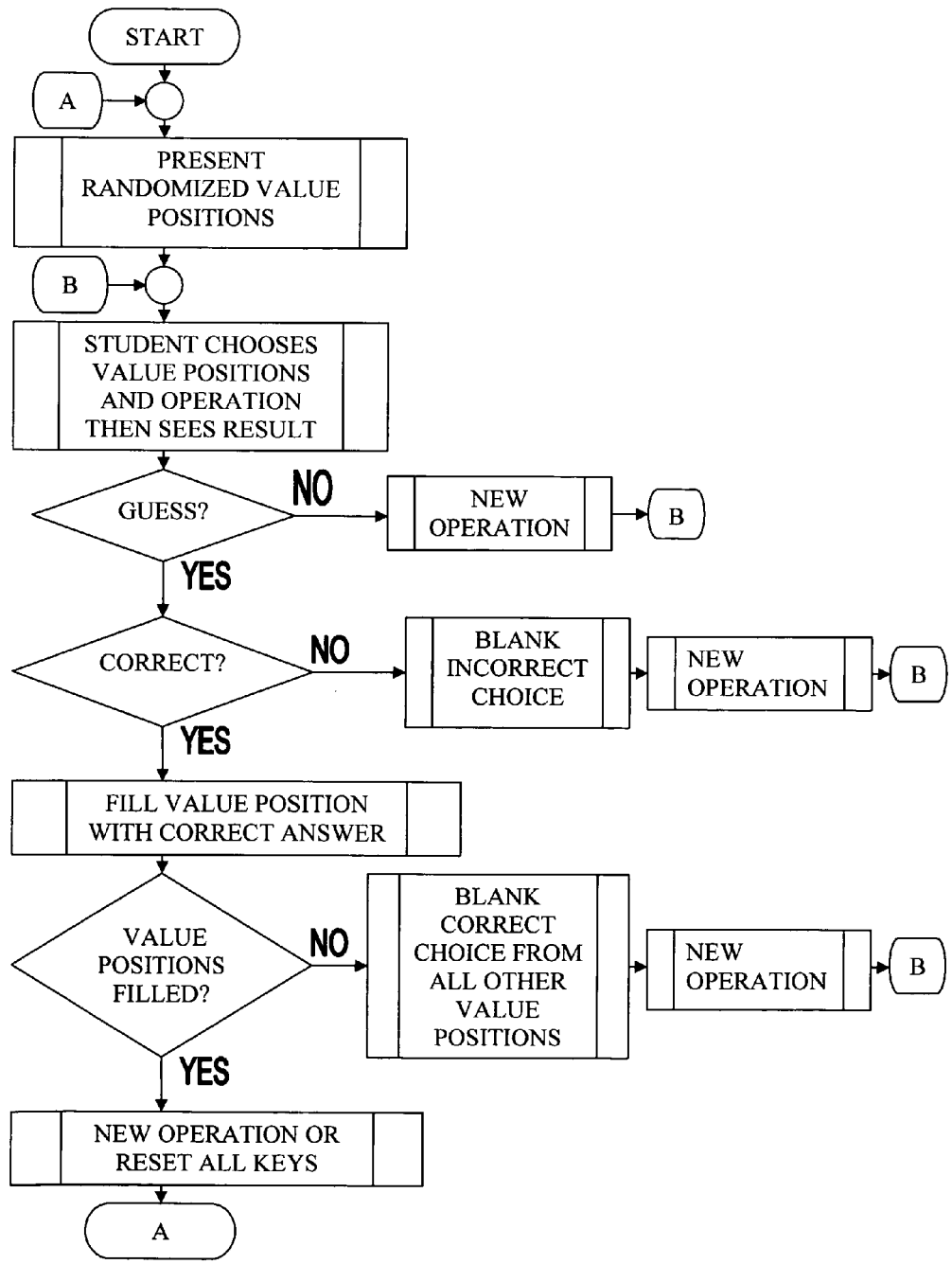

FIG. 22 contains a flowchart summarizing FIGS. 2-21.

FIGS. 23-26 show basic programmable settings being used by the teacher.

FIG. 27 shows the puzzle view as prepared by the settings seen in FIG. 26.

Figure 28:
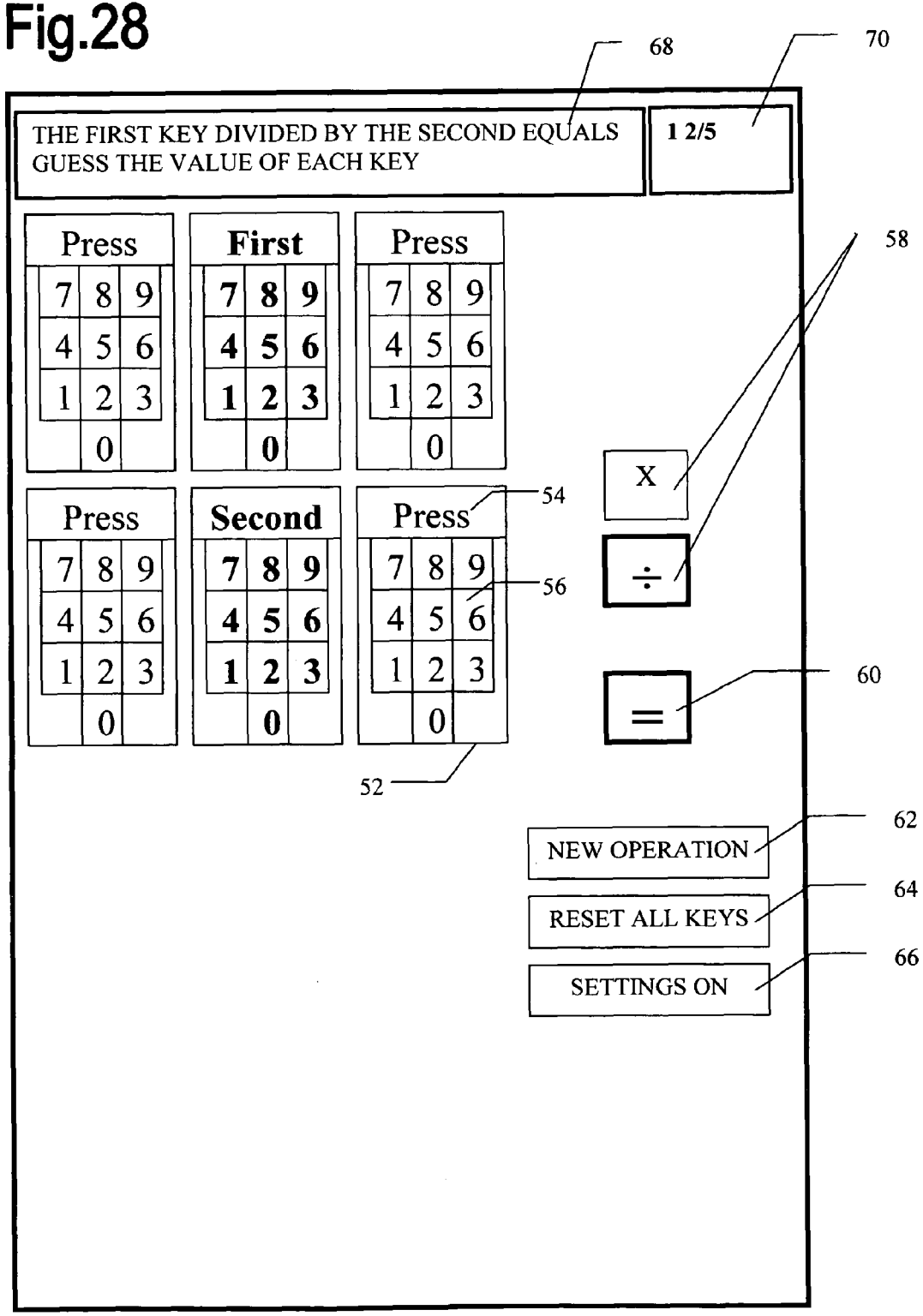

FIG. 28 shows one of the steps in solving the puzzle of FIG. 27.

FIG. 29 shows the settings view with new settings.

Figure 30:
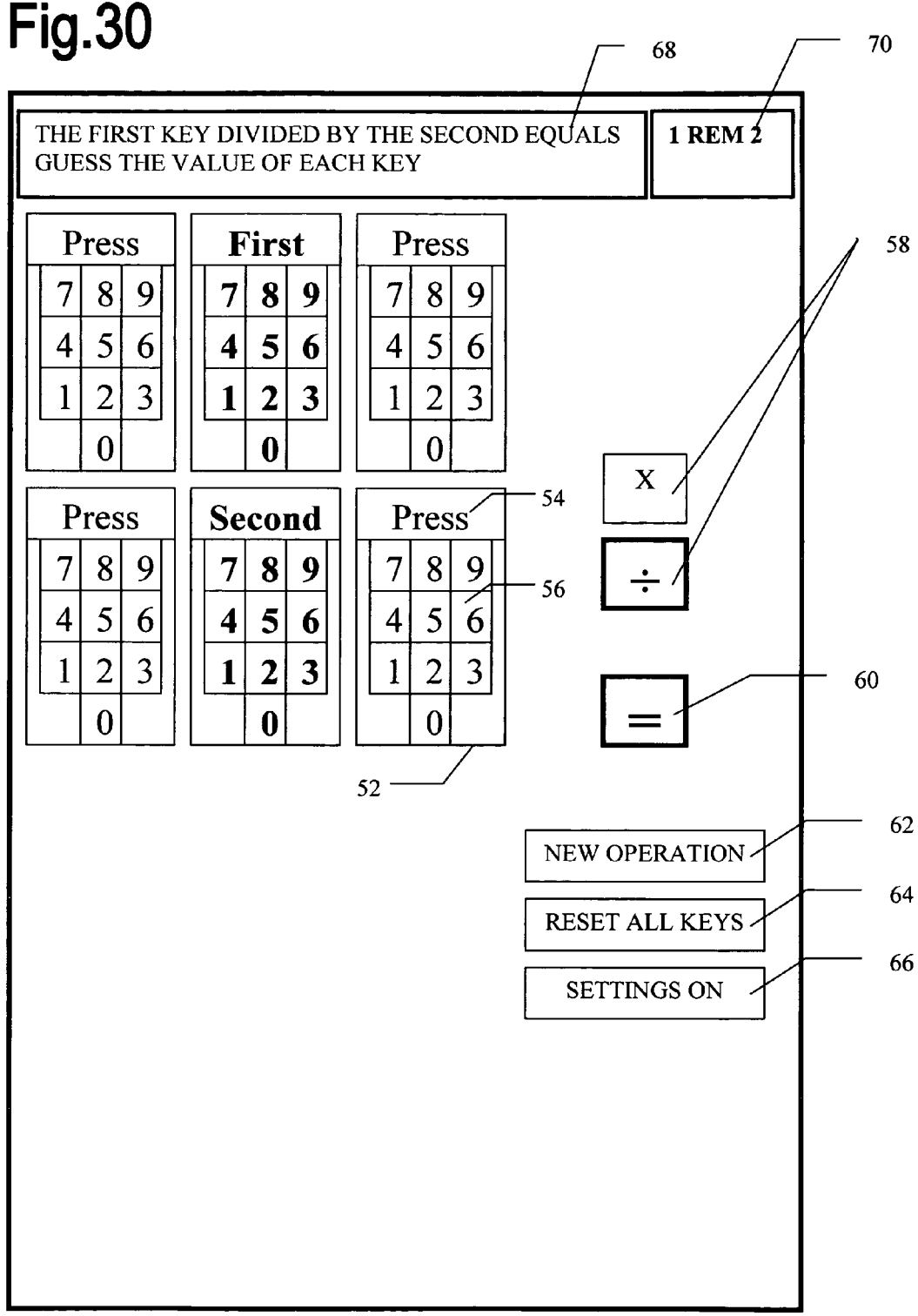

FIG. 30 shows one of the steps in solving the puzzle as prepared by the settings of FIG. 29.

Figure 31:
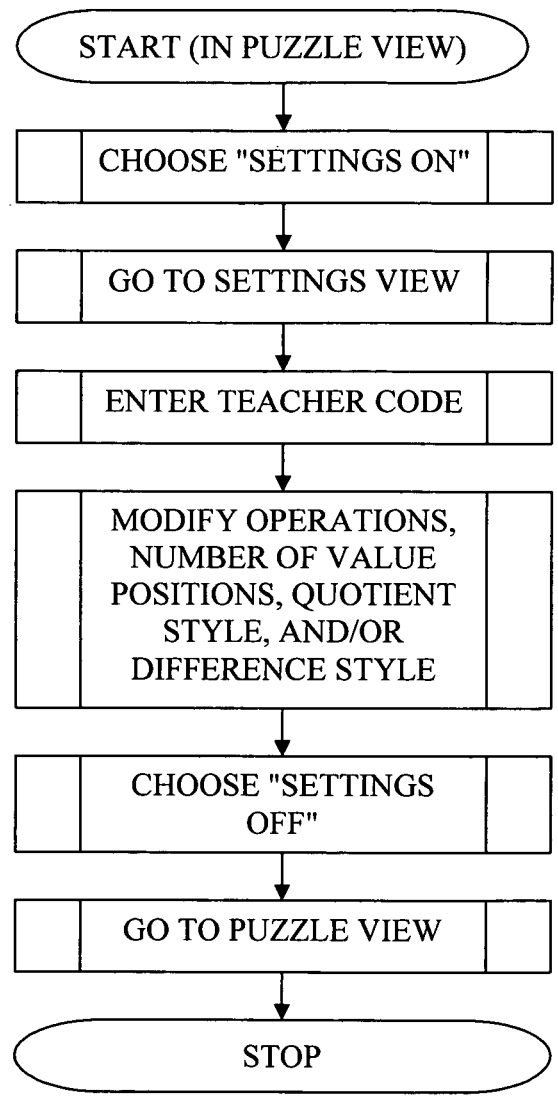

FIG. 31 contains a flowchart summarizing the operation of the programmable settings.

Figure 32:
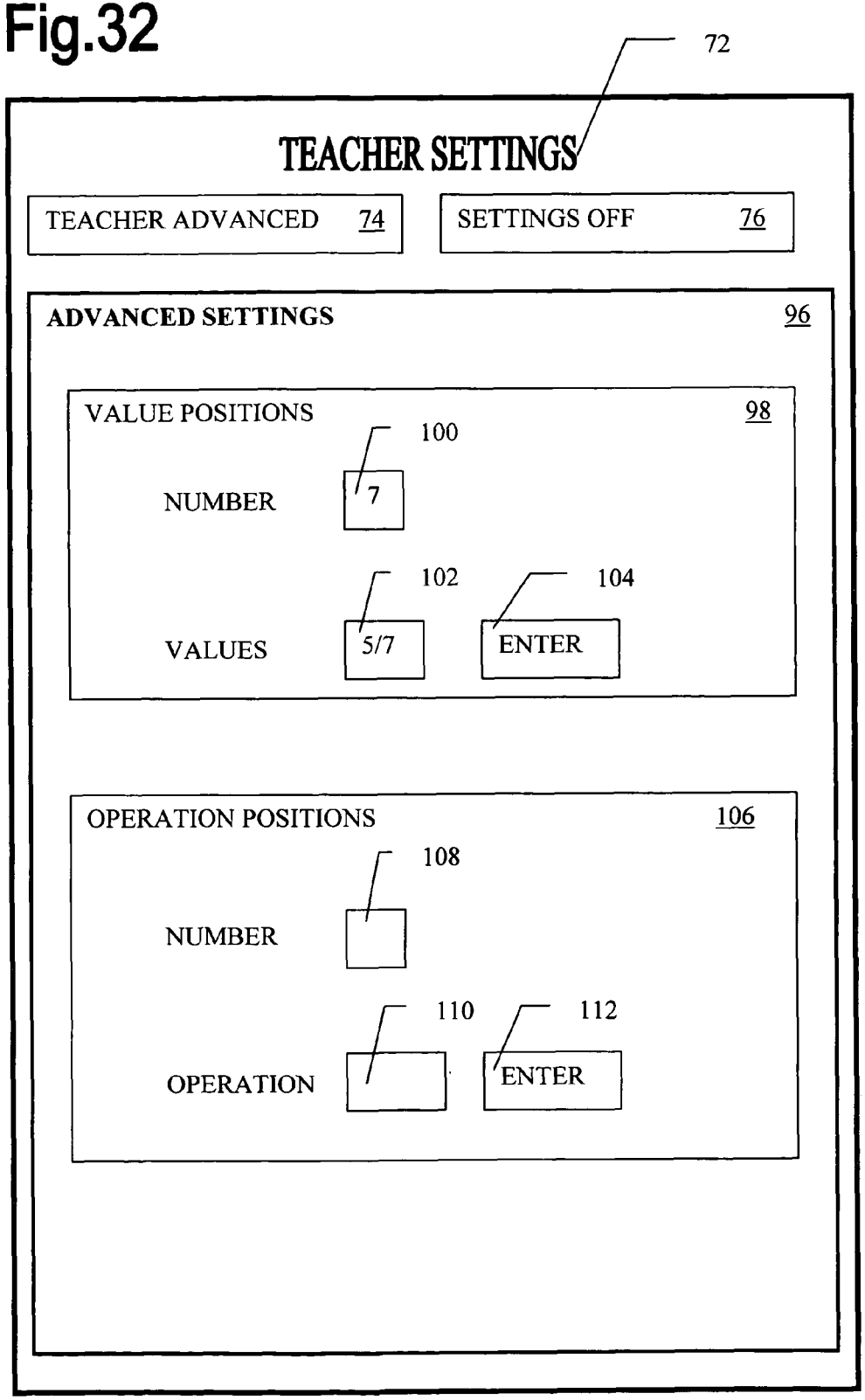

FIG. 32 shows advanced programmable settings being used by the teacher.

Figure 33:
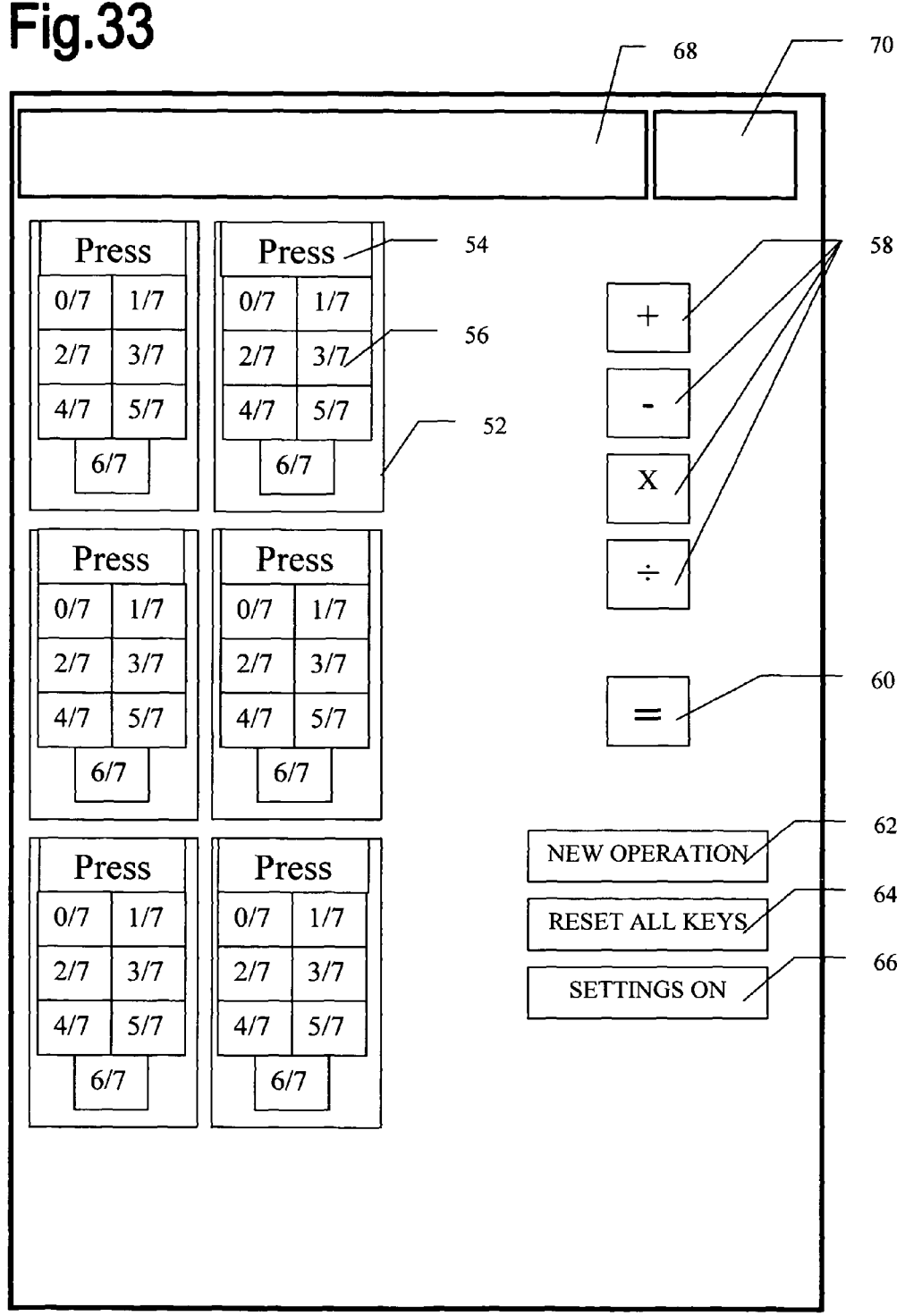

FIG. 33 shows the puzzle view as prepared by the settings seen in FIG. 32.

Figure 34:
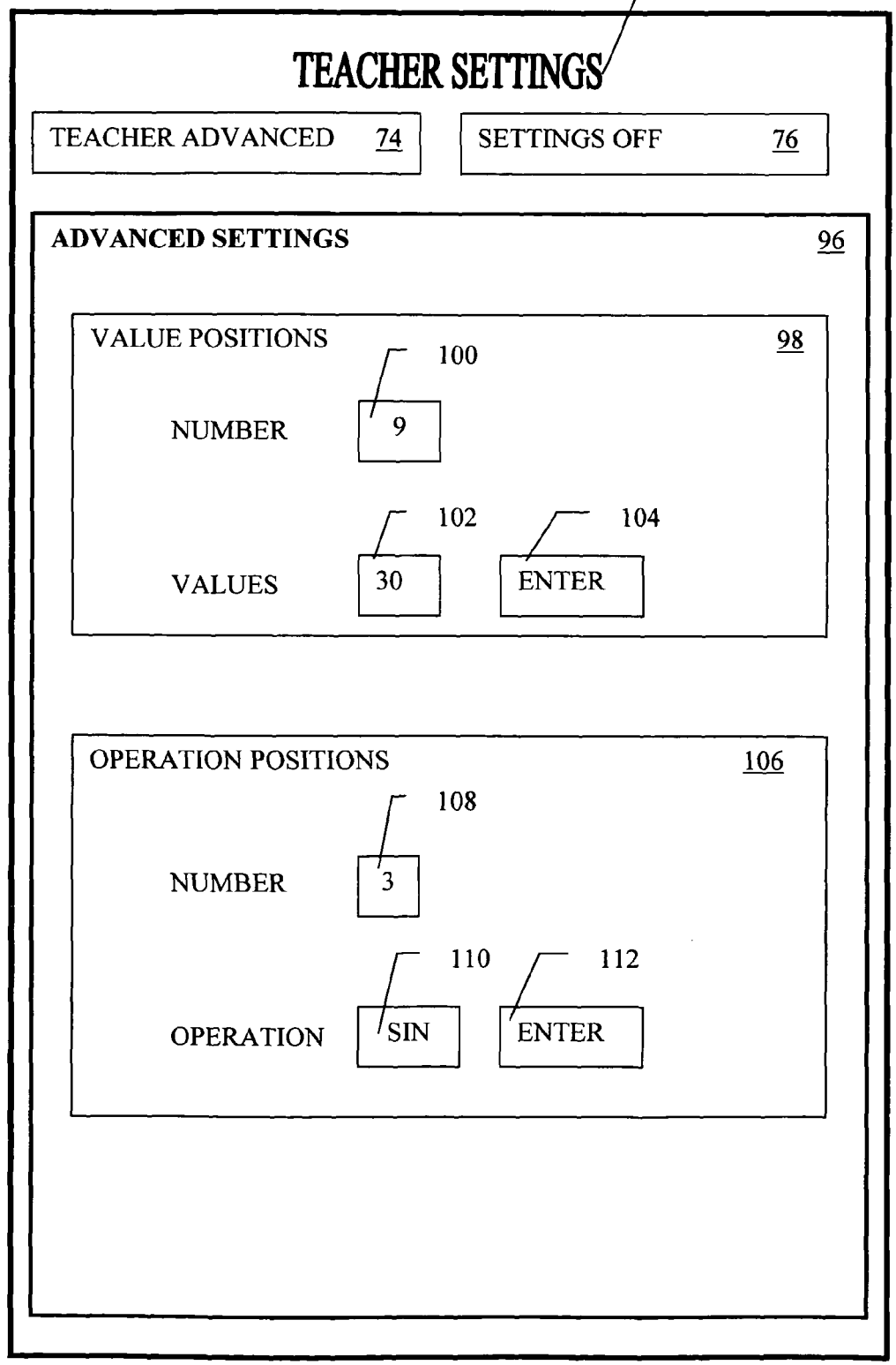

FIG. 34 shows another set of advanced programmable settings.

Figure 35:
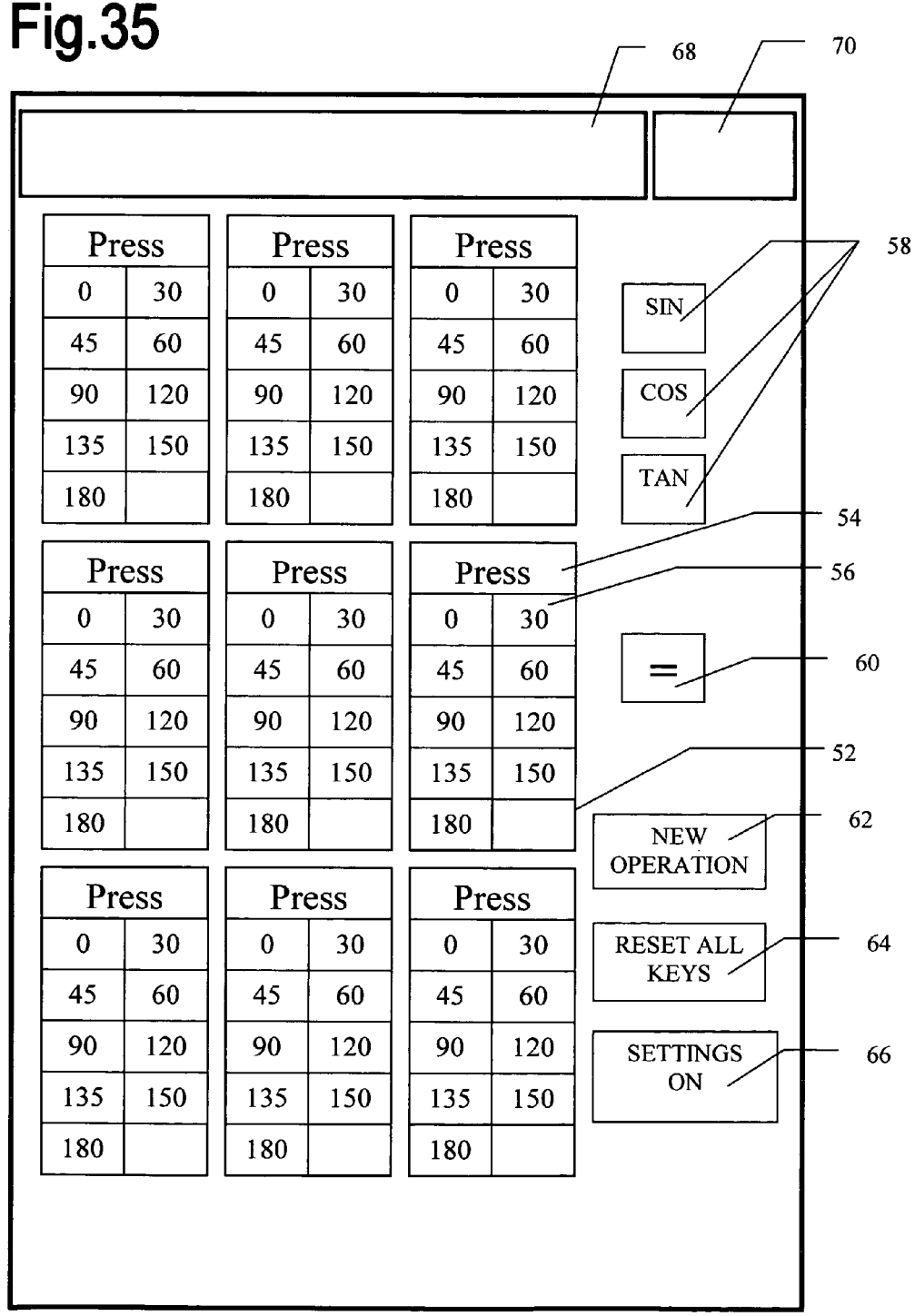

FIG. 35 shows the puzzle view as prepared by the settings seen in FIG. 34.

Figure 36:
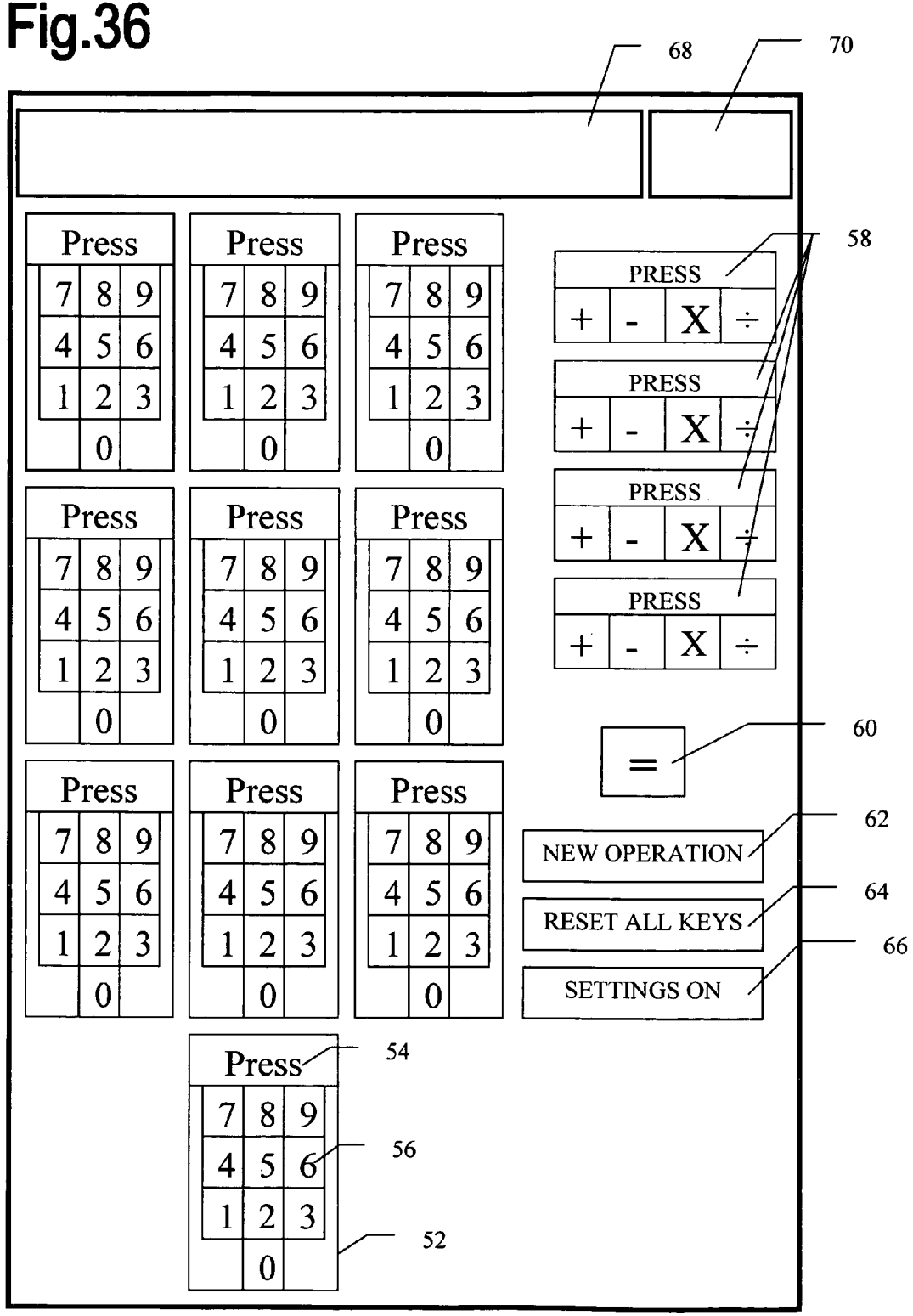

FIG. 36 is a display of another embodiment of the teaching method.

Figure 37:
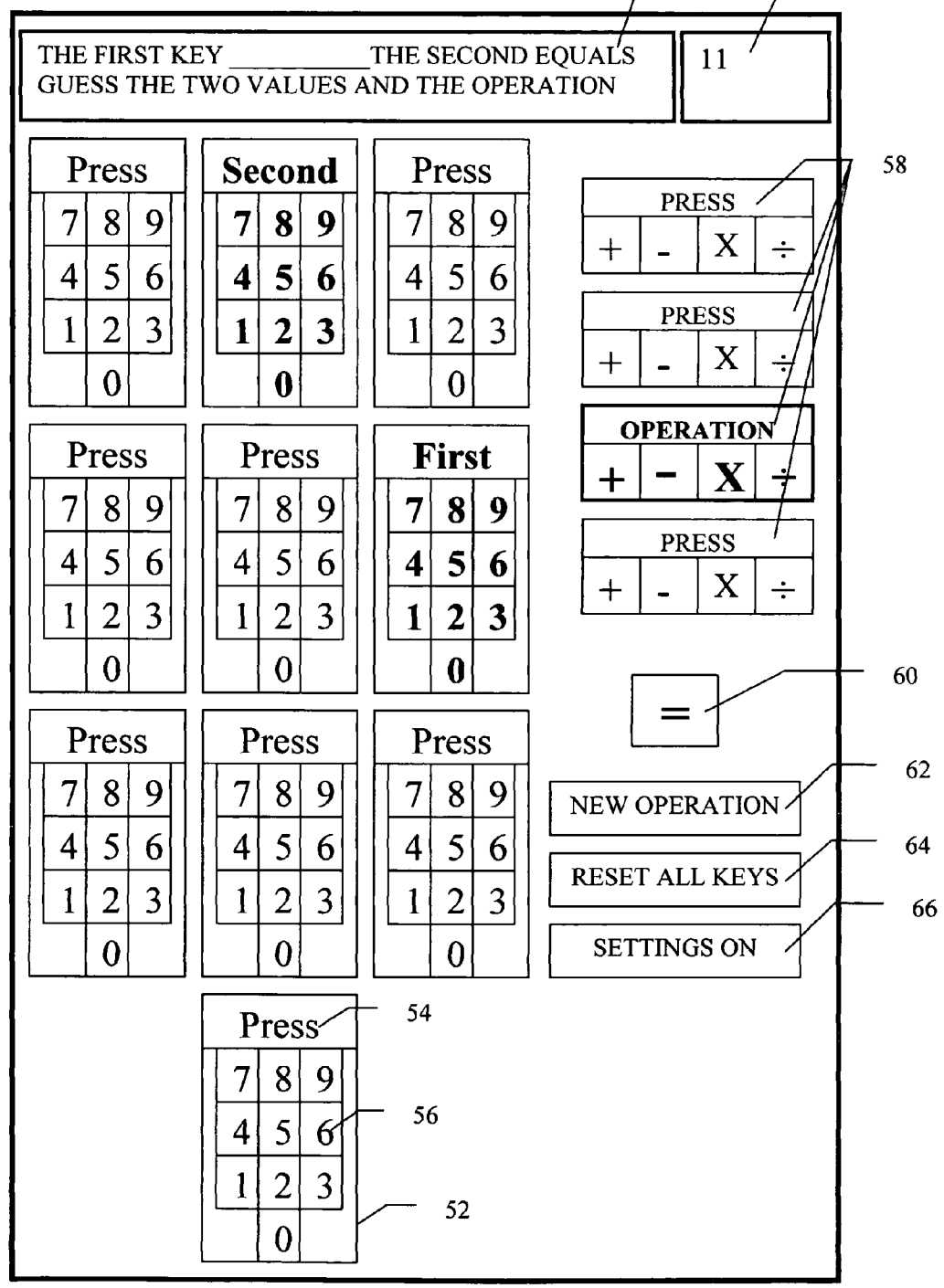
Figure 38:
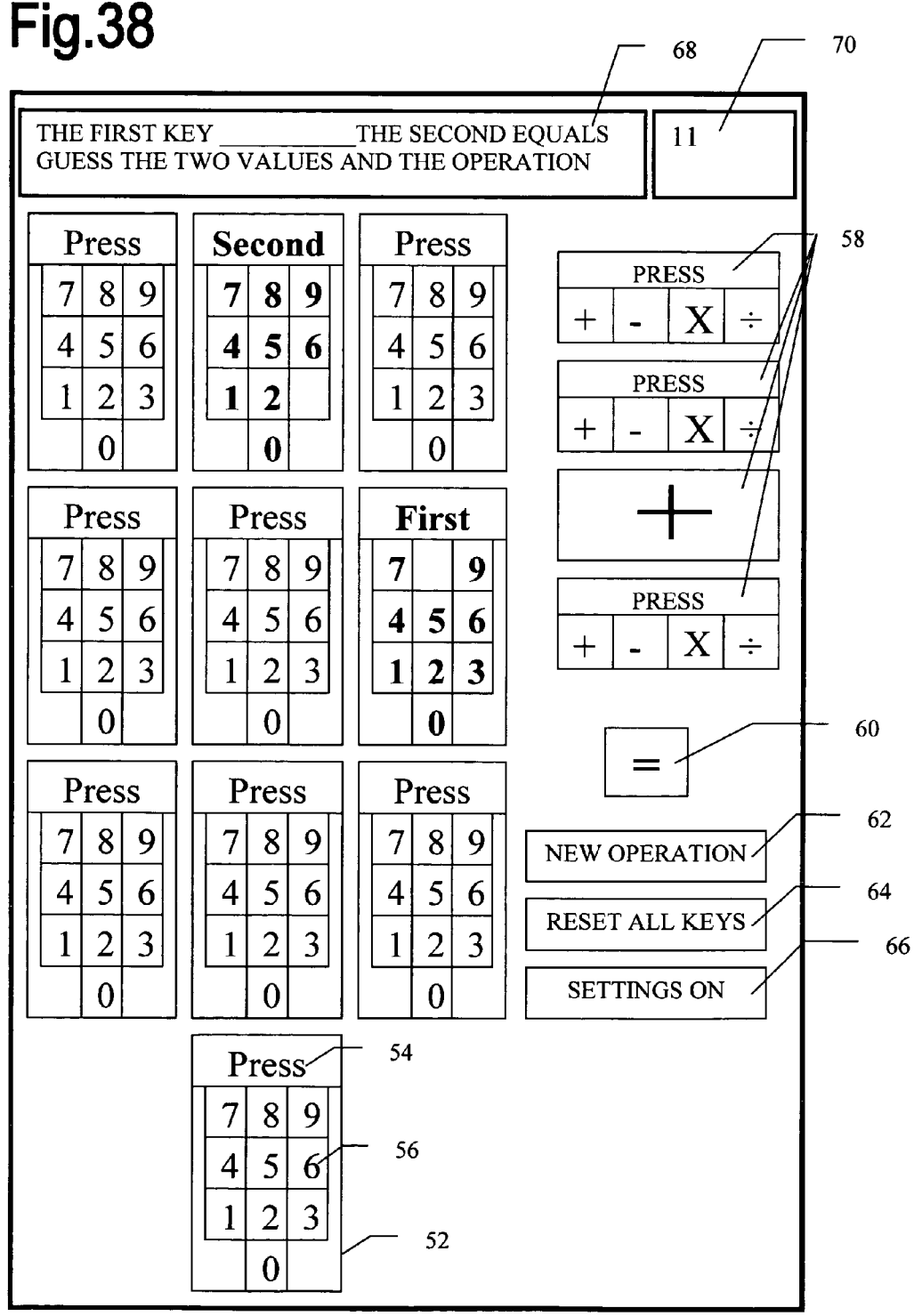
Figure 39:
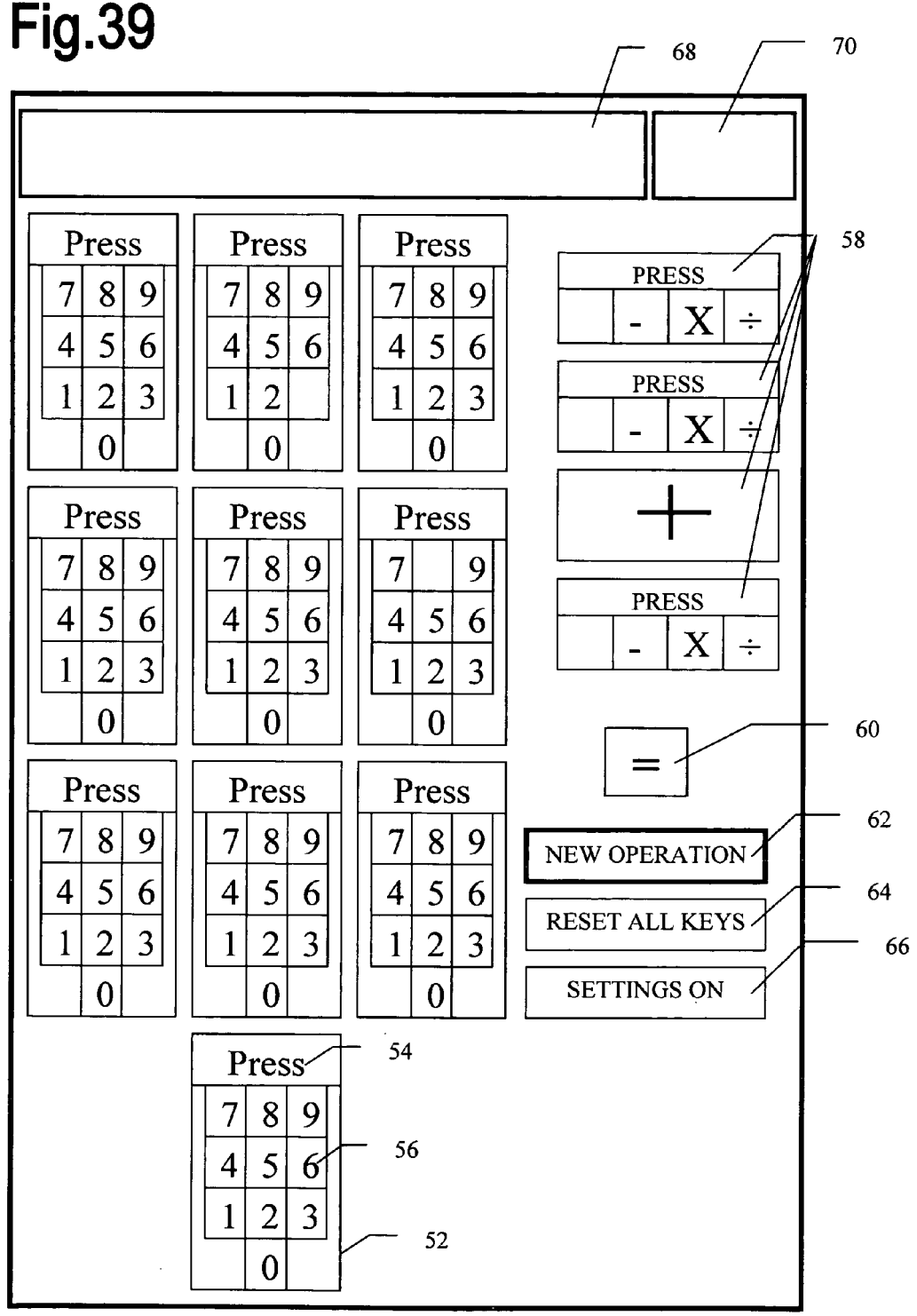

FIGS. 37-39 show steps in solving the puzzle of FIG. 36.

Figure 40:
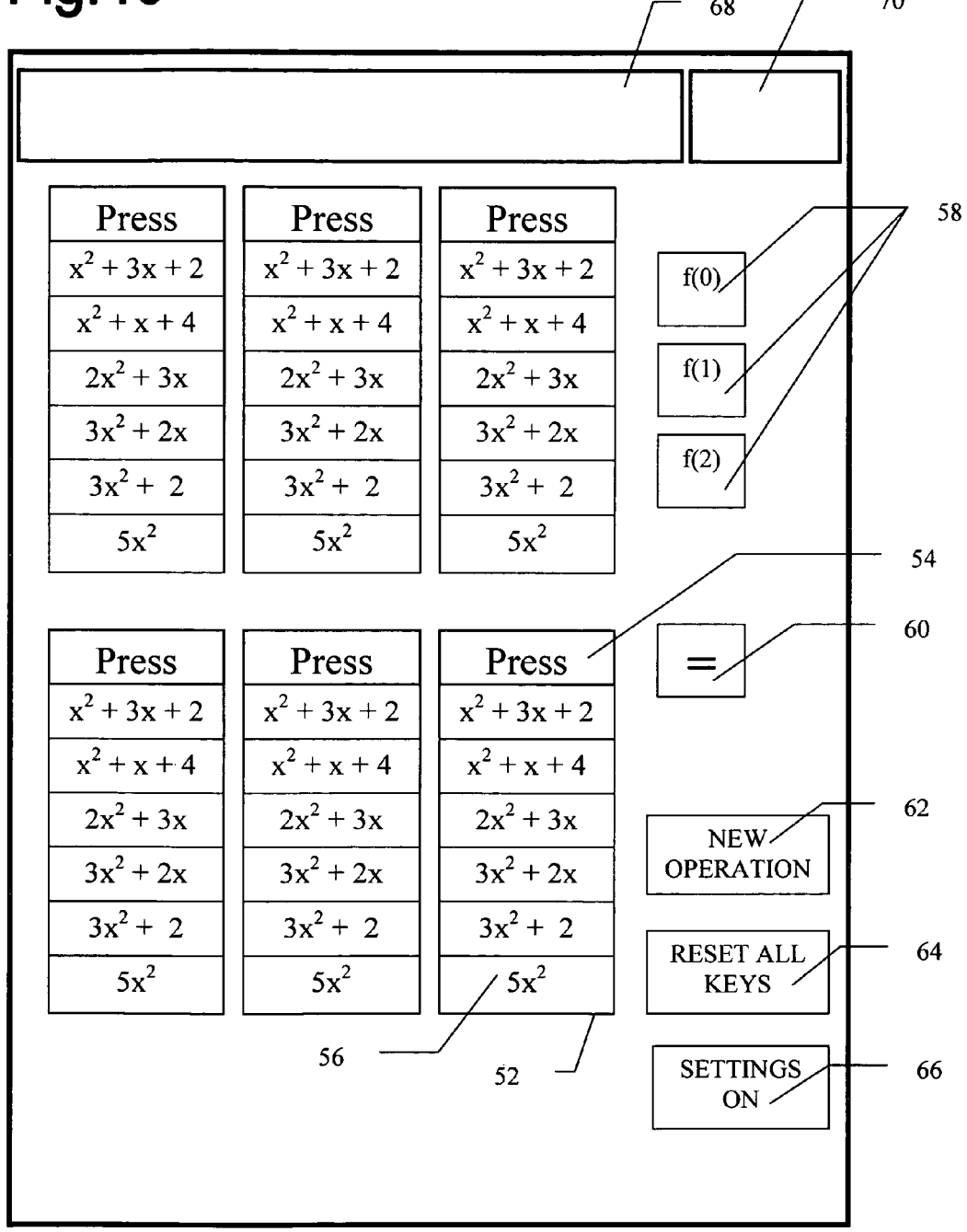

FIG. 40 is a display of another embodiment of the teaching method.

Figure 41:
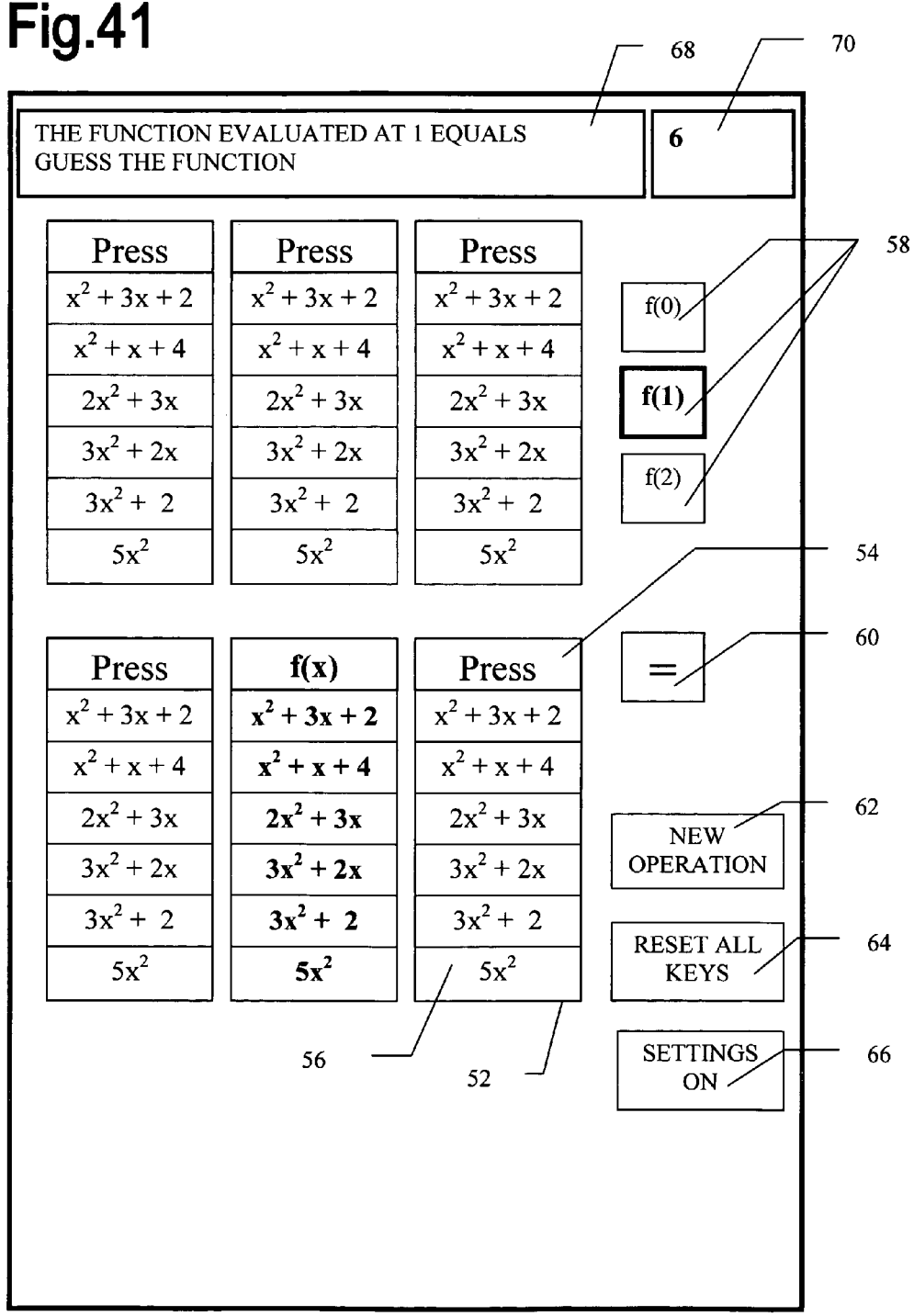

FIG. 41 shows one of the steps in solving the puzzle of FIG. 40.

Figure 42:
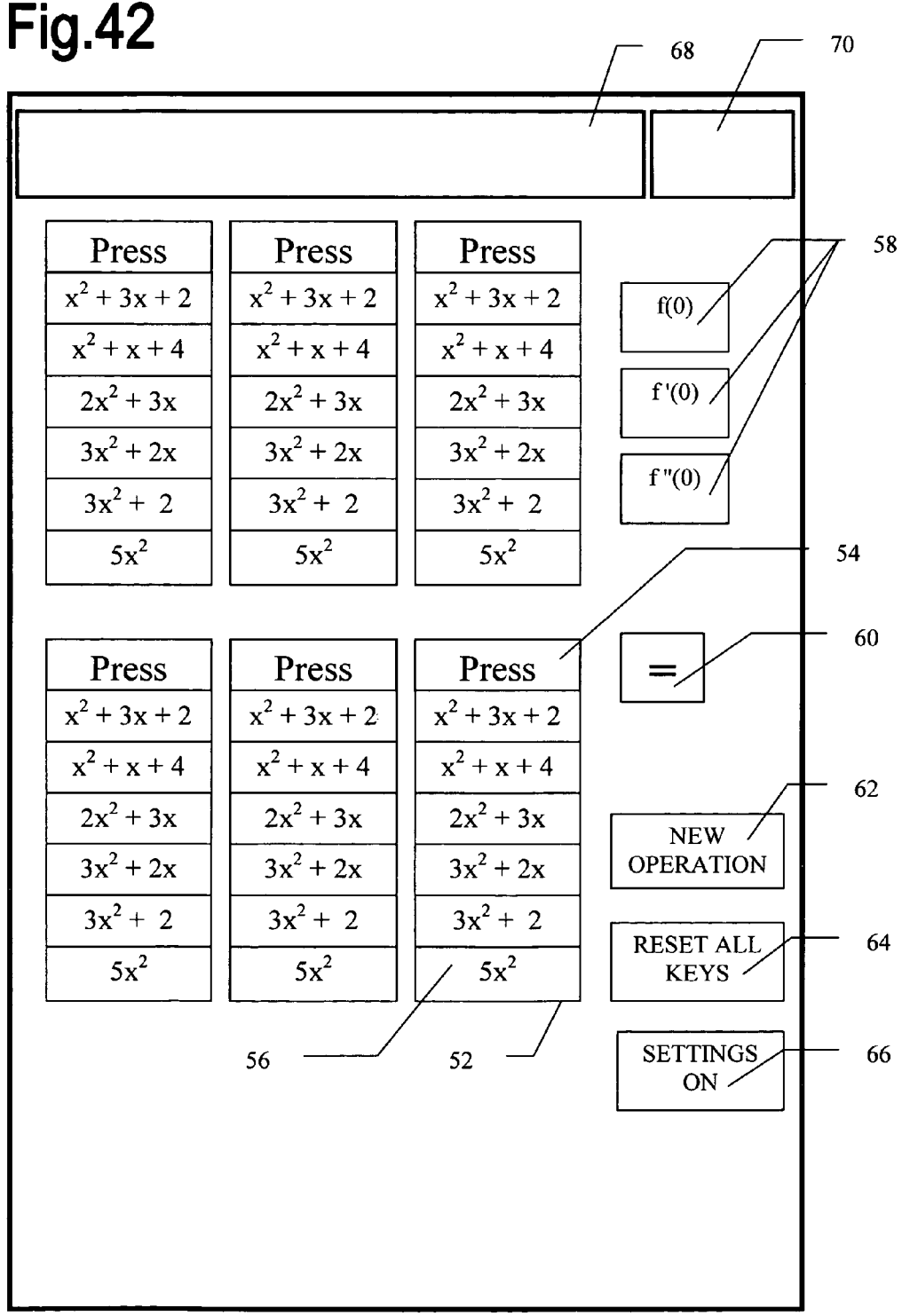

FIG. 42 is a display of another embodiment of the teaching method.

Figure 43:
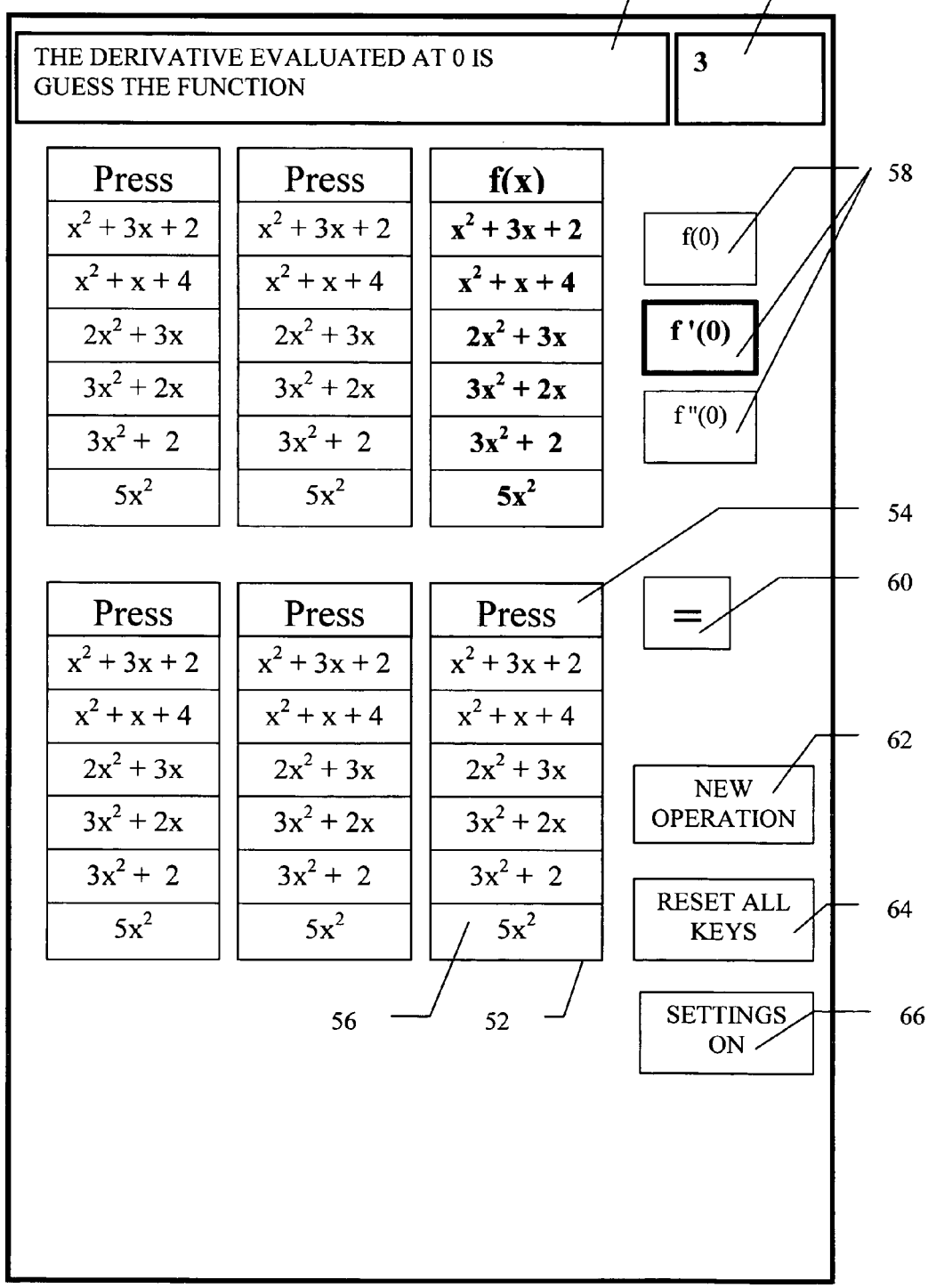

FIG. 43 shows one of the steps in solving the puzzle of FIG. 42.

Figure 44:
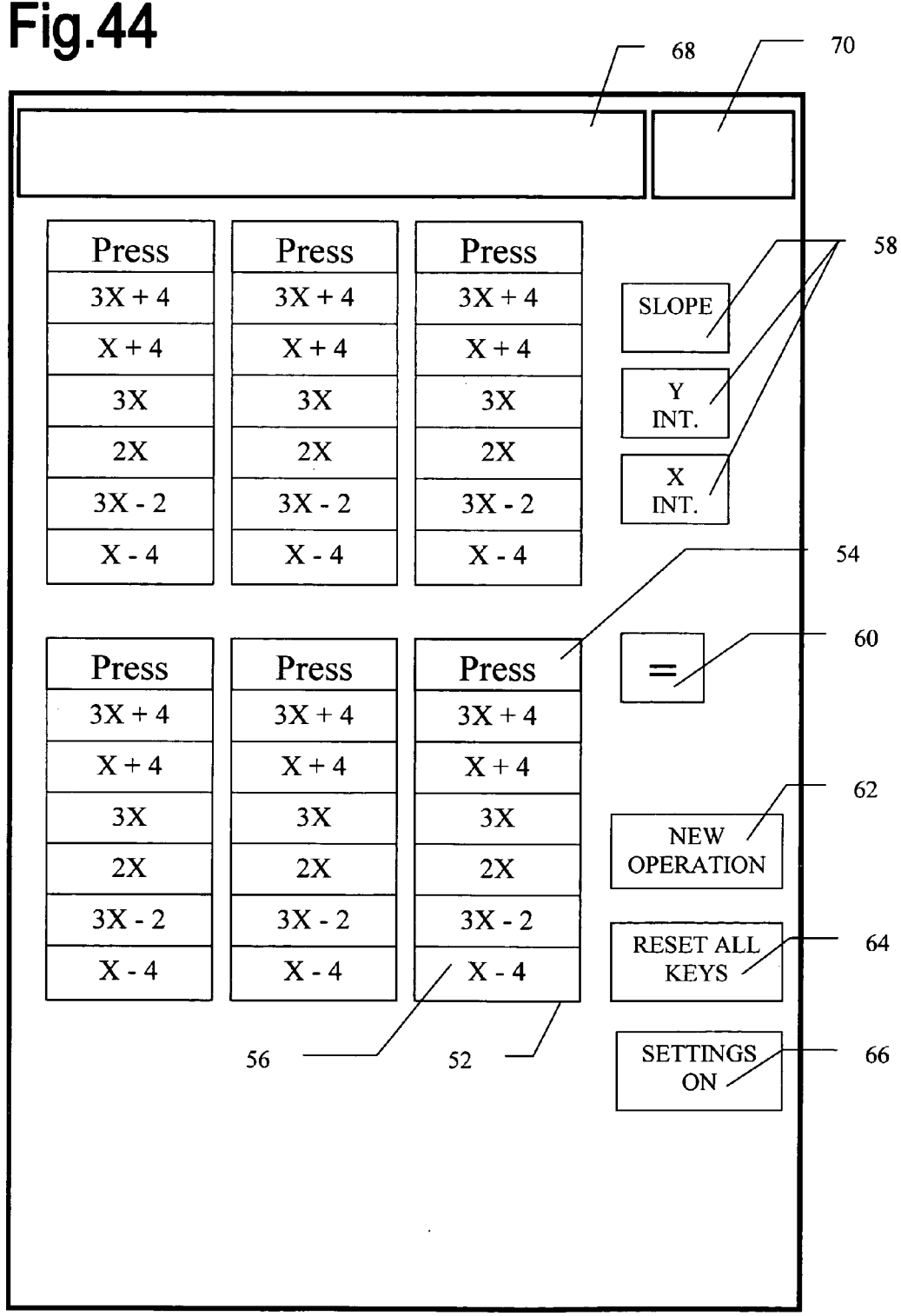

FIG. 44 is a display of another embodiment of the teaching method.

Figure 45:
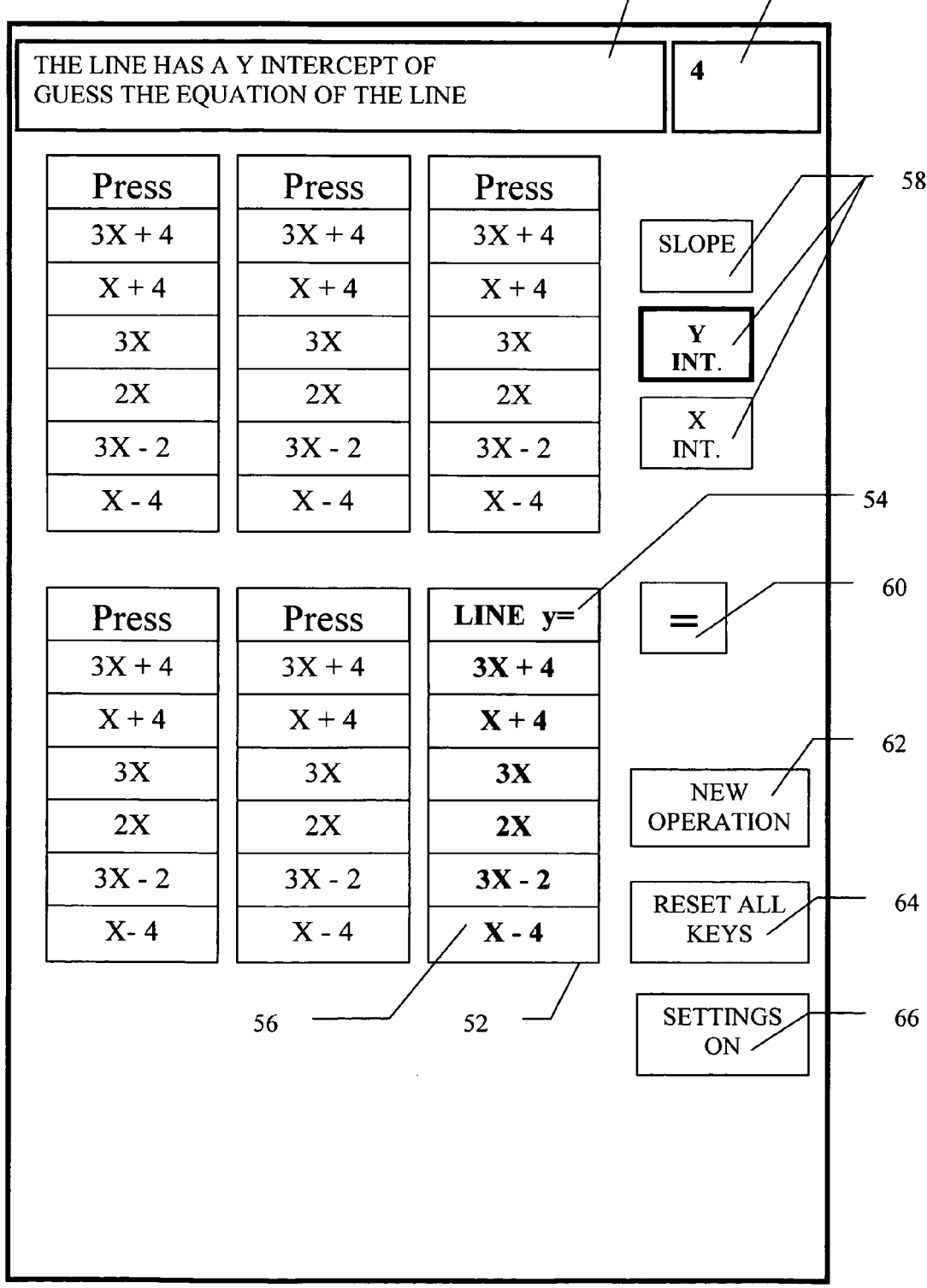

FIG. 45 shows one of the steps in solving the puzzle of FIG. 44.

Figure 46:
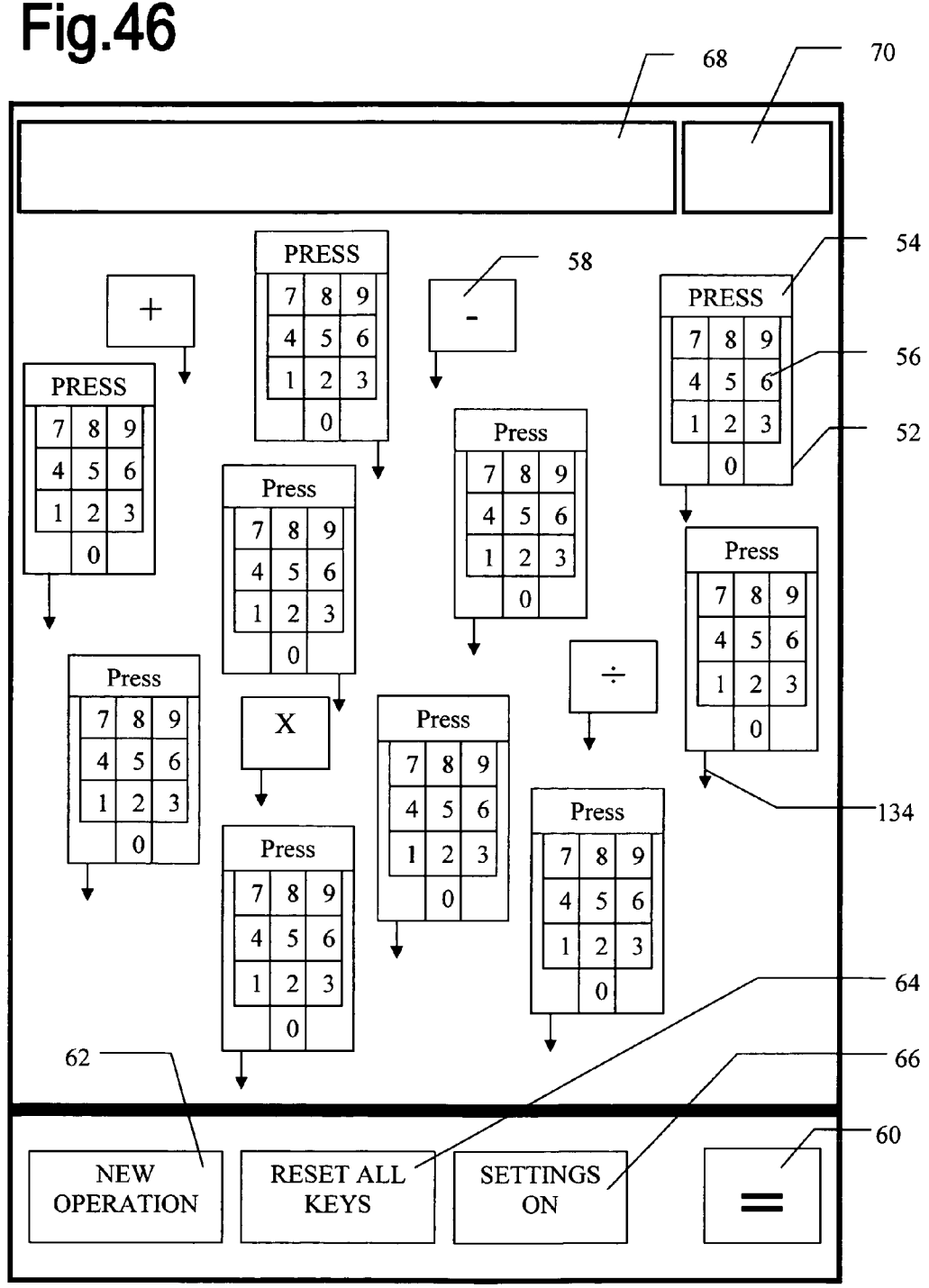

FIG. 46 is a display of another embodiment of the teaching method.

FIGS. 47A-47C show an embodiment of the electronic apparatus for the teaching of mathematics.

FIGS. 48A and 48B show another embodiment of the electronic apparatus for the teaching of mathematics.

Figure 49:
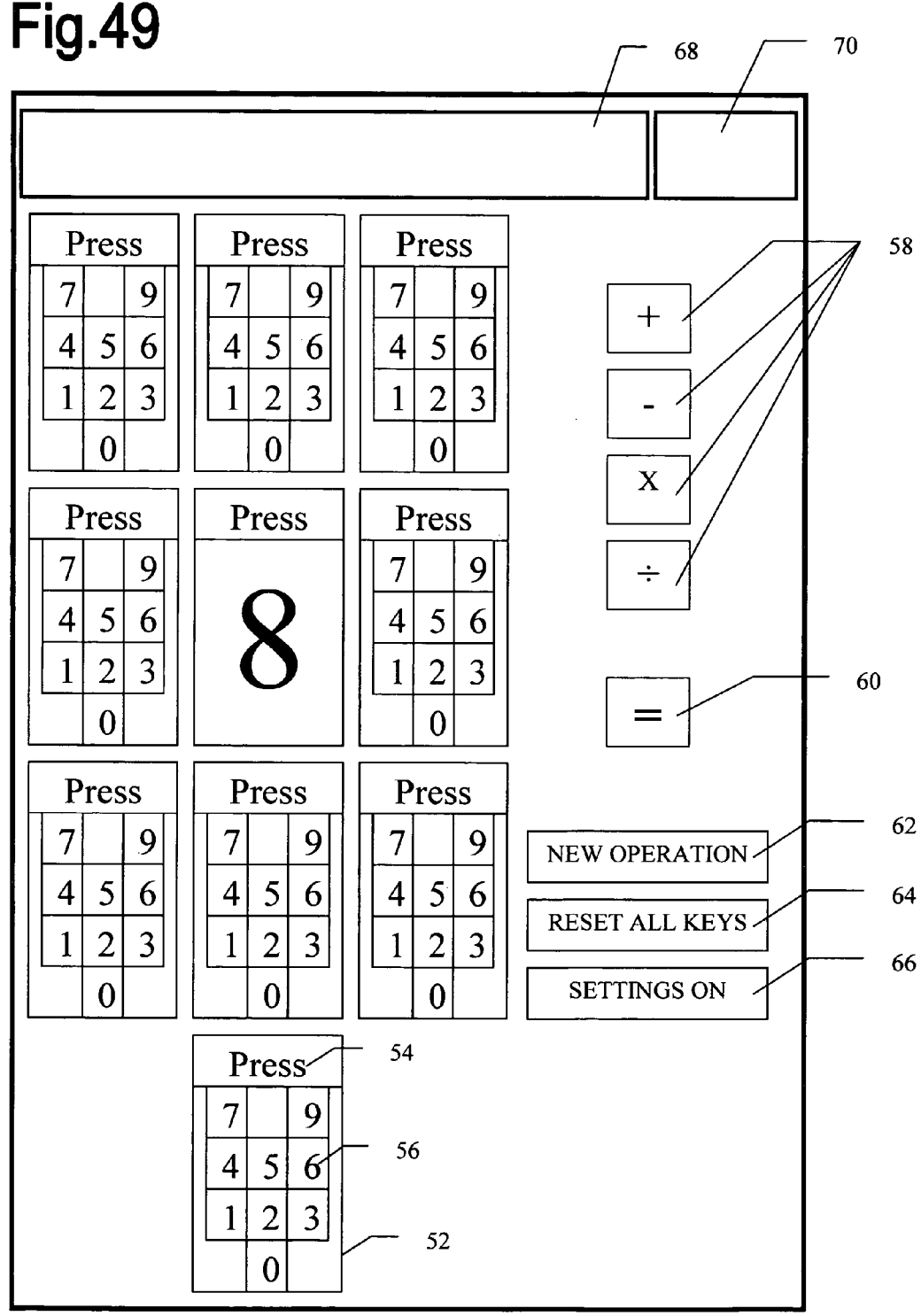

FIG. 49 shows another embodiment of the teaching method.

Figure 50:
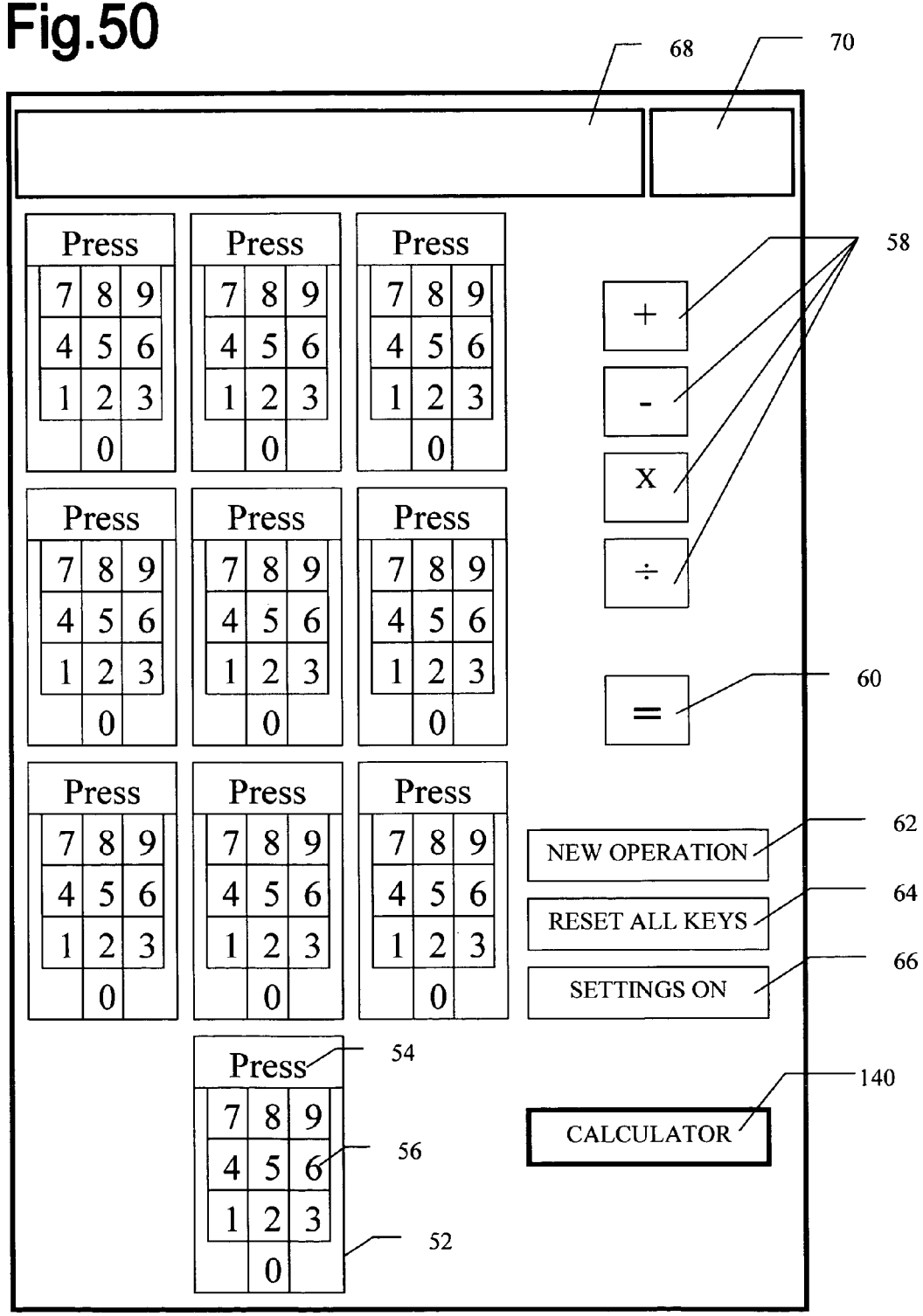

FIG. 50 shows another embodiment of the teaching method.

Figure 51:
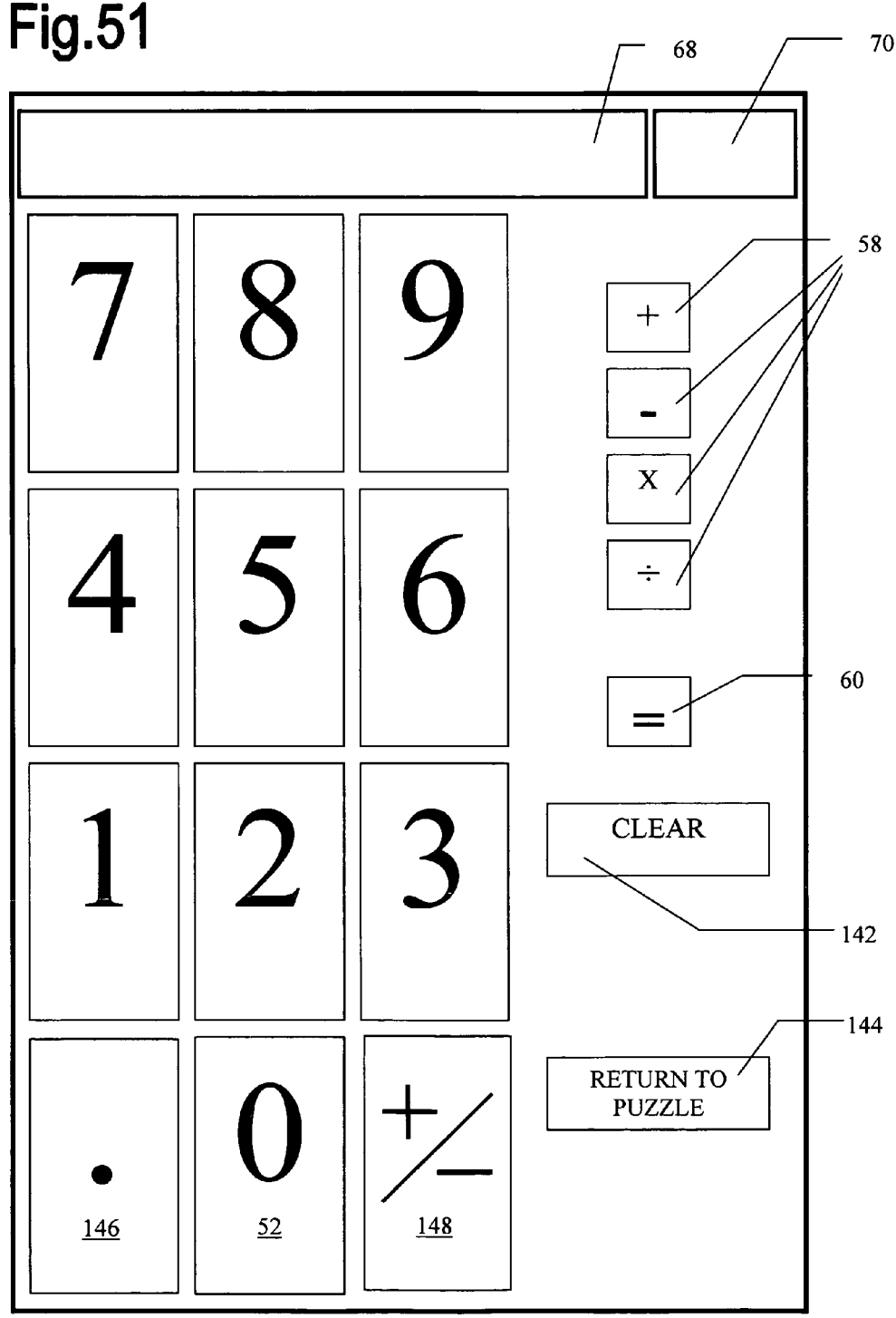

FIG. 51 shows the calculator view of the teaching method shown in FIG. 50.

DRAWINGS

Reference Numerals 52 value position
54 "Press" position
56 answer choice position
58 operation position
60 equals position
62 "NEW OPERATION" position
64 "RESET ALL KEYS" position
66 "SETTINGS ON" position
68 results region, instructions
70 results region, values
72 heading for settings view
74 entry field for settings code
76 "SETTINGS OFF" position
78 settings for operations
80 settings for value positions
82 settings for quotient style
84 quotient style, decimal
86 quotient style, fraction
88 quotient style, remainder
90 quotient style, message
92 settings for difference style
94 difference style, message
96 advanced settings
98 advanced settings, value positions
100 number of value positions
102 value of each value position
104 "ENTER" position for values
106 advanced settings, operation positions
108 number of operation positions
110 operation for each operation position
112 "ENTER" position for operations
118 answer choices, value position
120 selection control buttons, value positions
122 toggle switch, value position
124 four operation buttons
126 "=" button
128 on/off switch
130 viewing area
131 answer choices, operation position
132 selection control buttons, operation positions
133 toggle switch, operation position
140 toggle position, calculator 142 "CLEAR" position
144 "RETURN TO PUZZLE" position
146 decimal point position
148 sign reversal position

DETAILED DESCRIPTION

FIGS. 1-51

Figure 1:
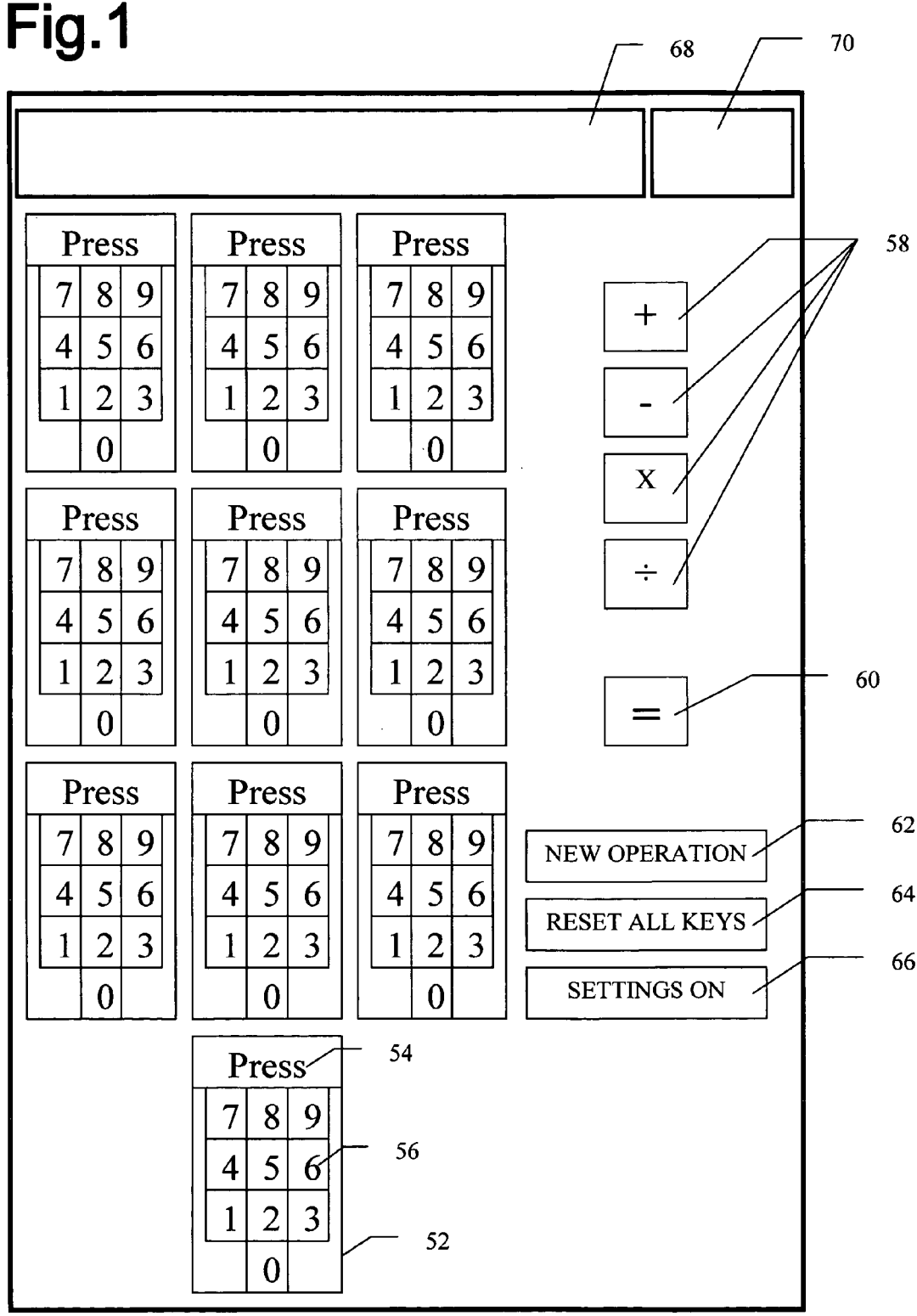
FIG. 1 is a display on a screen or other visual display device of the puzzle view in the preferred embodiment.

FIG. 1 shows a display on a screen or other visual display device such as, but not limited to, a calculator display, a computer screen, holographic or other projected image, an interactive whiteboard, or a touchscreen, of the puzzle view of the preferred embodiment of the teaching method. The display comprises ten value positions or keys 52, two results regions 68,70, four operation positions with their associated operations 58, one position with an equals sign 60, a "NEW OPERATION" position 62, a "RESET ALL KEYS" position 64, and a "SETTINGS ON" position 66. Each of the ten value positions comprises a "Press" position 54 and ten answer choice positions 56. The means for choosing the various positions is not shown but could be any one of a number of input devices such as a mouse, calculator keypad or computer keyboard, interactive whiteboard, touch screen, audible input, virtual reality glove, etc.

The function of the various positions and their interactions for the preferred embodiment are best illustrated by following a student through a hypothetical session of finding the positions of all ten digits. Prior to the session, the student would have been given the following basic instructions.

1) Find the digits 0 through 9. Each digit is hidden behind a key on the keypad.
2) In order to find the digits, you may add, subtract, multiply, or divide.
3) Use the results to decide which value hides behind each key.

Figure 2:
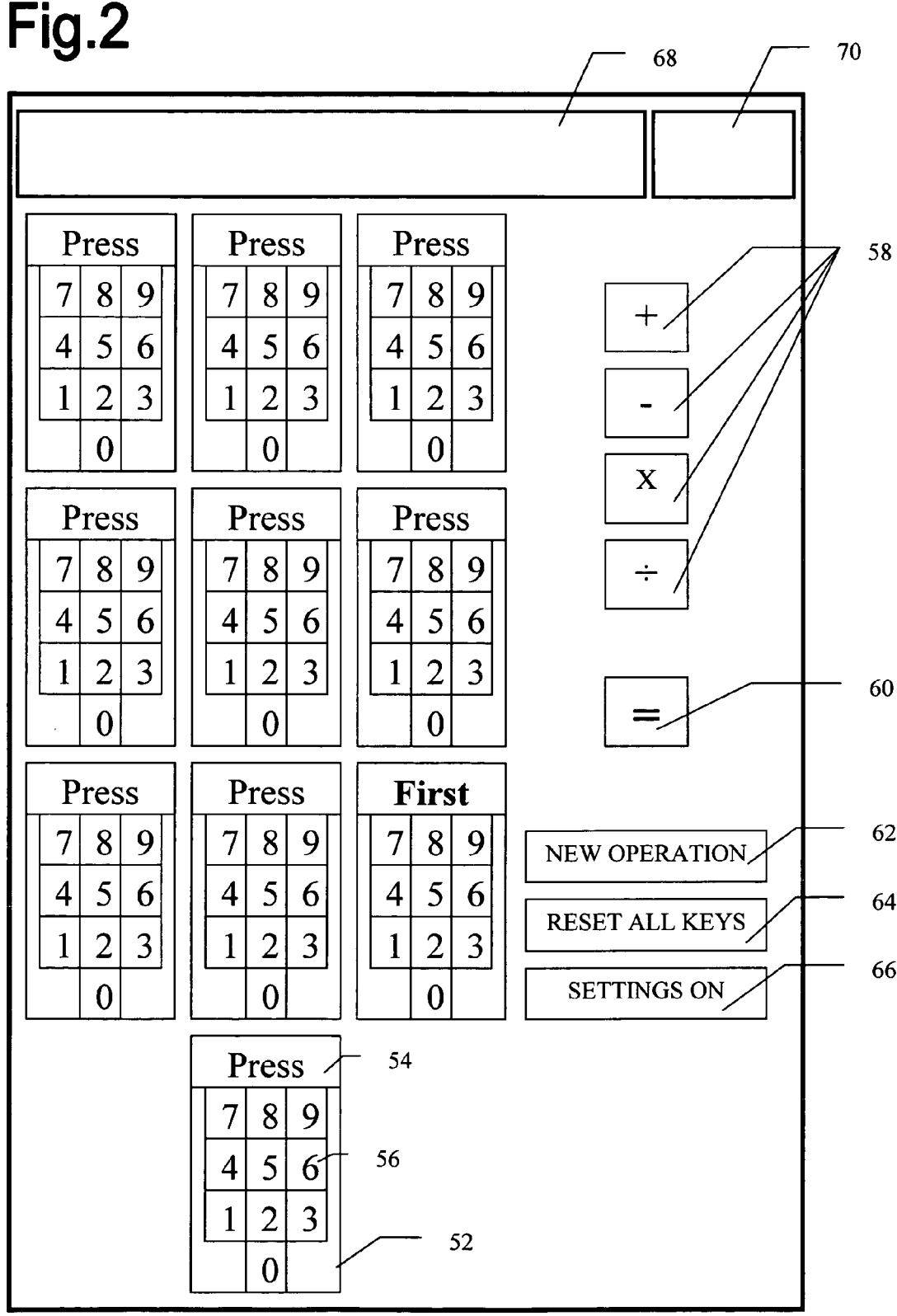
FIGS. 2-15 show the individual steps in a hypothetical case of finding the correct values for two of the value positions.
Figure 3:
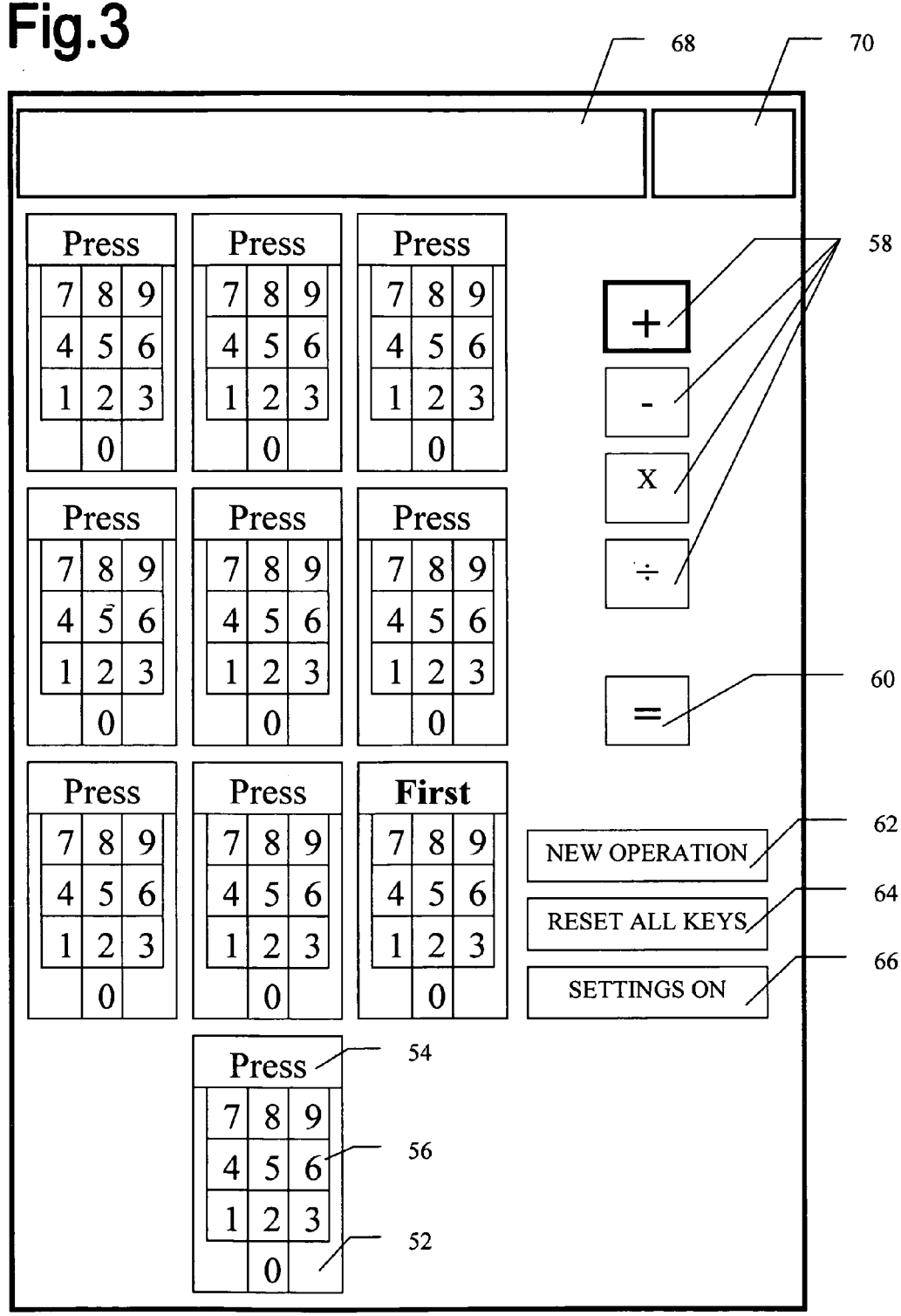
Figure 4:
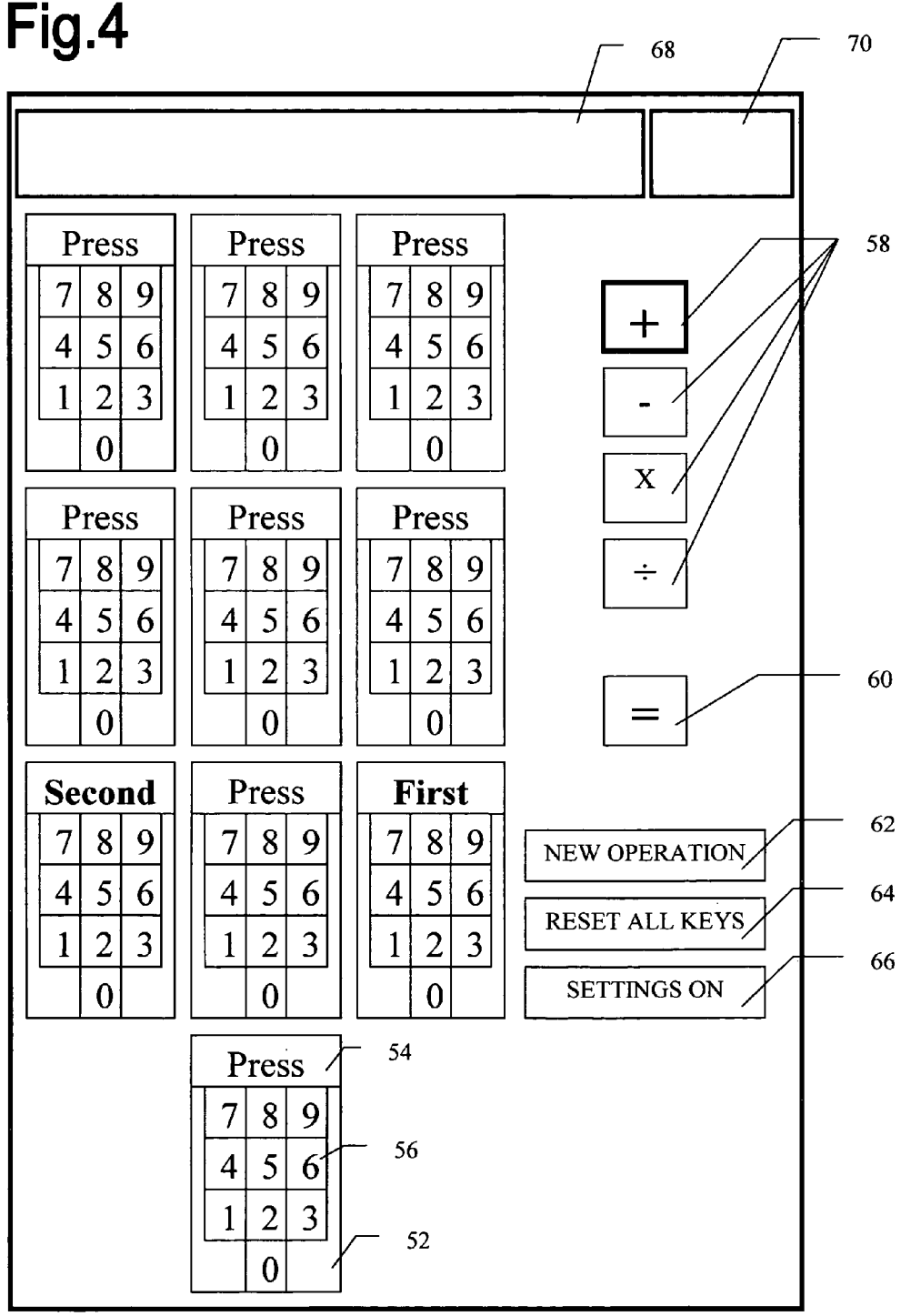
Figure 5:
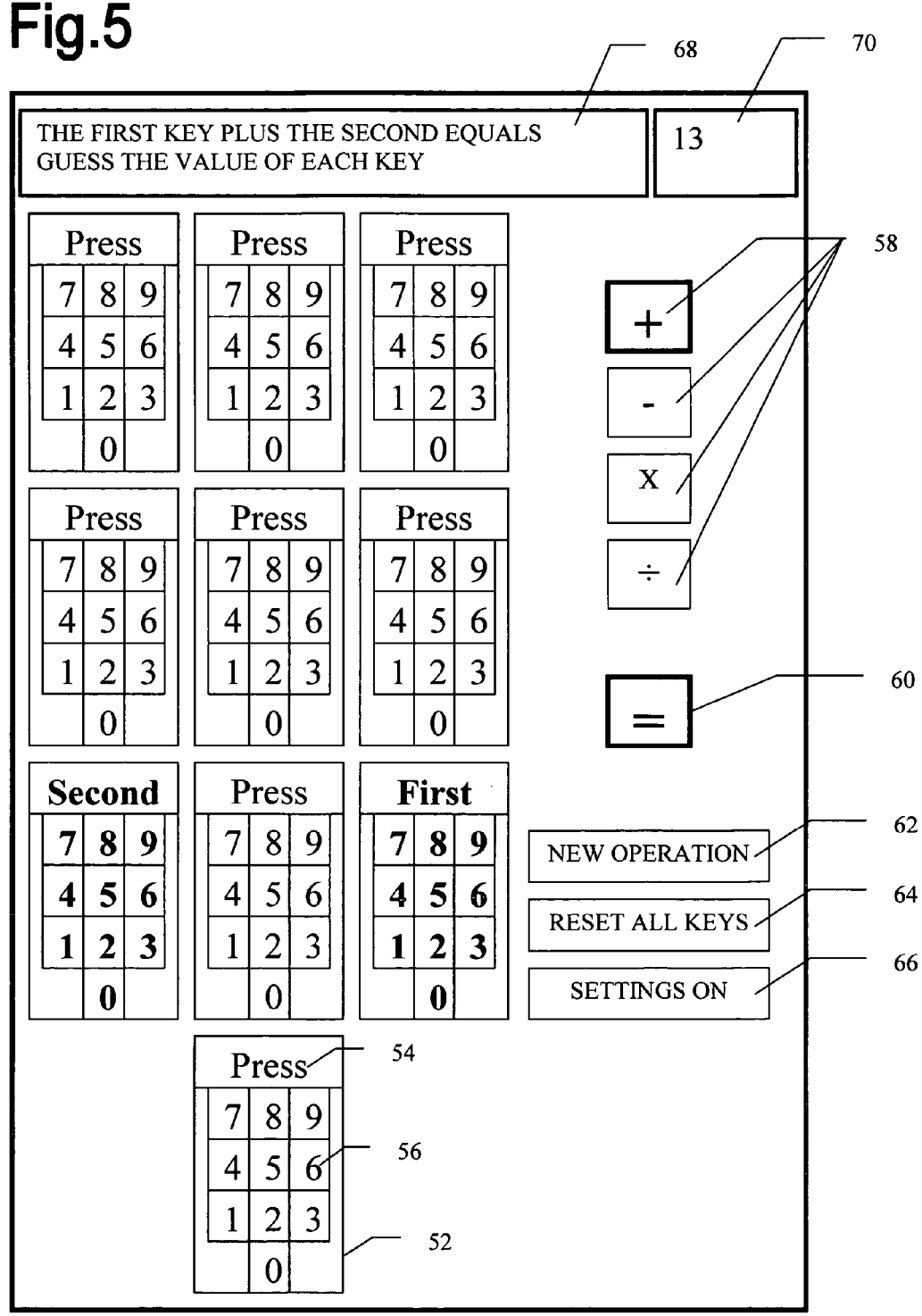
Figure 6:
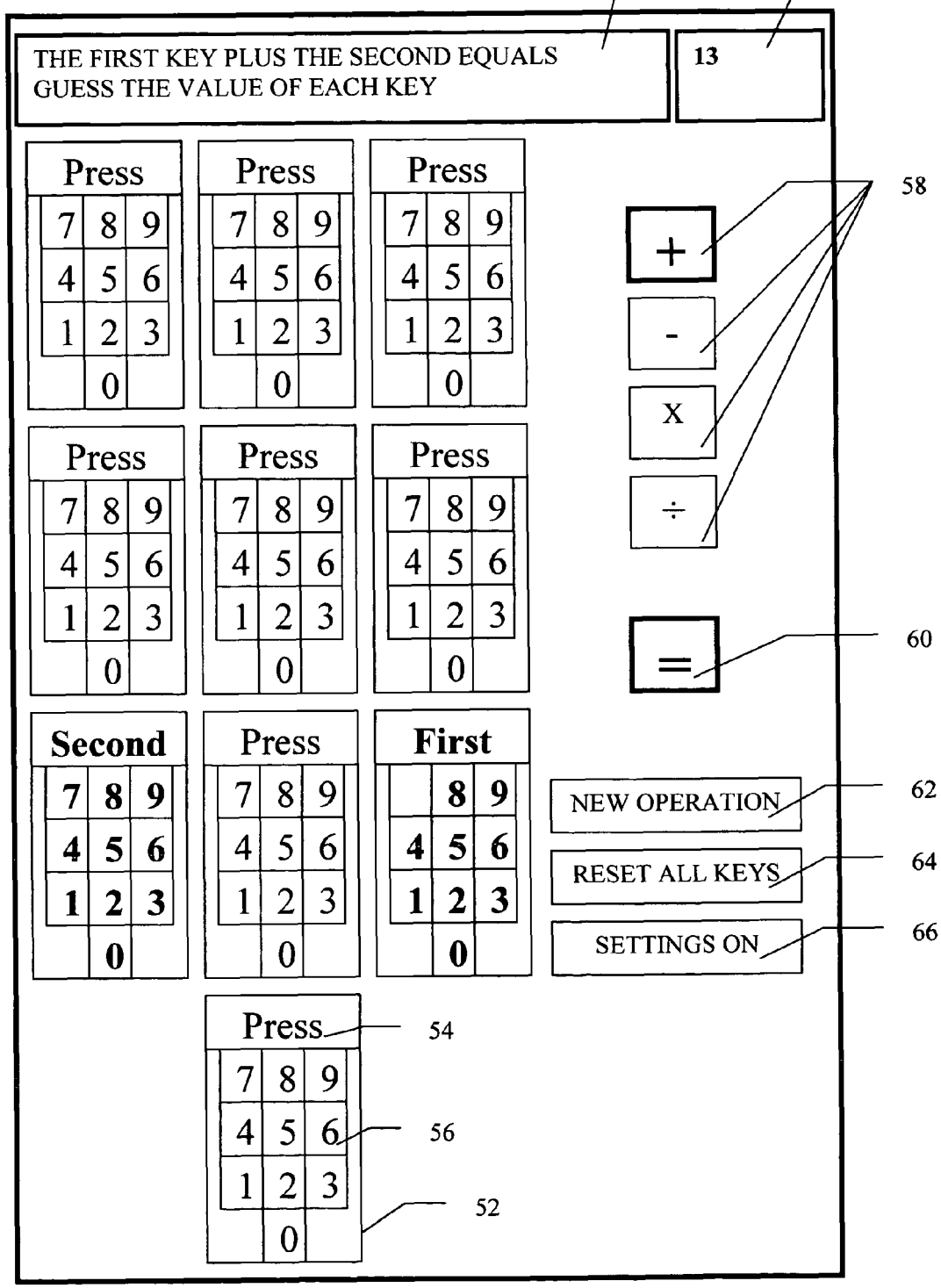
Figure 7:
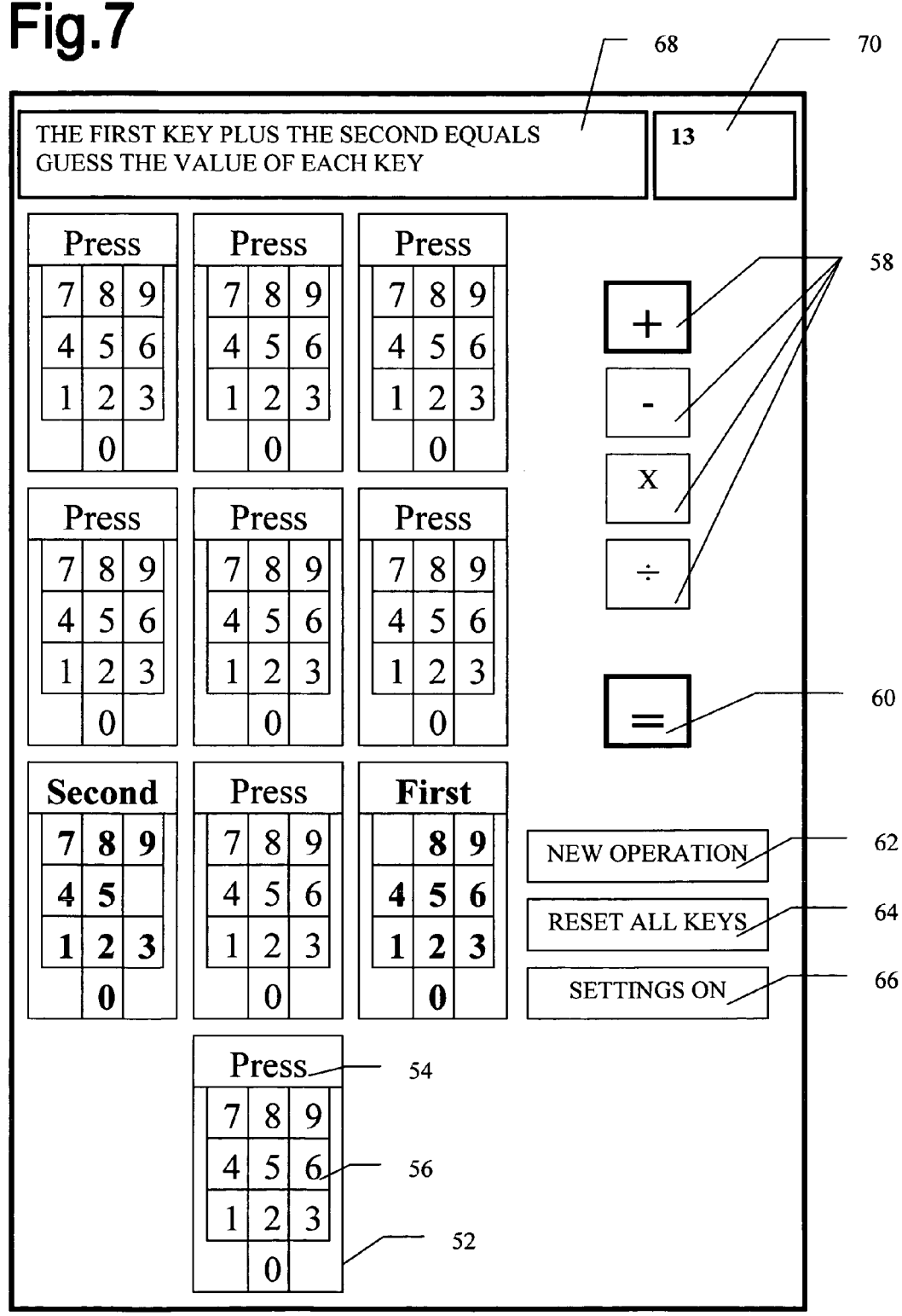
Figure 8:
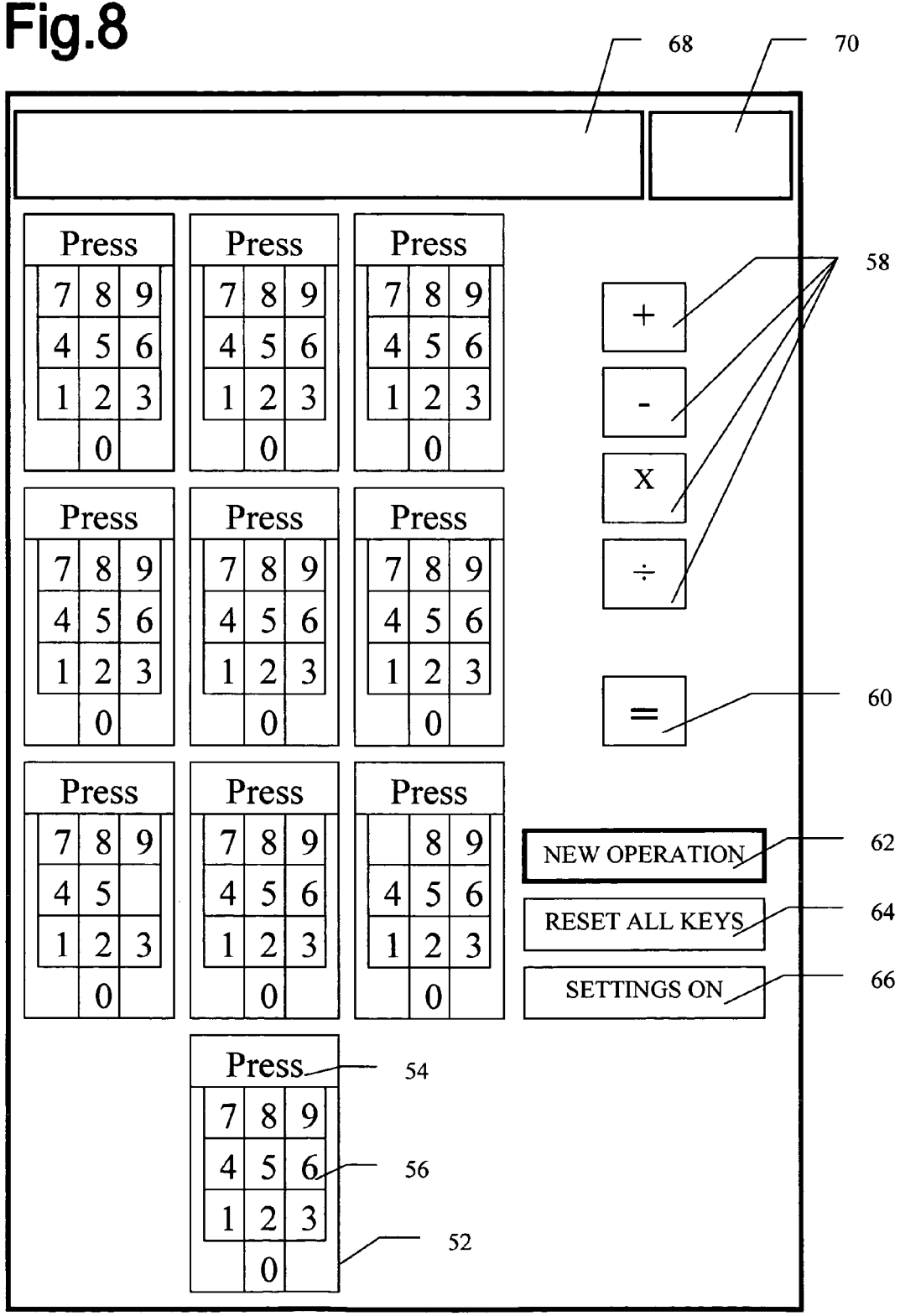
Figure 9:
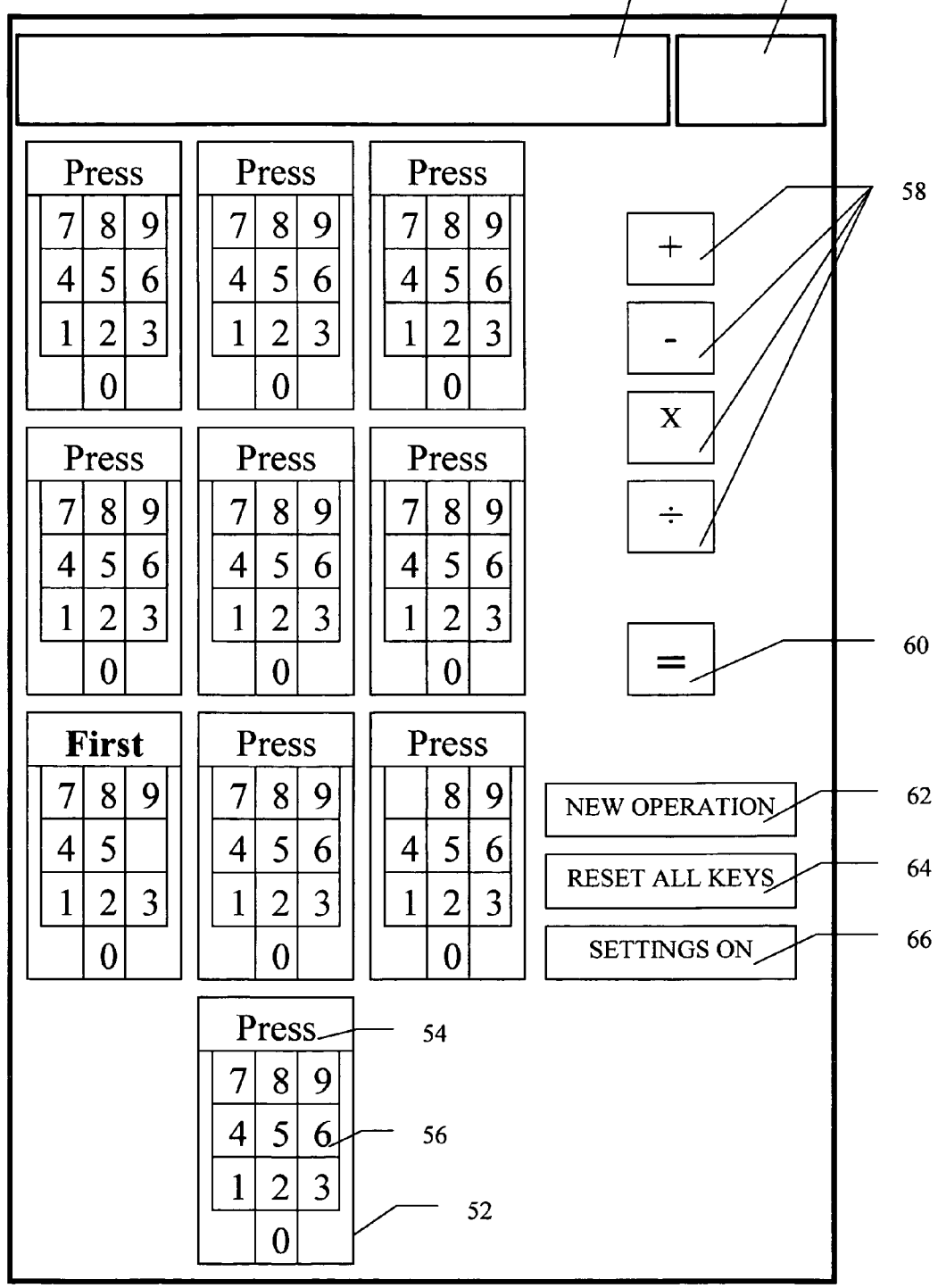
Figure 10:
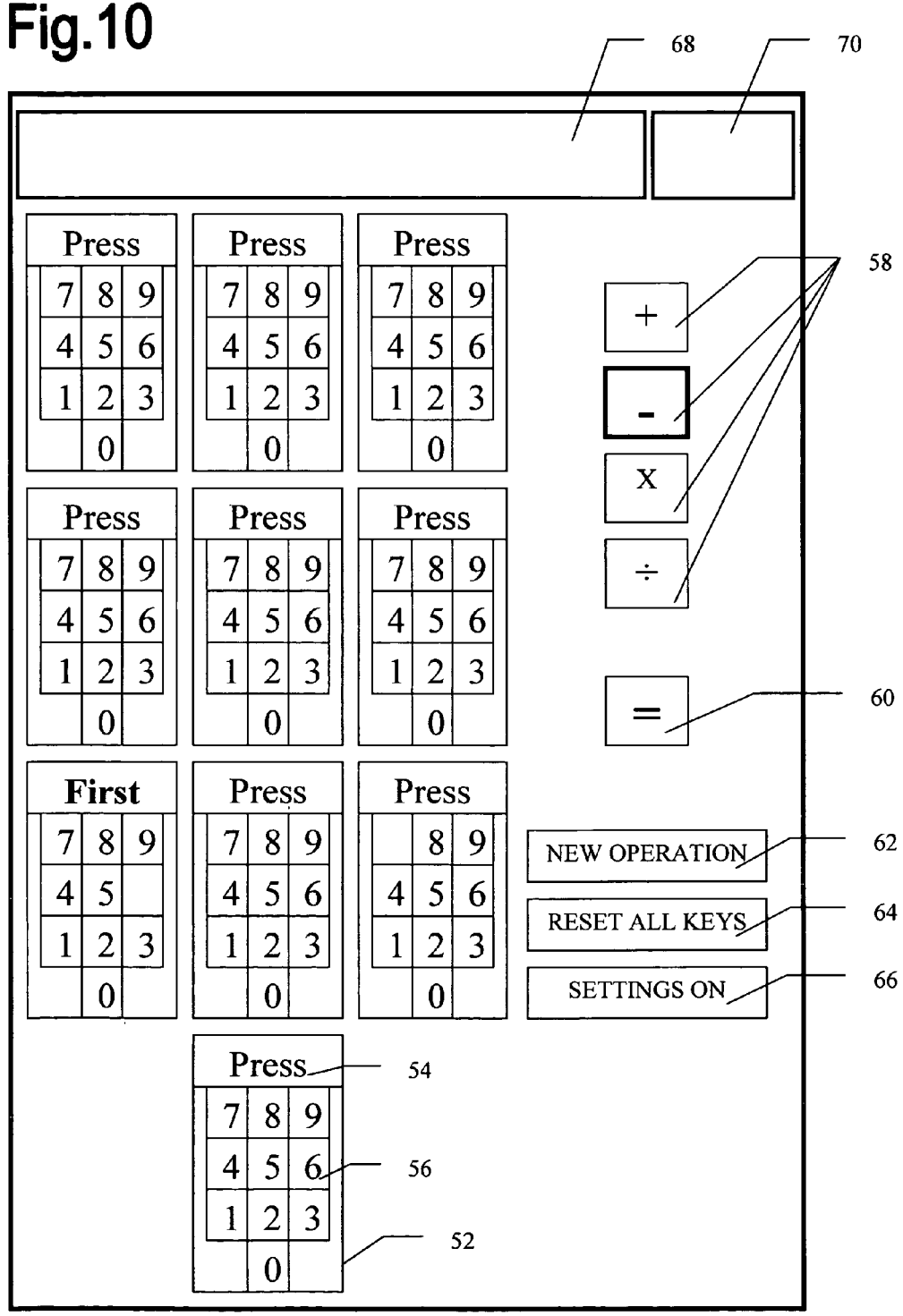
Figure 11:
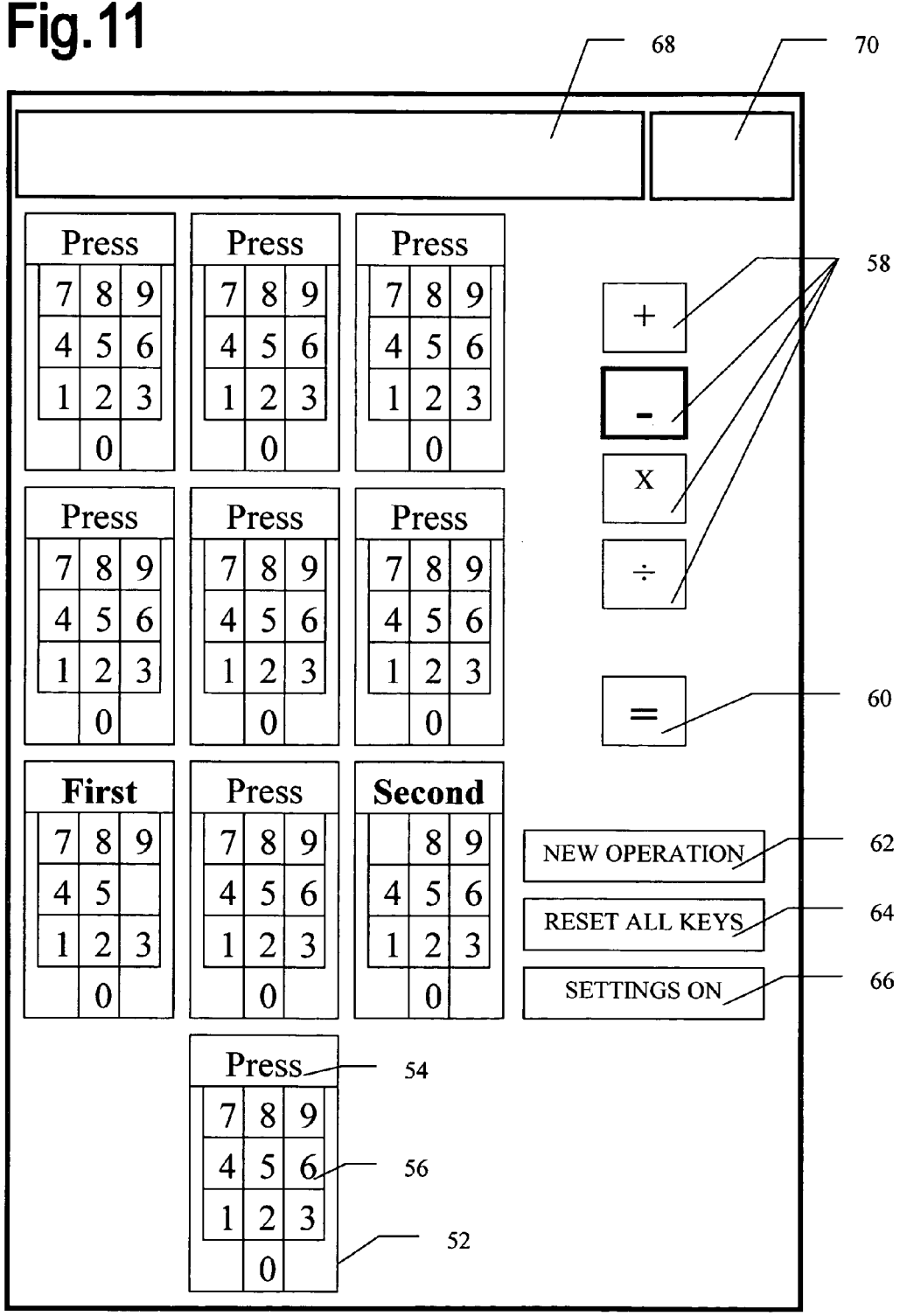
Figure 12:
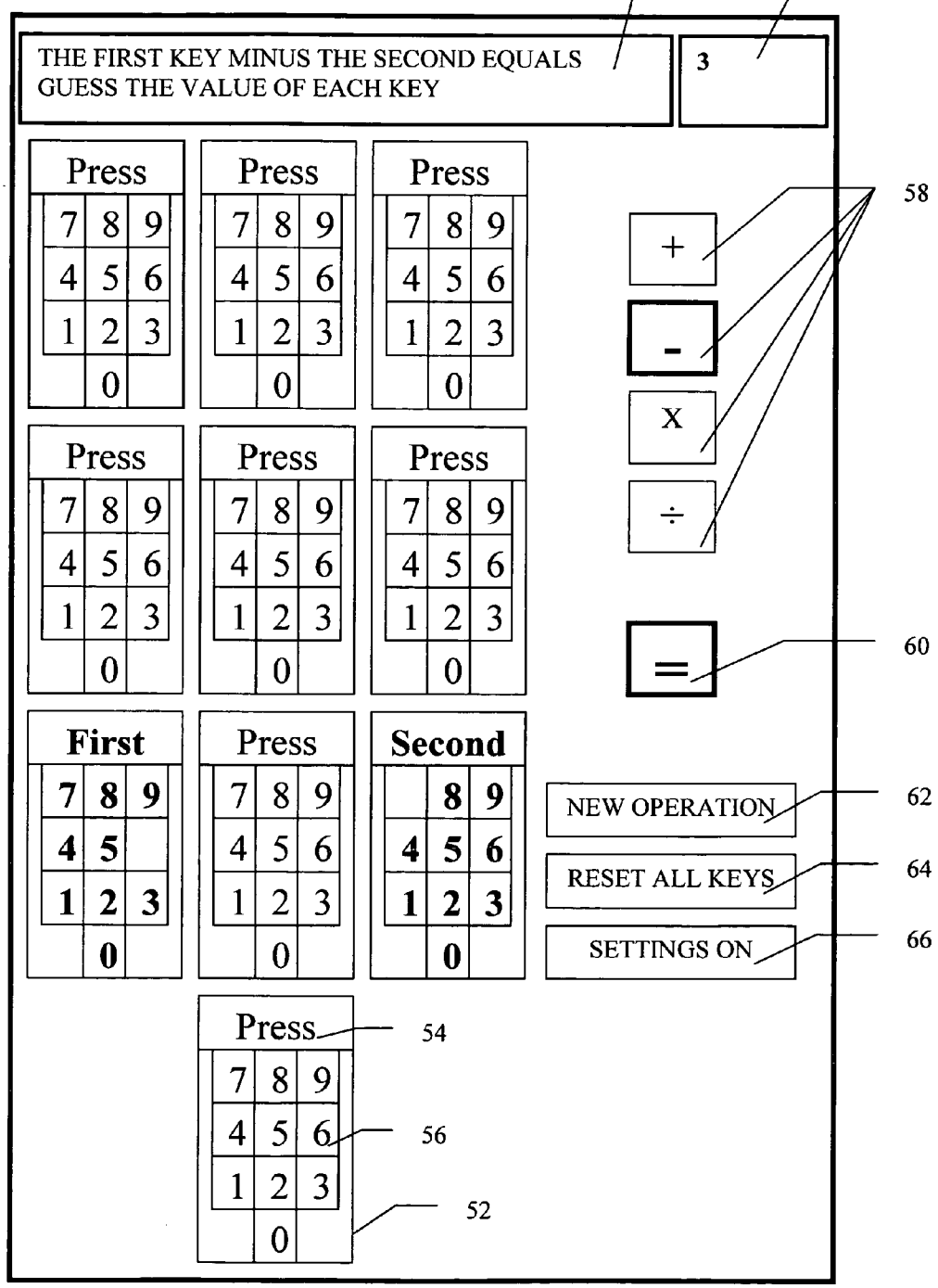
Figure 13:
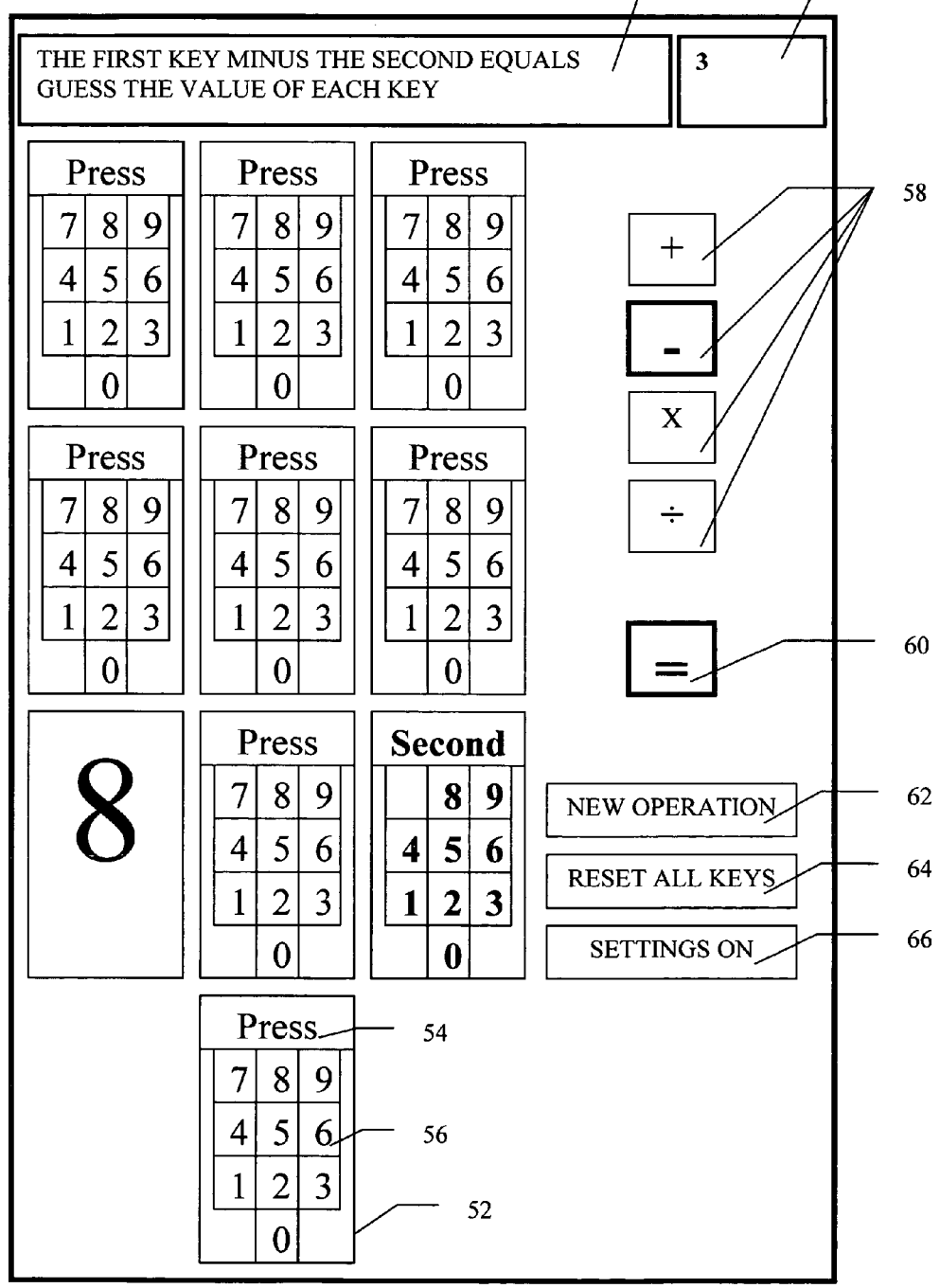
Figure 14:
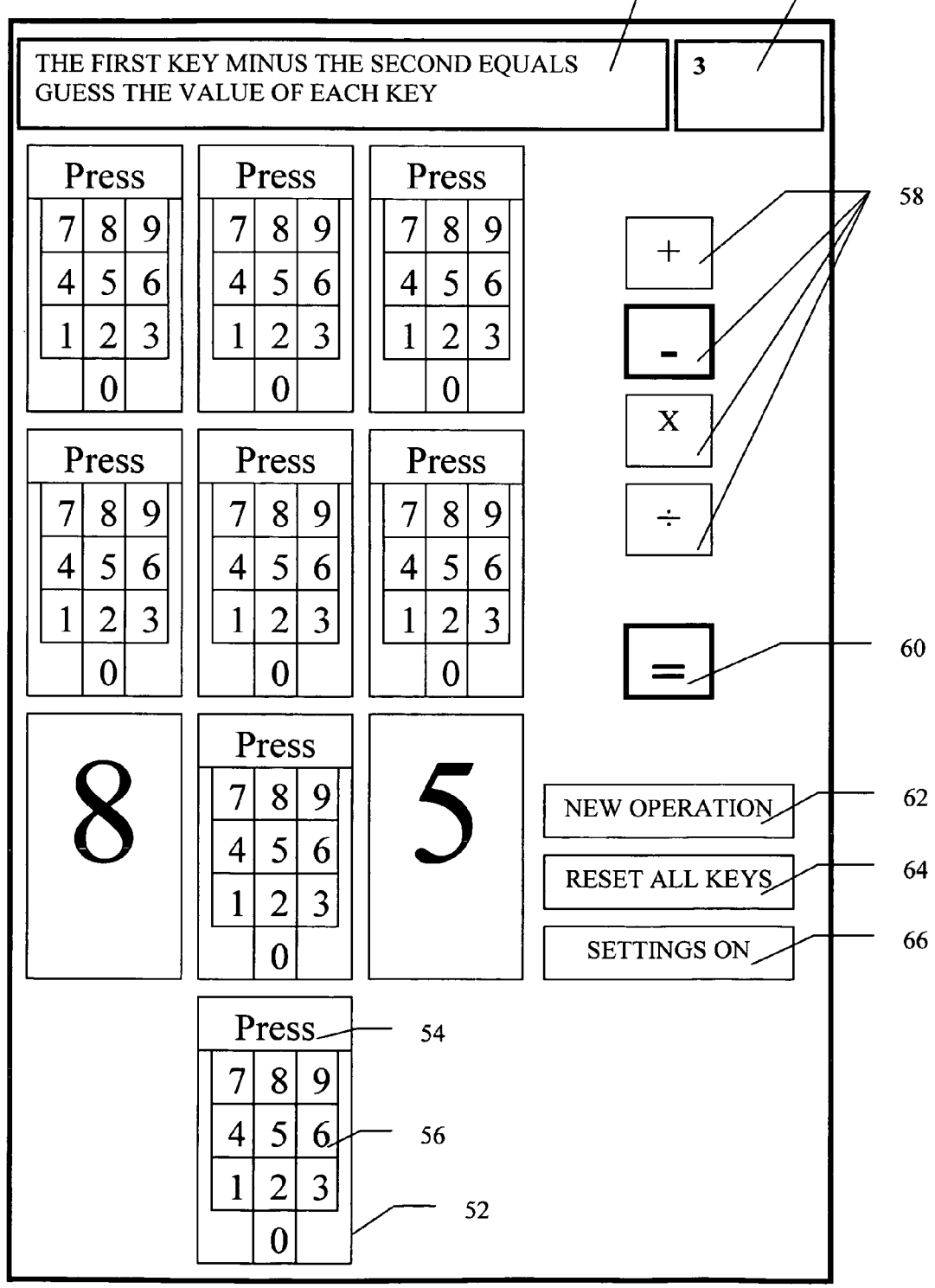
Figure 15:
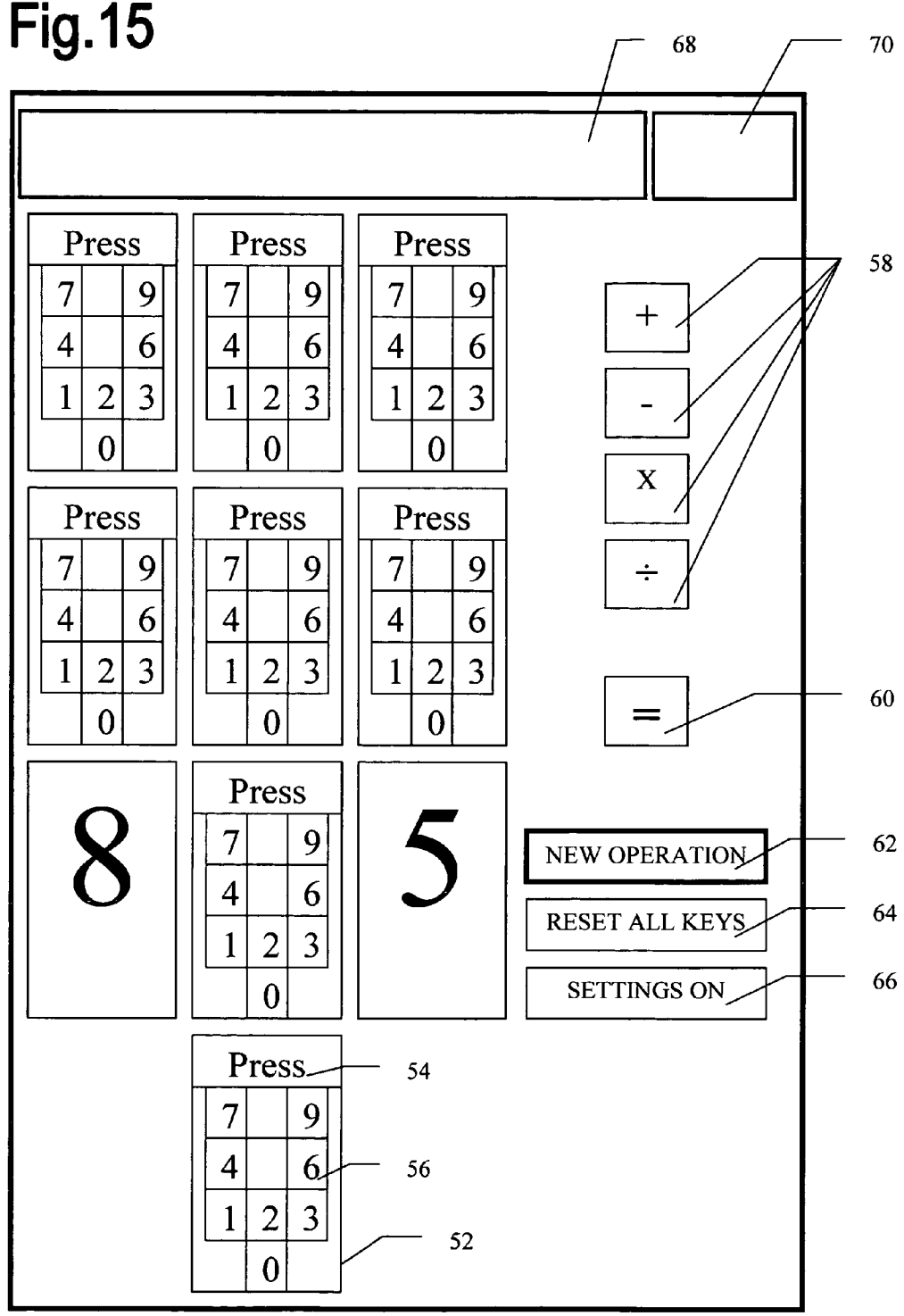

What has been referred to as a value position in the patent application is known to the student as a key in a keypad. FIGS. 2-17 demonstrate student use of the preferred embodiment. FIG. 2 shows the student starting by choosing the lower right position. The word "Press" changes to "First" and the typeset also changes to bold to accentuate the student's choice. FIG. 3 shows her next action, choosing the addition operation 58. The outline of the addition position and the addition symbol both thicken to again highlight the student's choice. FIG. 4 shows his/her second position choice. FIG. 5 shows his/her choosing the "EQUALS" position and what he/she sees as a consequence of that action. The results regions 68, 70 contain "THE FIRST KEY PLUS THE SECOND EQUALS 13 GUESS THE VALUE OF EACH KEY". The ten value choices 56 for each of the two positions have become enabled, as indicated by their darker appearance. He/She deduces that since 7+6=13, he/she will try 7 for the first value and 6 for the second. FIG. 6 shows that the student has chosen (incorrectly) the value 7 for the first position and FIG. 7 shows that the student has chosen 6 for the second position (also incorrect). The disappearance of the value choices in FIGS. 6 and 7 indicate that those value choices are not the correct ones for their respective value positions. FIG. 8 shows the position "NEW OPERATION" 62 being chosen. In FIGS. 9-12 we see him/her trying subtraction with the same value positions but he/she has decided to reverse the order of the two positions. With each operation he/she is free to use whatever order he/she wishes. The first position minus the second is 3. Since he/she knows that the sum of the two values is 13 and their difference is 3 he/she correctly deduces that the values are 8 and 5. FIG. 13 shows what happens when he/she chooses 8 for the first value. The position fills with an 8, the correct choice. Likewise in FIG. 14 when he/she selects the 5, the position fills with the correct choice. In FIG. 15 "NEW OPERATION" is chosen and the values 5 and 8 are eliminated as choices from all of the remaining value positions. The student now proceeds using the remaining eight unspecified value positions, since specified value positions may not be used until the next puzzle.

Figure 16:
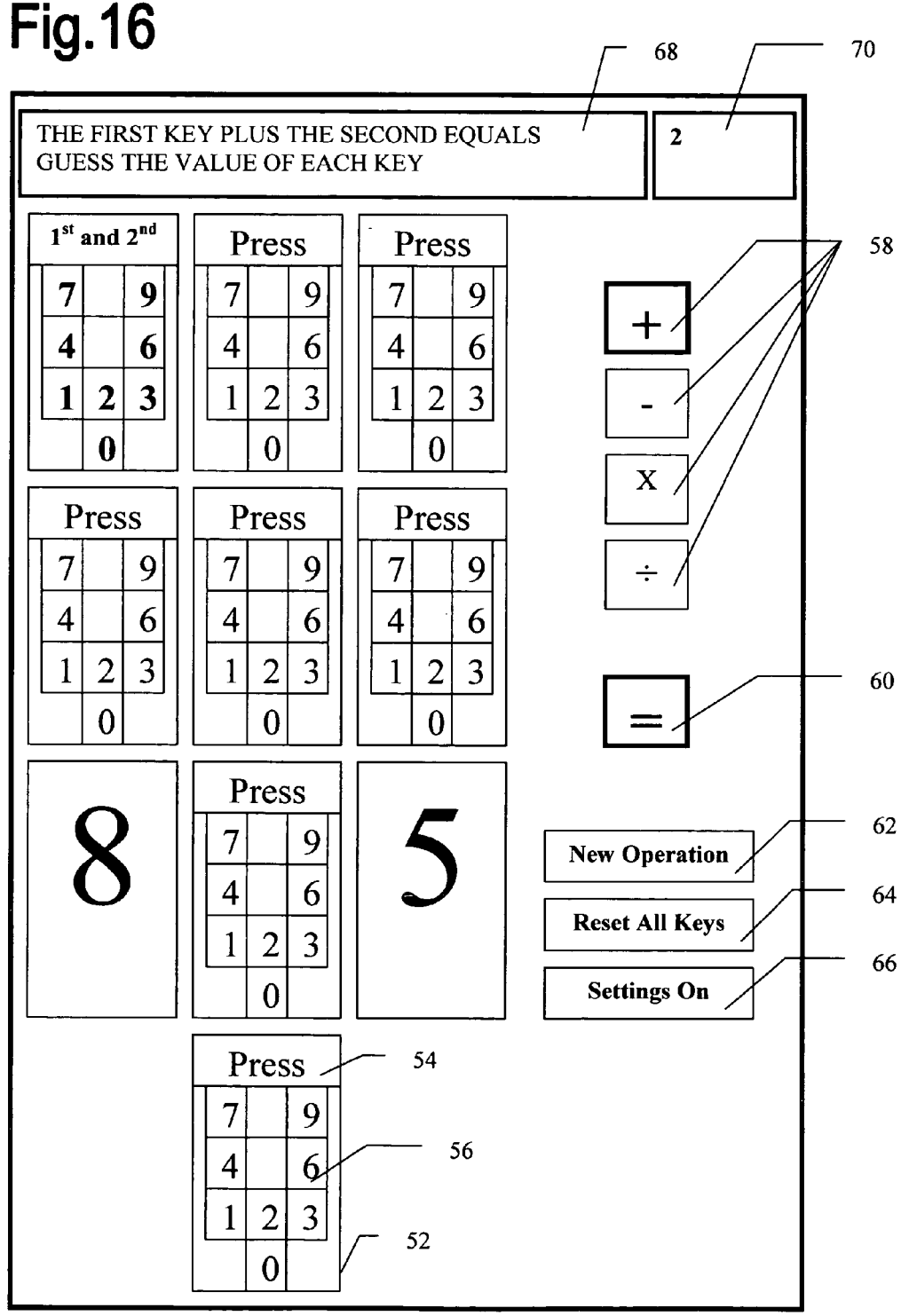
FIGS. 16 and 17 show two of the steps in finding the value for a single value position using the operation of addition.
Figure 17:
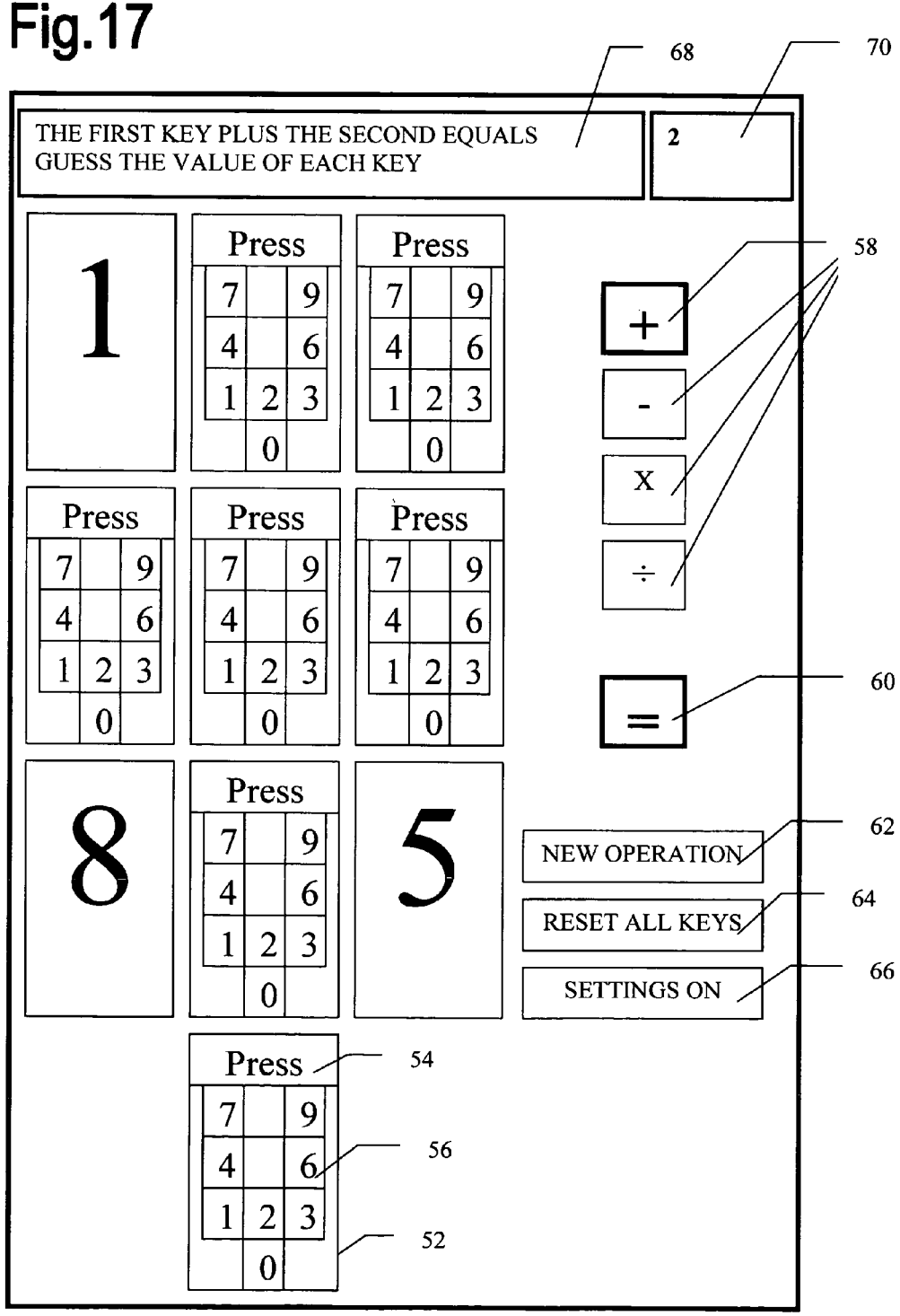
Figure 18:
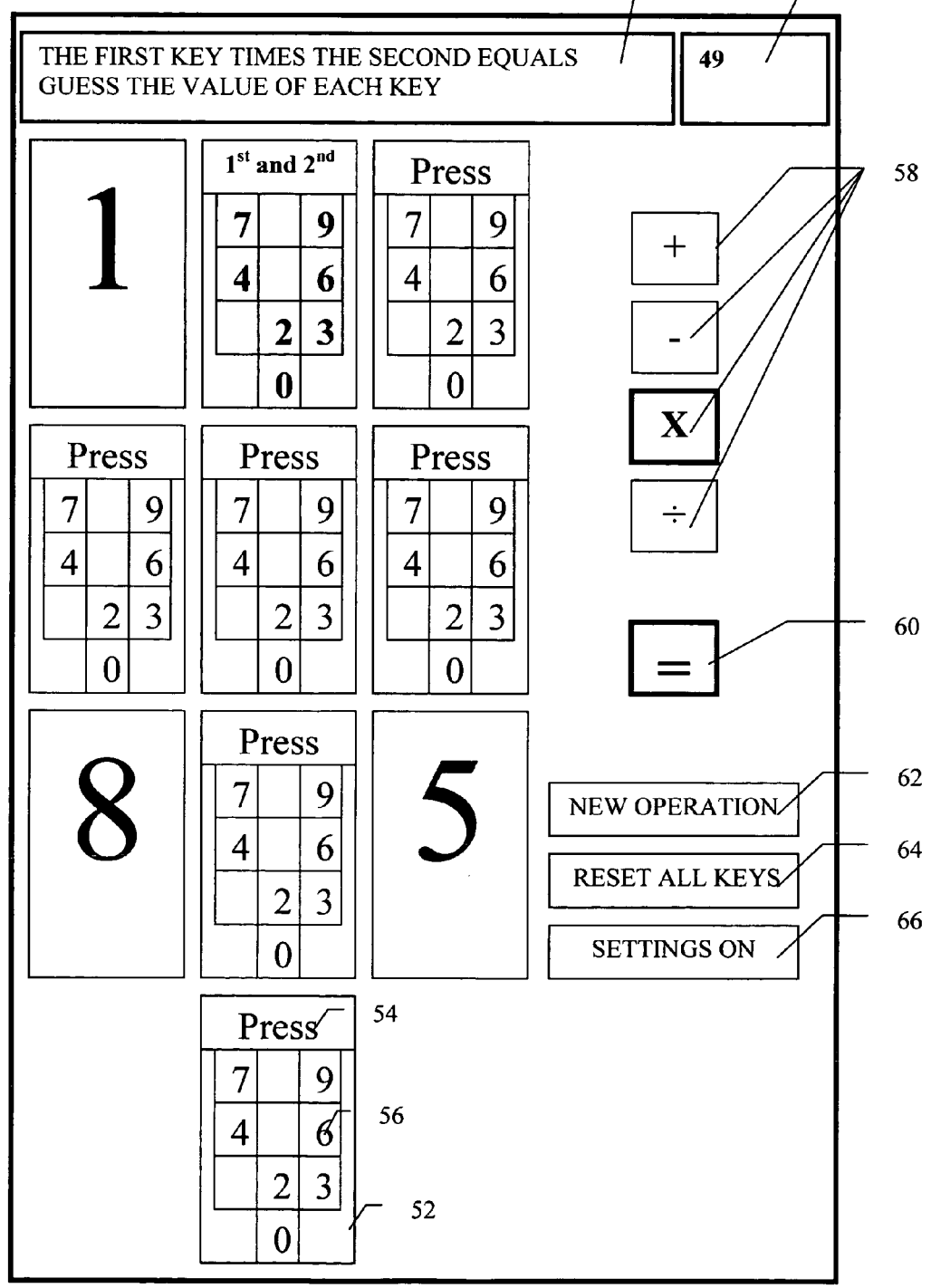
FIGS. 18 and 19 show two of the steps in finding the value for a single value position using the operation of multiplication.
Figure 19:
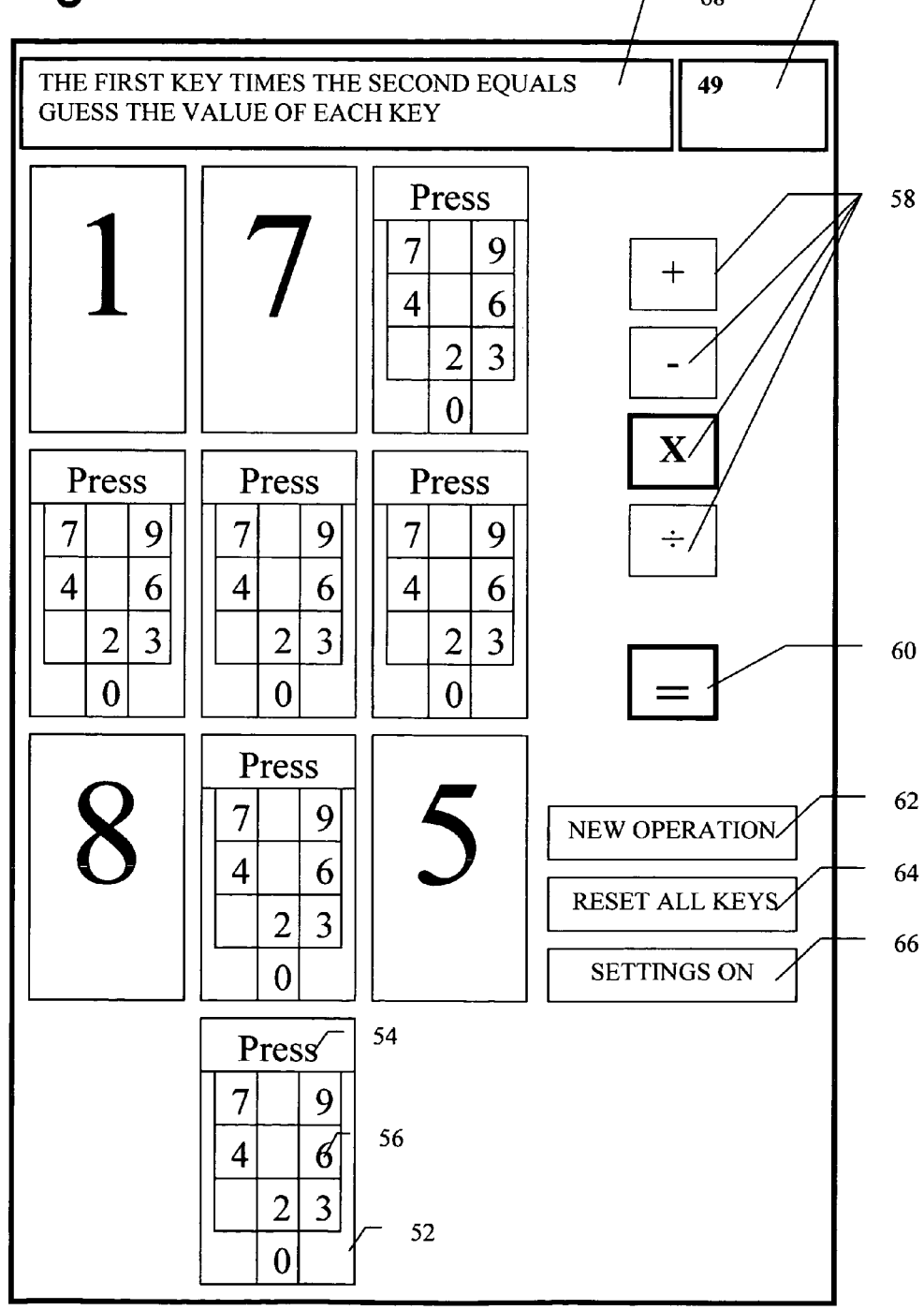

FIGS. 16-19 demonstrate how in the preferred embodiment a single position may be chosen both first and second. In FIGS. 16 and 17 by using the same value position as first and second then choosing the addition operation, the student has doubled a value, in this case resulting in the sum of two. The student solves the problem by thinking what value added to itself, or doubled, is two and, realizing that it is one, makes that choice. In FIGS. 18 and 19 using the same position first and second, and choosing the operation of multiplication, the student has squared a value. The student solves the problem by thinking what value multiplied by itself is 49. This is the definition of square root. He/She correctly arrives at seven.

Figure 20:
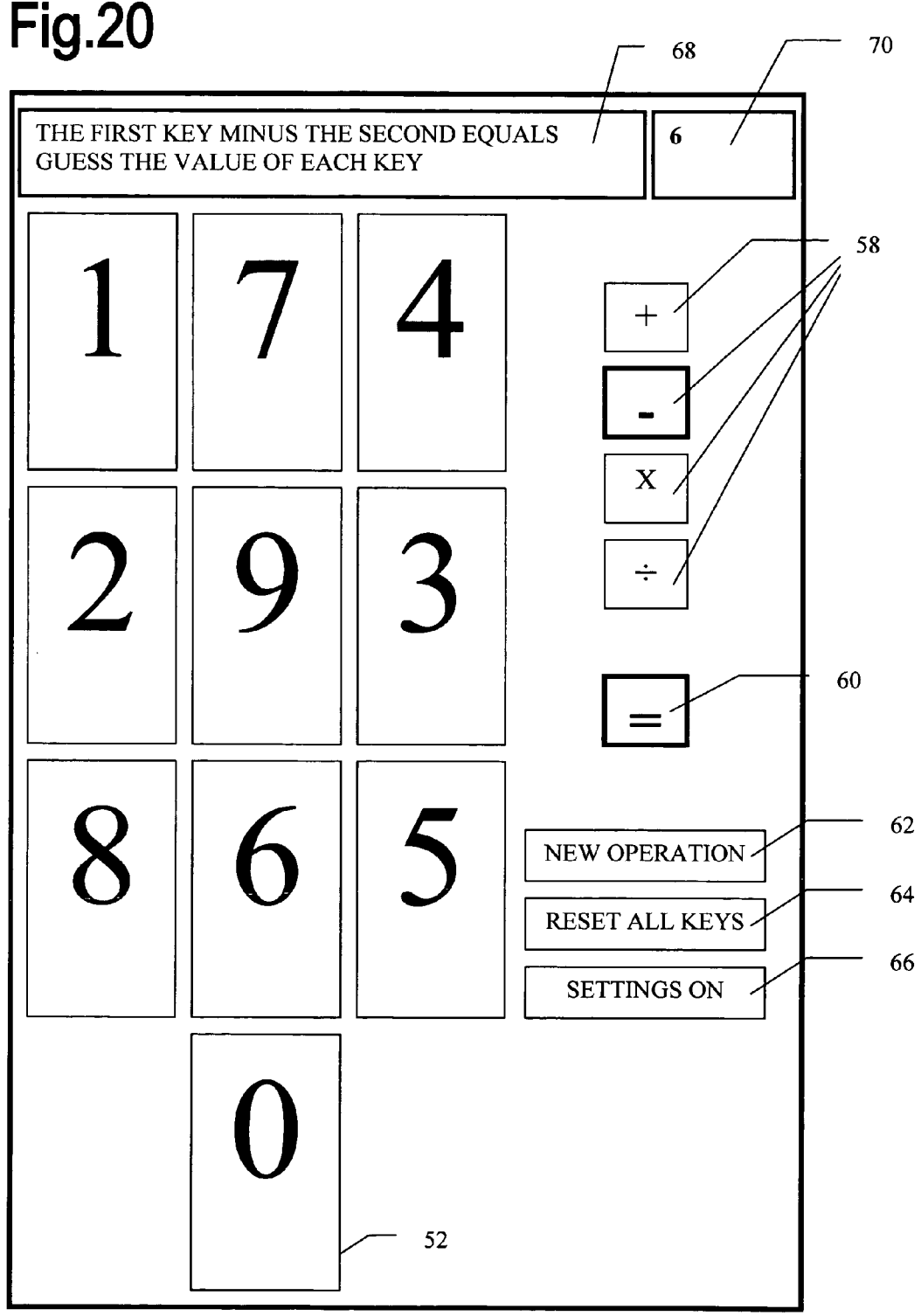
FIG. 20 shows the last step in finding the digits for all ten value positions.

The student continues to use value positions and operations of his/her choice until in FIG. 20 we see the puzzle as the student has just gotten the final two positions correct. At this point choosing either "NEW OPERATION" or "RESET ALL KEYS" will result in a new, randomly selected, set of hidden values, as seen in FIG. 21. FIG. 22 contains a flowchart summarizing FIGS. 2-21.

FIGS. 23-30 demonstrate the use of the programmable settings. Programmable settings are used whenever the teacher chooses to vary from the default settings. In the preferred embodiment the default settings for operations are the four elementary arithmetic operations of addition, subtraction, multiplication, and division. The default setting for number of value positions is ten, with each value position containing one of the digits 0 through 9. In the default state a value position may be chosen twice, as both the first and second choice, as was seen in FIGS. 16 and 18. To require that the choices be distinct or to require that the choices be the same necessitates modifying the default settings. There is a default setting for the result of a division operation. The default is to present the quotient in decimal form rounded to the nearest thousandth. There is also a default for the result of a subtraction operation. The default is to represent the difference of two values as a signed number.

Figure 23:
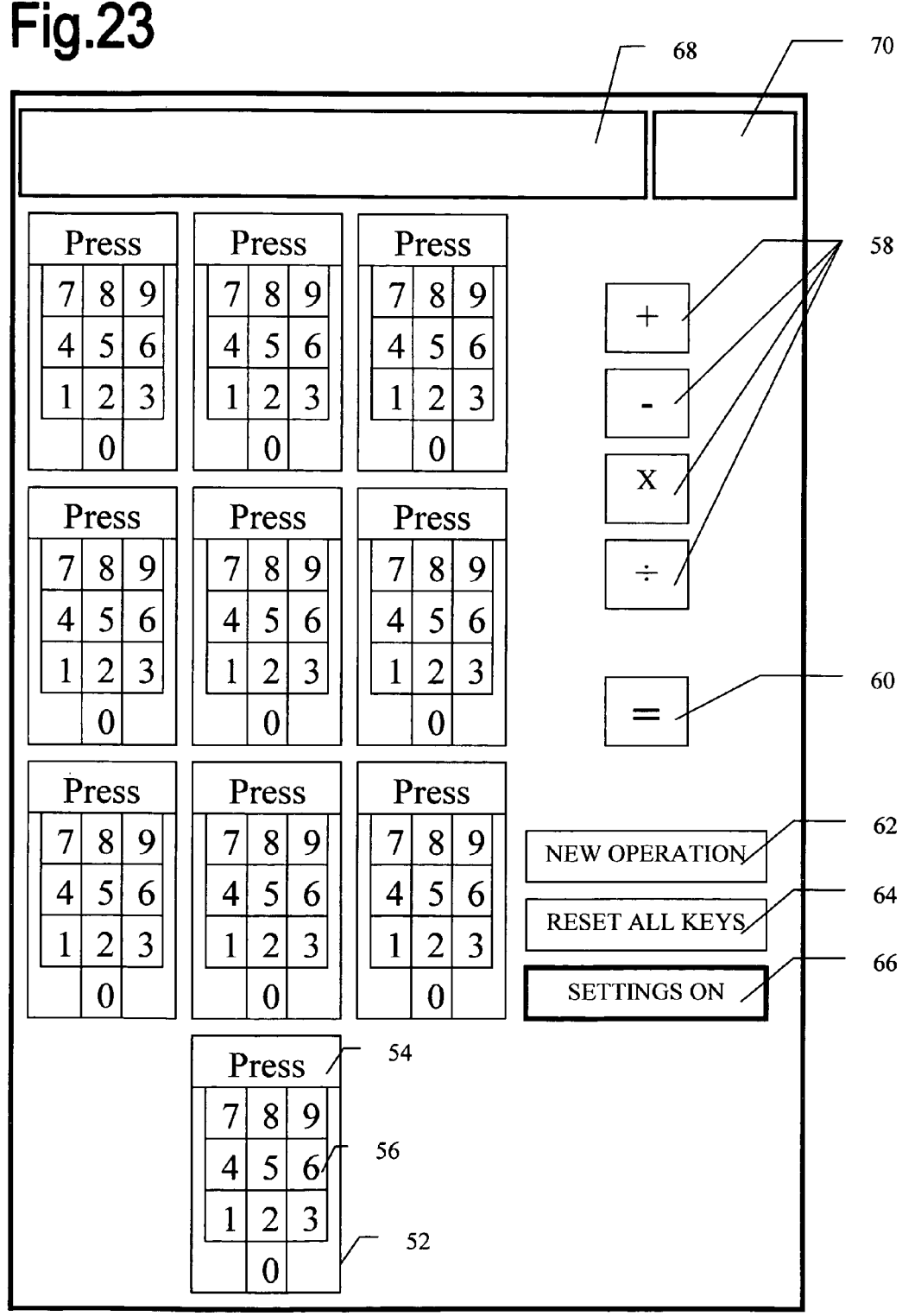
Figure 24:
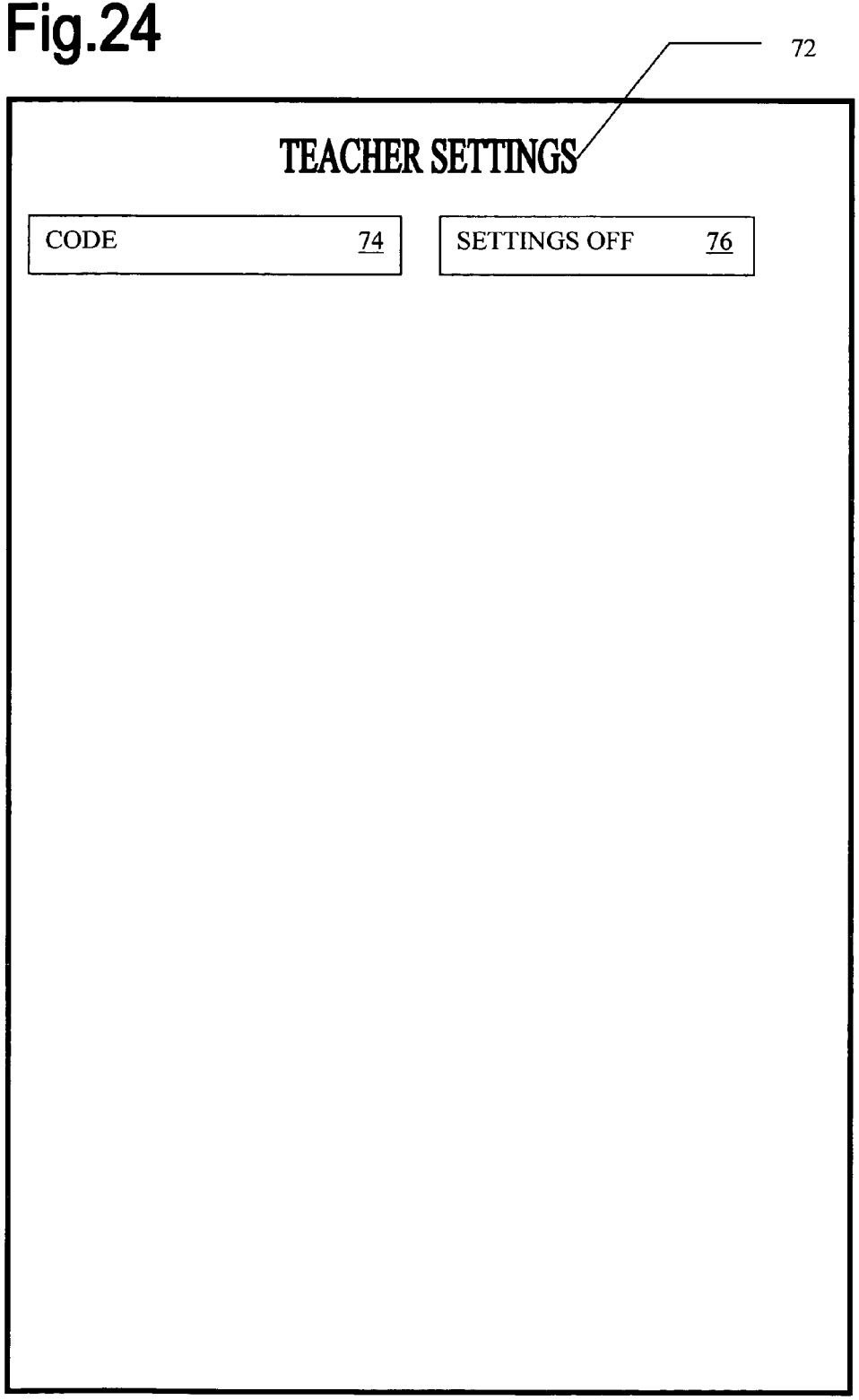

FIG. 23 shows the "SETTINGS ON" 66 position being chosen by the teacher and the resulting settings view is seen in FIG. 24. At the top is the heading "TEACHER SETTINGS" 72, just below and to the left is an entry field 74 with the word "CODE" and to the right a position 76 labeled "SETTINGS OFF." The teacher is now allowed to change the settings for the puzzle provided she knows the code. In FIG. 25 the correct code, "TEACHER BASIC," has been entered into the entry field 74 and the basic options become visible. The basic options include the choice of operations 78, the number of value positions, here designated as keys, and whether the positions must be distinct or must be the same 80, a quotient style 82, and a difference style 92.

FIG. 26 shows the teacher making his/her choices as to which settings to leave in the default state and which to change. The default state for operations is to leave all four available. The teacher eliminates the addition and subtraction operations in the puzzle view by selecting them here in the settings view 78. The teacher limits the number of value positions to six instead of the default value of ten, and chooses to allow a position to be chosen twice by not selecting either "SAME" which would require the two value positions to be the same, or "DISTINCT" which would require the two value positions to be distinct 80. The teacher chooses to switch the quotient style 82 from the default of decimal rounded to thousandths to fractions with mixed numbers 86. The difference style is left at the default setting of signed number 94. This finishes the modifications he/she wishes to make and "SETTINGS OFF" 76 is chosen.

FIG. 27 shows the resulting puzzle view. In FIG. 28 the student is seen beginning to solve the puzzle. He/She has chosen the two indicated value positions, the division operation, and the equals sign. He/She sees that the quotient is 1⅖ 70. There is only one possible set of digits which has "1⅖" as the quotient; the first digit must be seven and the second must be five. FIGS. 29 and 30 demonstrate the consequences of using a different quotient style with the same underlying digits. FIG. 29 shows "WHOLE NUMBER PLUS REMAINDER" as the quotient style being chosen 88. FIG. 30 shows the student now seeing as the quotient "1 REM 2" which has several possible sets of digits, ({5,3}, {6,4}, {7,5}, {8,6}, and {9,7}), as opposed to just one set as with the "FRACTION" quotient style. Small changes in the programmable settings can be used to create large changes in the nature of the puzzle. By thoughtful manipulation of the programmable settings, a teacher can diversify the students' investigations of the properties of numbers. FIG. 31 contains a flowchart summarizing FIGS. 23-27.

FIGS. 32-35 show another embodiment which includes advanced teacher settings. FIG. 32 shows that the teacher has entered the code "TEACHER ADVANCED" 74 and has been presented with "ADVANCED SETTINGS" 96. With advanced settings the teacher has more control over the values and operations available to the student. With regard to the value positions, the teacher is no longer restricted to the digits 0 through 9, but may enter any values he/she likes. The teacher first specifies the number of value positions 100. In this case a 7 has been entered because the teacher would like students to use the sevenths, 0/7 through 6/7. The values are then entered one at a time 102, choosing "ENTER" 104 after each value has been specified. FIG. 32 also shows that the teacher, by not entering any values into "OPERATION POSITIONS" 106, has kept the default arithmetic operations. FIG. 33 shows the resulting puzzle view. Working with fractions promotes number sense. Reducing fractions, finding common denominators, and numerous other skills which must be mastered to effectively use fractions require students to constantly factor and find multiples; two of the most basic concepts of number sense. The teacher can lead the students' investigation of rational numbers and in the process cement the number sense underlying the entire process.

FIG. 34 shows the settings view for one possible implementation of trigonometry. Nine angles with values from 0 to 180 are entered in the value positions with the three basic trigonometric functions sine, cosine, and tangent entered for the function positions. FIG. 35 shows the corresponding puzzle view. In this particular implementation of trigonometry it should be clear that a single value position is to be used with each operation, as opposed to the prior examples where two value positions were used with each operation.

FIG. 36 is a display of another embodiment of the method wherein it is the task of the student to find the arithmetic operation associated with each operation position as well as the digit associated with each of the ten value positions. The operation positions 58 are now structured in the same manner as the value positions. Choosing an operation position utilizes the underlying operation (though at this point unseen by the student) just like choosing a value position utilizes the underlying value. FIG. 37 shows two value positions and one operation position being chosen. As with the value positions, when an operation position is chosen its choices become enabled. Also, the word "Press" on the chosen operation changes to "OPERATION" 58. FIG. 38 shows the student's best guesses with the information at hand. Because the only operation which can be used with the digits 0 through 9 to yield 11 is addition, he/she chooses addition as the operation. He/She is correct and the operation position shows an addition sign. There are several possible pairs of digits which sum to 11 and he/she guesses 8 for the first and 3 for the second. He/She is incorrect and the 8 and the 3 only disappear as choices in the value positions he/she chose. FIG. 39 shows the "NEW OPERATION" position being chosen and the addition operation is eliminated as a choice from the remaining operation positions. Depending on the teacher's preferences in other programmable settings (not shown), the addition operation may now become disabled until the other three operations are discovered.

FIGS. 40 and 41 show another embodiment. In this embodiment polynomial functions appear in place of values in the value positions and the evaluation at various points of these functions are the operations. Using the term value position in this embodiment is a misnomer; however the role of the polynomial is the same as the prior role of the value so the term value position is retained. As in the embodiments in which the puzzle pieces were actual values, the student must still work backwards. Working backwards provides both the multiplicity of approaches to solving the puzzle as well as affording the student the opportunity to actively decide on these paths. In FIG. 41 the student sees that the value of the function evaluated at x=1 is six. This is not enough information to determine a single solution since there are two choices which fit this description. At this point either of the other two operations, f(0) or f(2), would provide enough additional information to decide on the correct choice. This embodiment employs polynomials in the value positions, however other functions would work as well.

FIGS. 42 and 43 show another embodiment which uses polynomial functions in the value positions. In this embodiment the operations are both the evaluation of the function and their derivatives. The design of the puzzle allows the teacher to easily implement a wide range of complexity. For a beginner, the polynomials can be chosen which require the use of just one operation to be identified. For a more advanced student, polynomials can be chosen such that obtaining the information necessary to specify an individual polynomial may require all of the operations. As in the prior embodiment, polynomials are given as examples, but the value positions need not exclude other types of functions or mathematical relations.

FIGS. 44 and 45 show another embodiment which uses first order linear polynomials in the value positions; and properties of these polynomials such as slope, y intercept, and x intercept, in the operation positions. Working backwards from properties to equations greatly improves one's understanding of lines in particular, and functions in general.

FIG. 46 shows another embodiment of the teaching method. In this embodiment the positions, both value and operation, are dynamic. The motion of the positions, as indicated by arrows 134, introduces a time element into the puzzle. Any particular value position or operation position is only accessible when it is in the viewing area. In order to get a value position correct, the student must determine its value before it gets to the bottom of the viewing area. Also, once an operation position leaves the viewing area, the student may only use the remaining operations. Dynamic positions may be used with any of the aforementioned embodiments.

FIG. 47A is one embodiment of the invention as an electronic apparatus with a display 130 on the upper front face of the device and the controls on the lower front face wherein the operations 124 are known to the student and it is the task of the student to find the digit associated with each of the ten value positions 47B. There are five selection control buttons on the left 120, four arrowed buttons to provide for movement among the ten value positions and a middle button to make the selection. After, when it comes time to make an answer choice for a particular value position, a value position is selected as above, then the toggle 122 is used to switch the student from the value position to the ten answer choices within that position 118 and an answer choice can be made. FIG. 47B is an enlarged view of each of the ten value positions. The three control buttons in the middle 47C are seen enlarged in FIG. 47C. These buttons perform the functions, as described elsewhere, of "NEW OPERATION," "RESET ALL KEYS," and "SETTINGS ON." The "=" button 126 performs the same function as the equals position described on earlier figures. The bottom center button 128 performs the on/off function.

FIG. 48A is another embodiment of the invention as an electronic apparatus wherein it is the task of the student to find the arithmetic operation associated with each operation position as well as the digit associated with each of the ten value positions. The controls on the left 120, 122 for choosing value positions and answer choices work as described in FIGS. 47A and 47B. There are three selection control buttons on the right 132, two arrowed buttons provide for movement among the four operation positions and a middle button to make the selection. After, when it comes time to make an answer choice for a particular operation position, an operation position is selected as above, then the toggle 133 is used to switch the student from the operation position to the four answer choices within that position 131 and an answer choice can be made. FIG. 48B is an enlarged view of each of the four operation positions.

FIG. 49 shows another embodiment of the teaching method. In this embodiment one of the value positions is provided to the student, but, unlike the other embodiments, this value may be used in conjunction with the unknown value positions. This embodiment is particularly useful with beginning students who need to concentrate on just one unknown value at a time. It is also useful for teachers who want students to practice on specific skills, such as the 8-times-tables.

FIG. 50 shows an embodiment in which the teaching method is combined with a traditional calculator. The "CALCULATOR" position 140 is on the lower right side of the puzzle view. When the "CALCULATOR" position is selected, as indicated here by the darkened outline of the position, the calculator view, FIG. 51, is presented to the student. The value positions 52 are labeled with the digits 0 through 9, but now the digits take on the traditional roles of numerals in a one or multi-digit number as in any ordinary calculator. As is typical on most calculators, a decimal point position 146 and a sign reversal position 148 are also included. The "CLEAR" position 142 performs the same clearing function as in a normal calculator. The "RETURN TO PUZZLE" position returns the student to the puzzle view.

CONCLUSION, RAMIFICATIONS, AND SCOPE

Thus the reader will see that this system of teaching mathematics is superior to the prior art in that it requires the student to play an active role in determining the hidden values, provides a multitude of ways to determine these values, and provides a puzzle which is intrinsically mathematical. Number sense is improved as the student continually considers both the properties of individual numbers and the many possible numerical interactions. The preferred embodiment permits the student to see the value choices available for any position so the student does not have to remember what incorrect values they have already tried. The puzzle provides constant feedback, enabling a student to work independently. The student can choose to make the puzzle more challenging by restricting which operations he/she uses or by attempting to solve the puzzle with fewer guesses. The puzzle is fun to use, which not only encourages the student to spend more time on mathematics, but more importantly, develops within the student a higher level of comfort with mathematics.

Another embodiment in which one of the value positions is provided to the student and may be used in conjunction with the unknown value positions, provides a simpler introduction to addition, subtraction, multiplication, and division, and is useful for beginners or those who have more difficulty with mathematics. Another embodiment in which using an operation renders that operation inactive until all of the other operations have been used encourages more varied practice. Another embodiment in which the student is required to choose at least three value positions and two operations at a time is useful for investigating order of operations. Another embodiment in which an electronic calculator, graphing or otherwise, is combined with the puzzle allows for a single device, which, since the input, output, and data processing demands are similar, can be produced almost as simply and cheaply as either alone.

Furthermore, the programmable settings in the various embodiments provide additional advantages in that

- it permits the teacher to vary the level of difficulty by choosing different types or sizes of numbers;
- it permits the teacher to vary the level of difficulty by choosing different quotient and difference styles;
- it permits the teacher to improve the students' knowledge of decimals by specifying the value positions to be the values 0.0-0.9 incremented by tenths;
- it permits the teacher to improve the students' knowledge of fractions by graduating the difficulty and allowing students to advance at their own pace;
- it permits the teacher to direct the student to focus on particular skills by choosing specific operations;
- it permits the teacher, by restricting the operations to multiplication, to create an environment where the student discovers factors;
- it permits the teacher, by restricting the operations to multiplication and the value position to "SAME," to create an environment where the student discovers square roots;
- it permits the teacher, by restricting the operations to subtraction and the number of value positions to two, to create an environment where the student discovers that changing the order of subtraction maintains the magnitude of the answer but changes its sign;
- it permits the teacher, by restricting the operations to division and the number of value positions to two, to create an environment where the student discovers reciprocals and equivalent fractions;
- it permits the teacher, by restricting the operation to addition and the number of value positions to two, to create an environment where the student discovers the commutative property of addition and the fact that there is a set of pairs of values with the same sum;
- it permits the teacher, by restricting the operation to multiplication and the number of value positions to two, to create an environment where the student discovers the commutative property of multiplication and the fact that there is a set pairs of values with the same product;

it permits the teacher, by restricting the operations to multiplication and addition and the number of value positions to two, to create an environment where the student develops the algebraic skills used in finding the binomial factors of a trinomial;

it permits the teacher, by using the embodiment in which the operations as well as the values are discovered by the student, to force the student to consider a much wider range of interactions between the number positions and operations in solving the puzzle;

it permits the teacher, by using the embodiment in which the value positions are angles and the operations are trigonometric functions, to create an environment where the student discovers both the values of the various trigonometric functions and the fact that a trigonometric function has the same value for multiple arguments;

it permits the teacher, by using an embodiment in which the value positions are numbers and the operations are the inverse trigonometric functions, to create an environment where the student discovers both the values of the various inverse trigonometric functions and the fact that an inverse trigonometric function has a restricted domain;

it permits the teacher, by using an embodiment in which the value positions are angles expressed as inverse trigonometric functions and the operations are trigonometric functions, requires the student to work with composite functions;

it permits the teacher, by using an embodiment in which the value positions are expressed as trigonometric functions and the operations are inverse trigonometric functions, requires the student to work with composite functions;

it permits the teacher, by using an embodiment in which the value positions are easily discernable powers of integers and the operations are logarithmic functions of various bases, to create an environment where the student can explore the properties of both exponents and logarithms;

it permits the teacher, by using an embodiment in which the value positions are sets of values and set operations, union, intersection, etc, are the operations, to create an environment where students can explore set theory;

it permits the teacher, by using an embodiment in which the value positions are sets of values, continuous and discrete, and graphable functions are the operations, to create an environment where students can explore visual representations of functions and the concepts of domain and range;

it permits the teacher, by using an embodiment in which the value positions are sets of values, continuous or discrete, and transformations are the known operations, to create an environment where students can explore symmetry, isometry, and other geometric properties;

it permits the teacher, by using an embodiment in which the value positions are sets of values, continuous or discrete, and transformations are the unknown operations in the operation positions, to create a more challenging environment where students can explore symmetry, isometry, and other geometric properties;

it permits the teacher, by using an embodiment in which the value positions are functions, such as polynomial, trigonometric, exponential, etc., and the operations are the evaluation of these functions at various points, to create an environment where students can explore functions;

it permits the teacher, by using an embodiment in which the value positions are linear first order polynomials, and the operations are properties of these polynomial functions such as slope, y intercept, and x intercept, to create an environment where students can explore lines; and it permits the teacher, by using an embodiment in which the value positions are functions, such as polynomial, trigonometric, exponential, etc., and the operations are differential and/or integral operators, to create an environment where students can explore the basic principles of Calculus.

While my above description contains many specificities, these should not be construed as limitations on the scope of the invention, but rather as exemplifications of preferred embodiments thereof. Accordingly, the scope of the invention should be determined not by the embodiments illustrated, but by the appended claims and their legal equivalents.

The invention claimed is:

1. A method of teaching mathematics to an individual, the method comprising:
   providing to the individual a display device in communication with an input device;
   the individual activating the display device to initiate the development of a first mathematical problem to be solved, the mathematical problem capable of being solved by the display device at a selected time by the individual, the activating comprising displaying a plurality of numeric value positions wherein the capability is provided that any one numeric value position, and any combination of any one numeric value position, can be selected by the individual, each numeric value position comprising an undisclosed numeric value from a plurality of numeric values, the activating further comprising providing the capability for the individual to select any one of the four mathematical operations: addition, subtraction, multiplication and division; and
   with the use of the input device and while the numeric values remain undisclosed, the individual selecting in any order the following:
      at least two numeric value positions, a first numeric value position and a second numeric value position; and
      a first one mathematical operation from the four mathematical operations to be performed on the undisclosed numeric values from the at least two selected numeric value positions; and
   using the input device, the individual selecting to have the display device display a first mathematical result of the first one mathematical operation having been performed on the at least two undisclosed numeric values while the at least two undisclosed numeric values remain undisclosed.

2. An electronic apparatus for teaching mathematics to an individual, the electronic apparatus comprising:
   a display device;
   input device; and
   data processing configured to provide communication between the display device and the input device, the data processing comprising capabilities to provide the following functionality:
   the individual can activate the display device to initiate the development of a first mathematical problem to be solved, the mathematical problem capable of being solved by the display device at a selected time by the individual, the activation comprising displaying a plurality of numeric value positions wherein the capability is provided that any one numeric value position, and any combination of any one numeric value position, can be selected by the individual, each numeric value position comprising an undisclosed numeric value from a plurality of numeric values, the activation further comprising the capability for the individual to select any one of the four mathematical operations: addition, subtraction, multiplication and division; and with the use of the input device and while the numeric values remain undisclosed, the individual can select in any order the following:
- at least two numeric value positions, a first numeric value position and a second numeric value position; and
- a first one mathematical operation from the four mathematical operations to be performed on the undisclosed numeric values from the at least two selected value positions; and with the use of the input device, the capability is provided for the individual to select to have the display device display a first mathematical result of the first one mathematical operation having been performed on the at least two undisclosed numeric values while the at least two undisclosed numeric values remain undisclosed.

3. The method of claim 1 further comprising, after the first mathematical result is displayed, selecting any one of the other three mathematical operations to be performed on the at least two numeric values creating a second mathematical result being displayed on the display device all while the at least two numeric values still remain undisclosed.

4. The method of claim 3 further comprising, after the second mathematical result is displayed, selecting one numeric value from one of the at least two numeric value positions, the display device displaying whether the selection is accurate or inaccurate.

5. The method of claim 4 wherein the display device displays that the selection is inaccurate by removing the one selected numeric value from the one numeric value position.

6. The method of claim 4 wherein the display device displays that the selection is accurate by removing all the numeric values from the one numeric value position except for the one selected numeric value.

7. The method of claim 3 further comprising, after the second mathematical result is displayed, selecting any one of the other two mathematical operations to be performed on the at least two numeric values creating a third mathematical result being displayed on the display device all while the at least two numeric values still remain undisclosed.

8. The method of claim 1 further comprising, after the first mathematical result is displayed, selecting one numeric value from one of the at least two numeric value positions, the display device displaying whether the selection is accurate or inaccurate.

9. The method of claim 8 wherein the display device displays that the selection is inaccurate by removing the one selected numeric value from the one numeric value position.

10. The method of claim 8 wherein the display device displays that the selection is accurate by removing all the numeric values from the one numeric value position except for the one selected numeric value.

11. The electronic apparatus of claim 2 further comprising, after the first mathematical result is displayed, the capability exists to select any one of the other three mathematical operations to be performed on the at least two numeric values which would create a second mathematical result being displayed on the display device all while the at least two numeric values still remain undisclosed.

12. The electronic apparatus of claim 11 further comprising, after the second mathematical result is displayed, the capability exists to select one numeric value from one of the at least two numeric value positions, the display device having the capability to display whether the selection is accurate or inaccurate.

13. The electronic apparatus of claim 12 wherein the display device has the capability to display that the selection is inaccurate by removing the one selected numeric value from the one numeric value position.

14. The electronic apparatus of claim 12 wherein the display device has the capability to display that the selection is accurate by removing all the numeric values from the one numeric value position except for the one selected numeric value.

15. The electronic apparatus of claim 11 further comprising, after the second mathematical result is displayed, the capability exists to select any one of the other two mathematical operations to be performed on the at least two numeric values which would create a third mathematical result being displayed on the display device all while the at least two numeric values still remain undisclosed.

16. The electronic apparatus of claim 2 further comprising, after the first mathematical result is displayed, the capability to select one numeric value from one of the at least two numeric value positions, the display device would then display whether the selection is accurate or inaccurate.

17. The electronic apparatus of claim 16 wherein the display device has the capability to display that the selection is inaccurate by removing the one selected numeric value from the one numeric value position.

18. The electronic apparatus of claim 16 wherein the display device has the capability to display that the selection is accurate by removing all the numeric values from the one numeric value position except for the one selected numeric value.

* * * * *

UNITED STATES PATENT AND TRADEMARK OFFICE
CERTIFICATE OF CORRECTION

| | |
|---|---|
| PATENT NO. | : 8,708,703 B2 |
| APPLICATION NO. | : 11/203846 |
| DATED | : April 29, 2014 |
| INVENTOR(S) | : Matthew Earl Fluster |

It is certified that error appears in the above-identified patent and that said Letters Patent is hereby corrected as shown below:

TITLE PAGE

(56) References Cited / U.S. PATENT DOCUMENTS –
  Remove "3,669,667 A * 6/1972 Gomez...... 35/9 B"

SPECIFICATION

Column 2, line 1 – Replace "assistance is provide two ways" with
  --assistance is provided two ways--

Column 2, line 5 – Replace "disclosed by Manner, the" with
  --disclosed by Marmer, the--

Column 13, line 2 – Replace "a set pairs of values" with
  --a set of pairs of values--

Signed and Sealed this
First Day of March, 2016

Michelle K. Lee
*Director of the United States Patent and Trademark Office*